United States Patent
Nomura

(10) Patent No.: US 10,788,433 B2
(45) Date of Patent: Sep. 29, 2020

(54) CORRECTION VALUE CALCULATION METHOD, IMAGE FORMING APPARATUS, PROGRAM, AND INSPECTION IMAGE

(71) Applicant: KONICA MINOLTA, INC., Tokyo (JP)

(72) Inventor: Shoichi Nomura, Machida (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 184 days.

(21) Appl. No.: 16/173,081

(22) Filed: Oct. 29, 2018

(65) Prior Publication Data

US 2019/0137414 A1    May 9, 2019

(30) Foreign Application Priority Data

Nov. 7, 2017    (JP) ................. 2017-214332

(51) Int. Cl.
| | |
|---|---|
| *G01N 21/956* | (2006.01) |
| *G02B 27/09* | (2006.01) |
| *G03G 15/00* | (2006.01) |
| *G03G 15/043* | (2006.01) |

(52) U.S. Cl.
CPC ... *G01N 21/95607* (2013.01); *G02B 27/0927* (2013.01); *G03G 15/043* (2013.01); *G03G 15/5062* (2013.01); *G03G 15/55* (2013.01)

(58) Field of Classification Search
CPC .. G03G 15/55; G03G 15/043; G03G 15/5062; G02B 27/0927; G02B 26/123; G02B 26/127; G01N 21/95607
See application file for complete search history.

(56) References Cited

U.S. PATENT DOCUMENTS

| | | | | |
|---|---|---|---|---|
| 5,694,637 | A | * | 12/1997 | Yoshino ............... G03G 15/326 |
| | | | | 399/38 |
| 2016/0246208 | A1 | * | 8/2016 | Nagasaki ............... H04N 1/387 |
| 2017/0019561 | A1 | * | 1/2017 | Furuta .................... H04N 1/113 |
| 2017/0038703 | A1 | * | 2/2017 | Horiuchi .................. H04N 1/06 |
| 2017/0153586 | A1 | * | 6/2017 | Tanaka .................. G03G 15/55 |
| 2018/0004115 | A1 | * | 1/2018 | Iwata ................. G03G 15/5054 |

FOREIGN PATENT DOCUMENTS

JP         2015100920 A      6/2015

* cited by examiner

*Primary Examiner* — Syed Haider
(74) *Attorney, Agent, or Firm* — Buchanan Ingersoll & Rooney PC

(57) ABSTRACT

A correction value calculation method includes: forming, on a recording medium, an inspection image in which two or more types of individual inspection images is formed; calculating a first correction value group including first correction values, and a second correction value group including second correction values, wherein, in the calculating, a combination of the first correction value regarding positional deviation of a light beam that affects density of the individual inspection image, of the first correction value group, and the second correction values regarding an influence amount of multiple exposure effect according to an image pattern corresponding to the individual inspection image, of the second correction value group, and the first correction value group and the second correction value group are calculated on the basis of density information regarding each density of the individual inspection image and the combination of the first and second correction values.

14 Claims, 31 Drawing Sheets

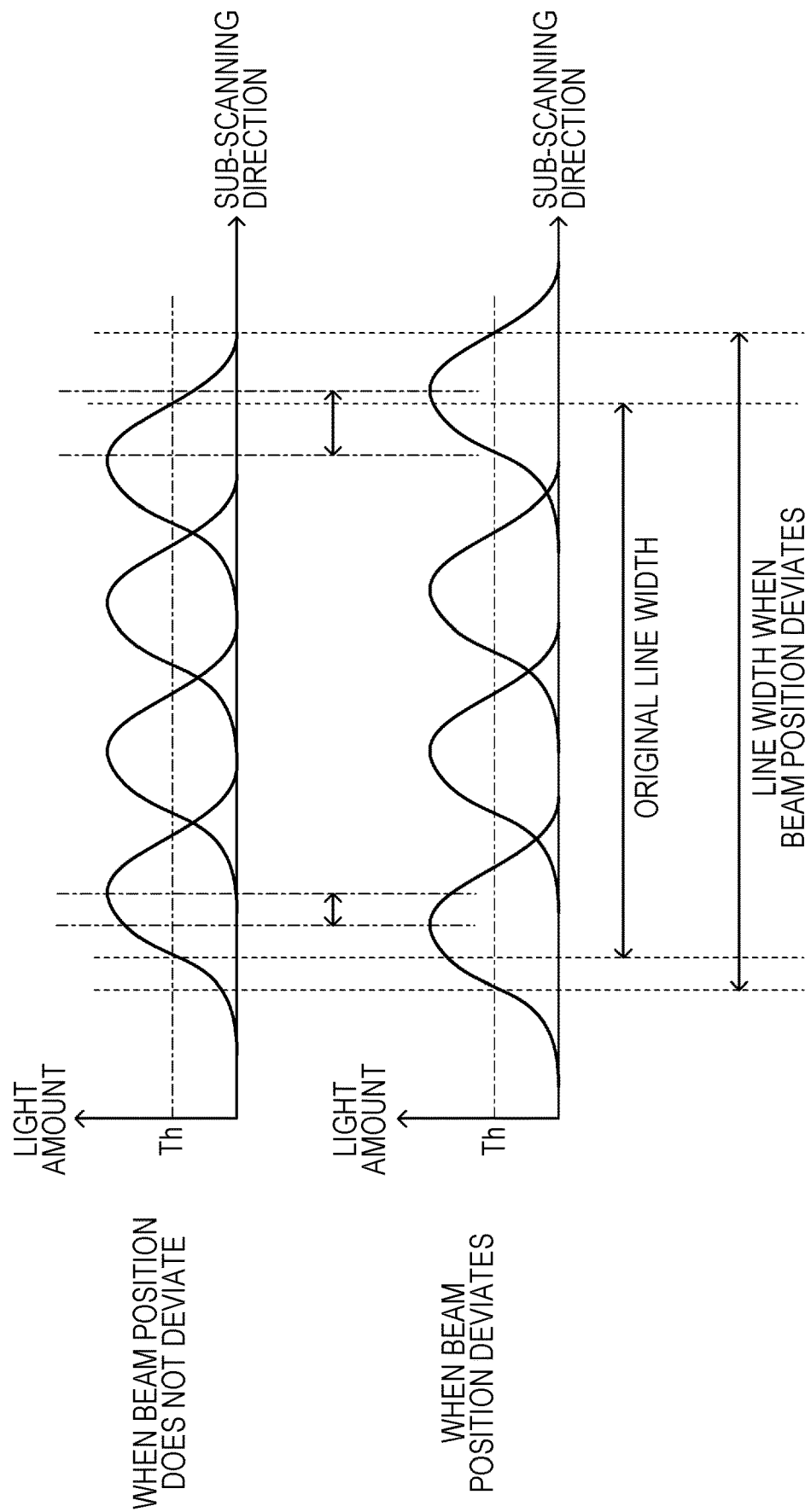

| | PATCH PATTERN NUMBER | MEASUREMENT DENSITY (LUMINANCE) (a) | DIFFERENCE FROM AVERAGE (b) | INFLUENCE AMOUNT BY POSITIONAL DEVIATION OF BEAM (INFLUENTIAL CORRECTION VALUE Cb) (c) | CROSSING BOUNDARY OF MULTIBEAM (d) | INFLUENTIAL CORRECTION VALUES L AND U (e) |
|---|---|---|---|---|---|---|
| 4On-12Off | 1 | 156.800 | 1.218 | Cb01-Cb04 | | |
| | 2 | 156.300 | 0.718 | Cb02-Cb05 | | |
| | 3 | 156.208 | 0.627 | Cb03-Cb06 | | |
| | 4 | 155.917 | 0.335 | Cb04-Cb07 | | |
| | 5 | 156.033 | 0.452 | Cb05-Cb08 | | |
| | 6 | 155.983 | 0.402 | Cb06-Cb09 | | |
| | 7 | 156.400 | 0.818 | Cb07-Cb10 | | |
| | 8 | 156.958 | 1.377 | Cb08-Cb11 | | |
| | 9 | 155.958 | 0.377 | Cb09-Cb12 | | |
| | 10 | 155.833 | 0.252 | Cb10-Cb13 | | |
| | 11 | 155.133 | -0.448 | Cb11-Cb14 | | |
| | 12 | 155.700 | 0.118 | Cb12-Cb15 | | |
| | 13 | 156.400 | 0.818 | Cb13-Cb16 | | |
| | 14 | 152.983 | -2.598 | Cb14-Cb01 | ○ | U3, L1 |
| | 15 | 152.525 | -3.057 | Cb15-Cb02 | ○ | U2, L2 |
| | 16 | 154.175 | -1.407 | Cb16-Cb03 | ○ | U1, L3 |
| | AVERAGE | 155.582 | | | | |
| 8On-8Off | 1 | 92.275 | 0.478 | Cb01-Cb08 | | |
| | 2 | 92.100 | 0.303 | Cb02-Cb09 | | |
| | 3 | 92.375 | 0.578 | Cb03-Cb10 | | |
| | 4 | 92.342 | 0.545 | Cb04-Cb11 | | |
| | 5 | 92.450 | 0.653 | Cb05-Cb12 | | |
| | 6 | 92.342 | 0.545 | Cb06-Cb13 | | |
| | 7 | 93.100 | 1.303 | Cb07-Cb14 | | |
| | 8 | 94.617 | 2.820 | Cb08-Cb15 | | |
| | 9 | 94.428 | 2.631 | Cb09-Cb16 | | |
| | 10 | 89.675 | -2.122 | Cb10-Cb01 | ○ | U5, L1 |
| | 11 | 90.425 | -1.372 | Cb11-Cb02 | ○ | U5, L2 |
| | 12 | 91.150 | -0.647 | Cb12-Cb03 | ○ | U5, L3 |
| | 13 | 90.067 | -1.730 | Cb13-Cb04 | ○ | U4, L4 |
| | 14 | 90.658 | -1.139 | Cb14-Cb05 | ○ | U3, L5 |
| | 15 | 90.492 | -1.305 | Cb15-Cb06 | ○ | U2, L5 |
| | 16 | 90.258 | -1.539 | Cb16-Cb07 | ○ | U1, L5 |
| | AVERAGE | 91.797 | | | | |

FIG. 28

| | NUMBER OF CORRECTION VALUE Cb | CALCULATION ORDER OF TEMPORARY CORRECTION VALUES Cb (f) | TEMPORARY CORRECTION VALUE Cb (g) | TEMPORARY CORRECTION VALUE Cb (AVERAGE VALUE ADJUSTMENT) (h) | CORRECTION VALUE Cb (i) | CORRECTION VALUES L AND U HAVING INFLUENCE ON TEMPORARY CORRECTION VALUE Cb (j) |
|---|---|---|---|---|---|---|
| 4On-12Off | Cb01 | 1 | 0 | 2.187 | 1.435 | |
| | Cb02 | 12 | -0.501 | 1.687 | 1.228 | U2, L2 / U1, L3 |
| | Cb03 | 7 | -2.034 | 0.153 | 1.025 | U1, L3 |
| | Cb04 | 2 | -1.218 | 0.969 | 0.824 | |
| | Cb05 | 13 | -1.219 | 0.968 | 0.627 | U2, L2 / U1, L3 |
| | Cb06 | 8 | -2.661 | -0.474 | 0.433 | U1, L3 |
| | Cb07 | 3 | -1.553 | 0.634 | 0.243 | |
| | Cb08 | 14 | -1.670 | 0.517 | 0.055 | U2, L2 / U1, L3 |
| | Cb09 | 9 | -3.063 | -0.875 | -0.129 | U1, L3 |
| | Cb10 | 4 | -2.371 | -0.184 | -0.310 | |
| | Cb11 | 15 | -3.047 | -0.860 | -0.488 | U2, L2 / U1, L3 |
| | Cb12 | 10 | -3.439 | -1.252 | -0.663 | U1, L3 |
| | Cb13 | 5 | -2.623 | -0.436 | -0.834 | |
| | Cb14 | 16 | -2.598 | -0.411 | -1.003 | U2, L2 / U1, L3 |
| | Cb15 | 11 | -3.557 | -1.370 | -1.168 | U1, L3 |
| | Cb16 | 6 | -3.441 | -1.254 | -1.330 | |
| | | | AVERAGE | -2.187 | | |
| 8On-8Off | Cb01 | 1 | 0 | 1.568 | 1.435 | |
| | Cb02 | 8 | 0.021 | 1.589 | 1.228 | U5, L2 / U4, L4 / U2, L5 |
| | Cb03 | 15 | -1.544 | 0.023 | 1.025 | U5, L3 / U3, L5 / U1, L5 / U5, L2 / U4, L4 / U2, L5 |
| | Cb04 | 6 | -0.806 | 0.761 | 0.824 | U4, L4 / U2, L5 |
| | Cb05 | 13 | -1.538 | 0.029 | 0.627 | U3, L5 / U1, L5 / U5, L2 / U4, L4 / U2, L5 |
| | Cb06 | 4 | -1.992 | -0.424 | 0.433 | U2, L5 |
| | Cb07 | 11 | -1.374 | 0.193 | 0.243 | U1, L5 / U5, L2 / U4, L4/ U2, L5 |
| | Cb08 | 2 | -0.478 | 1.090 | 0.055 | |
| | Cb09 | 9 | -0.282 | 1.286 | -0.129 | U5, L2 / U4, L4 / U2, L5 |
| | Cb10 | 16 | -2.122 | -0.554 | -0.310 | U5, L3 / U3, L5 / U1, L5 / U5, L2 / U4, L4 / U2, L5 |
| | Cb11 | 7 | -1.351 | 0.217 | -0.488 | U4, L4 / U2, L5 |
| | Cb12 | 14 | -2.191 | -0.624 | -0.663 | U3, L5 / U1, L5 / U5, L2 / U4, L4 / U2, L5 |
| | Cb13 | 5 | -2.537 | -0.969 | -0.834 | U2, L5 |
| | Cb14 | 12 | -2.677 | -1.109 | -1.003 | U1, L5 / U5, L2 / U4, L4/ U2, L5 |
| | Cb15 | 3 | -3.298 | -1.730 | -1.168 | |
| | Cb16 | 10 | -2.913 | -1.345 | -1.330 | U5, L2 / U4, L4 / U2, L5 |
| | | | AVERAGE | -1.568 | | |

FIG. 30

| | PATCH PATTERN NUMBER | MEASUREMENT DENSITY (LUMINANCE) (a) | INFLUENCE AMOUNT BY POSITIONAL DEVIATION OF BEAM (k) | CROSSING BOUNDARY OF MULTIBEAM (d) | MEASUREMENT DENSITY AFTER CORRECTION OF POSITIONAL DEVIATION OF BEAM (LUMINANCE) (l) | | |
|---|---|---|---|---|---|---|---|
| 4On-12Off | 1 | 156.800 | 0.611 | | 156.190 | | |
| | 2 | 156.300 | 0.601 | | 155.699 | | |
| | 3 | 156.208 | 0.591 | | 155.617 | | |
| | 4 | 155.917 | 0.582 | | 155.335 | | |
| | 5 | 156.033 | 0.572 | | 155.461 | | |
| | 6 | 155.983 | 0.563 | | 155.421 | | |
| | 7 | 156.400 | 0.553 | | 155.847 | | |
| | 8 | 156.958 | 0.543 | | 156.415 | | |
| | 9 | 155.958 | 0.534 | | 155.425 | | |
| | 10 | 155.833 | 0.524 | | 155.309 | AVERAGE OF COLORED CELLS (m) | |
| | 11 | 155.133 | 0.515 | | 154.619 | 155.572 | |
| | 12 | 155.700 | 0.505 | | 155.195 | | |
| | 13 | 156.400 | 0.495 | | 155.905 | DEVIATION FROM AVERAGE (n) | |
| | 14 | 152.983 | -2.438 | ○ | 155.421 | -0.151 | =U3+L1 |
| | 15 | 152.525 | -2.396 | ○ | 154.921 | -0.651 | =U2+L2 |
| | 16 | 154.175 | -2.354 | ○ | 156.529 | 0.957 | =U1+L3 |
| 8On-8Off | 1 | 92.275 | 1.380 | | 90.895 | | |
| | 2 | 92.100 | 1.357 | | 90.743 | | |
| | 3 | 92.375 | 1.335 | | 91.040 | | |
| | 4 | 92.342 | 1.313 | | 91.029 | | |
| | 5 | 92.450 | 1.290 | | 91.160 | | |
| | 6 | 92.342 | 1.268 | | 91.074 | AVERAGE OF COLORED CELLS (m) | |
| | 7 | 93.100 | 1.245 | | 91.855 | 91.602 | |
| | 8 | 94.617 | 1.223 | | 93.394 | | |
| | 9 | 94.428 | 1.201 | | 93.228 | DEVIATION FROM AVERAGE (n) | |
| | 10 | 89.675 | -1.745 | ○ | 91.420 | -0.182 | =U5+L1 |
| | 11 | 90.425 | -1.716 | ○ | 92.141 | 0.539 | =U5+L2 |
| | 12 | 91.150 | -1.688 | ○ | 92.838 | 1.236 | =U5+L3 |
| | 13 | 90.067 | -1.659 | ○ | 91.725 | 0.123 | =U4+L4 |
| | 14 | 90.658 | -1.630 | ○ | 92.288 | 0.686 | =U3+L5 |
| | 15 | 90.492 | -1.601 | ○ | 92.093 | 0.491 | =U2+L5 |
| | 16 | 90.258 | -1.572 | ○ | 91.831 | 0.229 | =U1+L5 |

FIG. 31

| | |
|---|---|
| U5 | 0.474 |
| U4 | 0.062 |
| U3 | 0.212 |
| U2 | 0.017 |
| U1 | −0.245 |
| L5 | 0.474 |
| L4 | 0.062 |
| L3 | 0.762 |
| L2 | 0.065 |
| L1 | −0.656 |

CORRECTION VALUE CALCULATION METHOD, IMAGE FORMING APPARATUS, PROGRAM, AND INSPECTION IMAGE

The entire disclosure of Japanese patent Application No. 2017-214332, filed on Nov. 7, 2017, is incorporated herein by reference in its entirety.

BACKGROUND

Technological Field

The present invention relates to a correction value calculation method, an image forming apparatus, a program, and an inspection image.

Description of the Related Art

Conventionally, there is an electrophotographic image forming apparatus that scans and exposes a surface of a charged photoconductor with a light beam modulated according to a gradation value of each pixel of image data, and develops an electrostatic latent image formed by the exposure, thereby to form an image. In this image forming apparatus, there is a technology of performing scan with a plurality of light beams in parallel to expose a plurality of lines in one scan, thereby to form an image at a higher speed (for example, JP 2015-100920 A). The plurality of light beams used for such parallel scan is also called multibeam.

In the case of using the multibeam, it is desirable to keep spacing of the light beams constant, but in reality, there are cases where a positional deviation (deviation of an irradiation position) of each light beam occurs due to adjustment error at the time of manufacturing or aging. If there is positional deviation in the light beam, it leads to local variation of a line width of a line image, for example. Since the density of a line image increases/decreases according to the line width, the local variation of the line width causes density unevenness in the line image.

Further, in the exposure using the multibeam, if the exposure of a string of image pattern is divided into two or more scans, the density of the pattern may locally vary due to multiple exposure effect. The multiple exposure effect is a phenomenon in which exposure efficiency is improved when light energy is divided and imparted in multiple times as compared with a case where the light energy of the same amount is imparted to the same position in one time (the exposure efficiency is improved in many cases in the electrophotography but decreases in some cases), and is also called reciprocity failure. The influence amount of the multiple exposure effect on the density differs depending on an image pattern crossing a scan boundary. Density change due to the multiple exposure effects also causes the density unevenness in line images and the like.

Although the density unevenness caused by the positional deviation of the light beam and the multiple exposure effect is small, such density unevenness periodically occurs depending on the image pattern, and a density difference between a portion where the density unevenness occurs and a portion where the density unevenness does not occur regularly appears and is visually recognized as moiré.

To correct the above density unevenness, it is necessary to calculate a correction value (first correction value) regarding a positional deviation amount of each light beam and a correction value (second correction value) regarding an influence amount of the multiple exposure effect according to an image pattern on the basis of a reading result of a formed image in which the density unevenness has occurred (for example, a predetermined inspection image), and to correct image data on the basis of the obtained correction values and to adjust arrangement of the light beams. In this way, the correction values (the first correction value and the second correction value) are calculated for each factor of the density unevenness and correction is made, whereby occurrence of the density unevenness can be effectively suppressed.

However, it is not easy to specify how much each of the positional deviation of the light beam and the multiple exposure effect influences the density unevenness that has actually occurred in the inspection image. Therefore, there is a problem that independent and accurate calculation of the first correction value regarding the positional deviation of the light beam and the second correction value regarding the multiple exposure effect based on the reading result of the inspection image is difficult.

SUMMARY

An object of the present invention is to provide a correction value calculation method, an image forming apparatus, a program, and an inspection image, for enabling easier calculation of correction values to be used for correction of density unevenness.

To achieve the abovementioned object, according to an aspect of the present invention, there is provided a correction value calculation method used for correction of density unevenness in an image forming apparatus that repeats an operation to move a surface of a photoconductor in a sub-scanning direction and an operation to scan the surface of the photoconductor in a main scanning direction with a plurality of light beams to expose the photoconductor, develops an electrostatic latent image formed by the exposure, and transfers the electrostatic latent image on a recording medium, to form an image, and the correction value calculation method reflecting one aspect of the present invention comprises: forming, on the recording medium, an inspection image in which two or more types of a plurality of individual inspection images having different interference patterns with the plurality of light beams from one another is formed to have a plurality of different phase relationships with respect to the plurality of light beams, respectively; calculating a first correction value group including a plurality of first correction values used for correction of density unevenness caused by positional deviation of each of the plurality of light beams, and a second correction value group including a plurality of second correction values used for correction of density unevenness caused by multiple exposure effect in the scanning that is continuous, wherein in the calculating of the first and second correction value groups, a combination of the first correction value regarding the positional deviation of the light beam that affects density of the individual inspection image, of the first correction value group, and the second correction values regarding an influence amount of the multiple exposure effect according to an image pattern corresponding to the individual inspection image, of the second correction value group, on the basis of the type and the positional relationship of the individual inspection image, are identified for each of the individual inspection images included in the inspection image, and the first correction value group and the second correction value group are calculated on the basis of density information regarding each density of the individual inspection image obtained from a read result of the inspection image and the combination of the first correction value and the second correction values corresponding to each of the individual inspection image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating light amount distribution of laser beams when a line image with four-pixel width is formed by four laser beams;

FIG. 16 is a diagram illustrating an example of a template used for correction by the second corrector;

FIG. 27 is a diagram for describing a calculation process of a correction value;

FIG. 28 is a diagram for describing a calculation process of a correction value;

FIG. 30 is a diagram for describing a calculation process of correction values;

FIG. 31 is a diagram illustrating calculation results of the correction values;

DETAILED DESCRIPTION OF EMBODIMENTS

Hereinafter, one or more embodiments of a correction value calculation method, an image forming apparatus, a program, and an inspection image of the present invention will be described with reference to the drawings. However, the scope of the invention is not limited to the disclosed embodiments.

Figure 1:
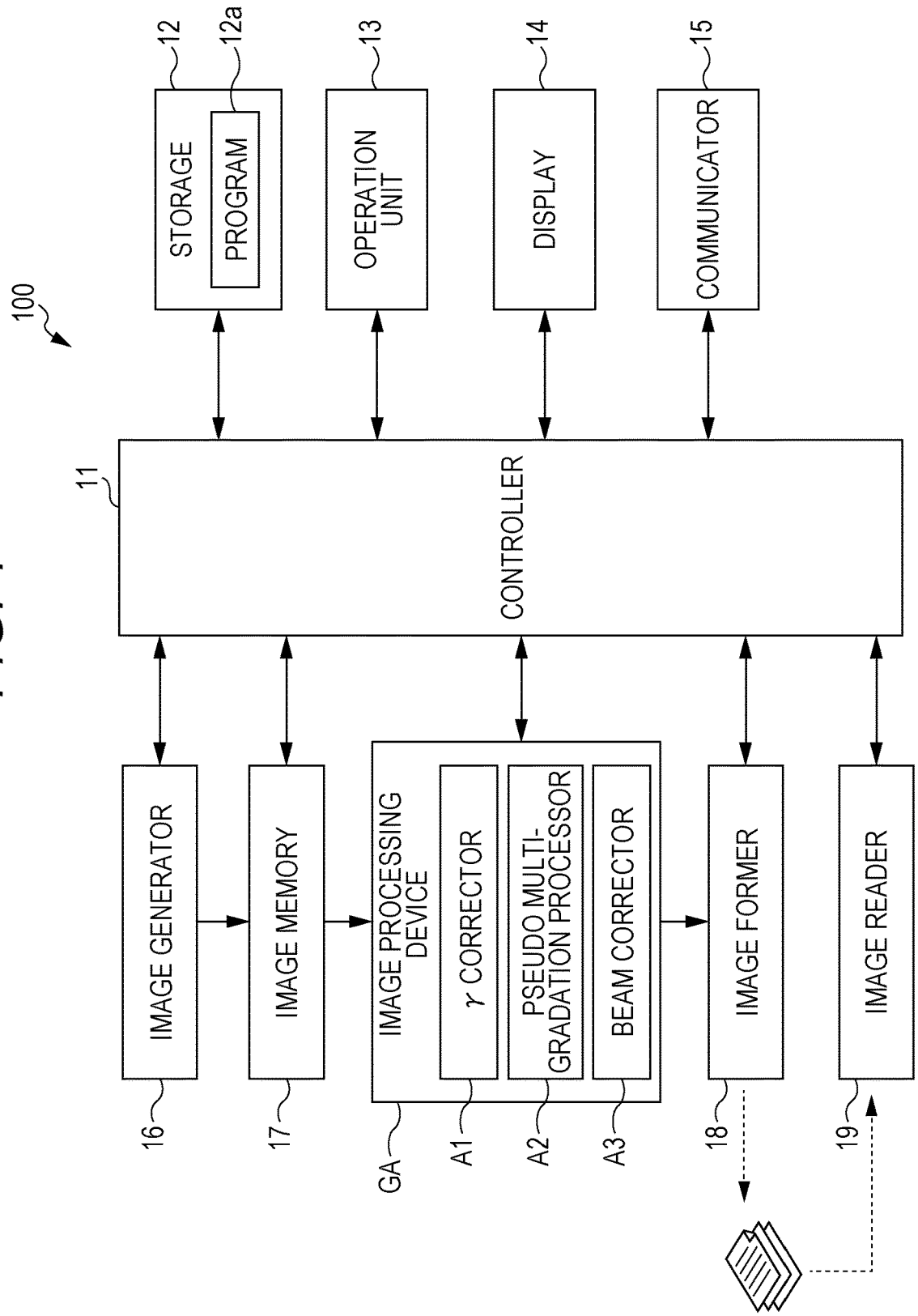
FIG. 1 is a block diagram illustrating a main functional configuration of an image forming apparatus.

FIG. 1 is a block diagram illustrating a main functional configuration of an image forming apparatus 100 according to an embodiment of the present invention.

The image forming apparatus 100 includes a controller 11 (image forming controller, correction value calculator, or computer), a storage 12, an operation unit 13, a display 14, a communicator 15, an image generator 16, an image memory 17, an image processing device GA, an image former 18, and an image reader 19 (reader).

The controller 11 includes a central processing unit (CPU), a random access memory (RAM), and the like, and reads and executes a program 12a from the storage 12, thereby to control each part of the image forming apparatus 100.

For example, the controller 11 causes the image processing device GA to process image data generated by the image generator 16 and held in the image memory 17 and causes the image former 18 to form an image on a recording medium on the basis of the image data after the image processing.

The storage 12 stores the program 12a readable by the controller 11, files used when the program 12a is executed, and the like. As the storage 12, a large-capacity memory such as a hard disk can be used.

The operation unit 13 generates an operation signal according to a user's operation and outputs the operation signal to the controller 11. As the operation unit 13, a keypad, a touch panel integrated with the display 14, and the like can be used.

The display 14 displays an operation screen and the like according to an instruction from the controller 11. As the display 14, a liquid crystal display (LCD), an organic electro luminescence display (OELD), or the like can be used.

The communicator 15 communicates with an external device on a network, for example, a user terminal, a server, another image forming apparatus, and the like.

The communicator 15 receives data in which instruction contents for forming an image is described in a page description language (PDL) (hereinafter the data is referred to as PDL data) from the user terminal or the like via the network.

The image generator 16 rasterizes the PDL data received by the communicator 15 to generate image data in a bitmap format. In the image data, each pixel has gradation values of four colors of cyan (C), magenta (M), yellow (Y), and black (K). The gradation value is a data value representing shading of an image, and for example, an 8-bit data value represents shading of 0 to 255 gradations.

The processing contents of the image generator 16 can be realized by software processing for executing a program for image generation by a processor such as a CPU or a graphics processor unit (GPU).

The image generator 16 can generate attribute data indicating an attribute of each pixel of the image data together with the image data.

For example, the image generator 16 can determine the attribute of each pixel of the image such as kava, alphabet, or numeral, which has been drawn according to description of a character code in the PDL data, as a character (text), at the time of the rasterizing processing. In addition, the image generator 16 can determine the attribute of each pixel of the image such as a polygon, a circle, or a ruled line, which has been drawn according to description in a vector format such as DXF, SVG, or WMF, as a graphic, and can determine the attribute of the image such as a photograph image drawn with a file in a JPEG format, as a photograph (image or photograph).

The image memory 17 is a buffer memory that temporarily holds the image data generated by the image generator 16. As the image memory 17, a dynamic RAM (DRAM)) or the like can be used.

The image processing device GA reads the image data of each page from the image memory 17 in accordance with timing of forming an image and applies image processing.

As illustrated in FIG. 1, the image processing device GA includes a γ corrector A1, a pseudo multi-gradation processor A2, and a beam corrector A3 (corrector).

The γ corrector A1 corrects a gradation value of each pixel of the image data so that a density characteristic of the image formed on the recording medium by the image former 18 matches a target density characteristic.

The pseudo multi-gradation processor A2 applies pseudo multi-gradation processing to the image data corrected by the γ corrector A1. The pseudo multi-gradation processing is, for example, error diffusion processing or screen processing using a dither matrix.

Note that, in a case where images of characters and lines are binary, correction by the beam corrector A3 is particularly effective. However, these images are usually unchanged before and after the pseudo multi-gradation processing. Therefore, the attribute data may be input together with the image data, and the pixels having attribute data indicating the attributes of characters and figures may be excluded from the pseudo multi-gradation processing. Further, in a case where the images of characters and lines are multivalues, the pixels may be similarly excluded from the pseudo multi-gradation processing.

The beam corrector A3 corrects the gradation value of each pixel of the image data, which has been processed by the pseudo multi-gradation processor A2, to decrease the density unevenness (density difference) caused by the positional deviation of the beams and the multiple exposure effect, which occurs when the photoconductor is scanned with the multibeam with a light amount according to the gradation value and exposed.

The processing contents of the beam corrector A3 may be realized by software processing for reading and executing a program for correction processing by a processor such as a CPU or a GPU, or may be realized by hardware such as an application specific integrated circuit (ASIC) or a field-programmable gate array (FPGA).

The image former 18 forms an image in four colors on the recording medium according to the gradation values of the C, M, Y, and K four colors of each pixel of the image data processed by the image processing device GA.

Specifically, the image former 18 includes an exposurer, a photoconductor, a developer, and the like for each color of C, M, Y, and K. In the image former 18, the photoconductor charged with a laser beam modulated according to the gradation value of each pixel of the image data is scanned and exposed by the exposurer and an electrostatic latent image is formed, and then a toner is supplied to develop the electrostatic latent image by the developer. In this manner, the image former 18 sequentially forms the images in C, M, Y, and K colors on the respective photoconductors and superimposes the images on a transfer body such as an intermediate transfer belt from the photoconductors to primarily transfer the images. After the obtained color image is secondarily transferred from the transfer body onto the recording medium, the recording medium is heated and pressurized to be fixed.

At the time of exposure, the image former 18 radiates a multibeam that is a bundle of a plurality of laser beams.

Figure 2:
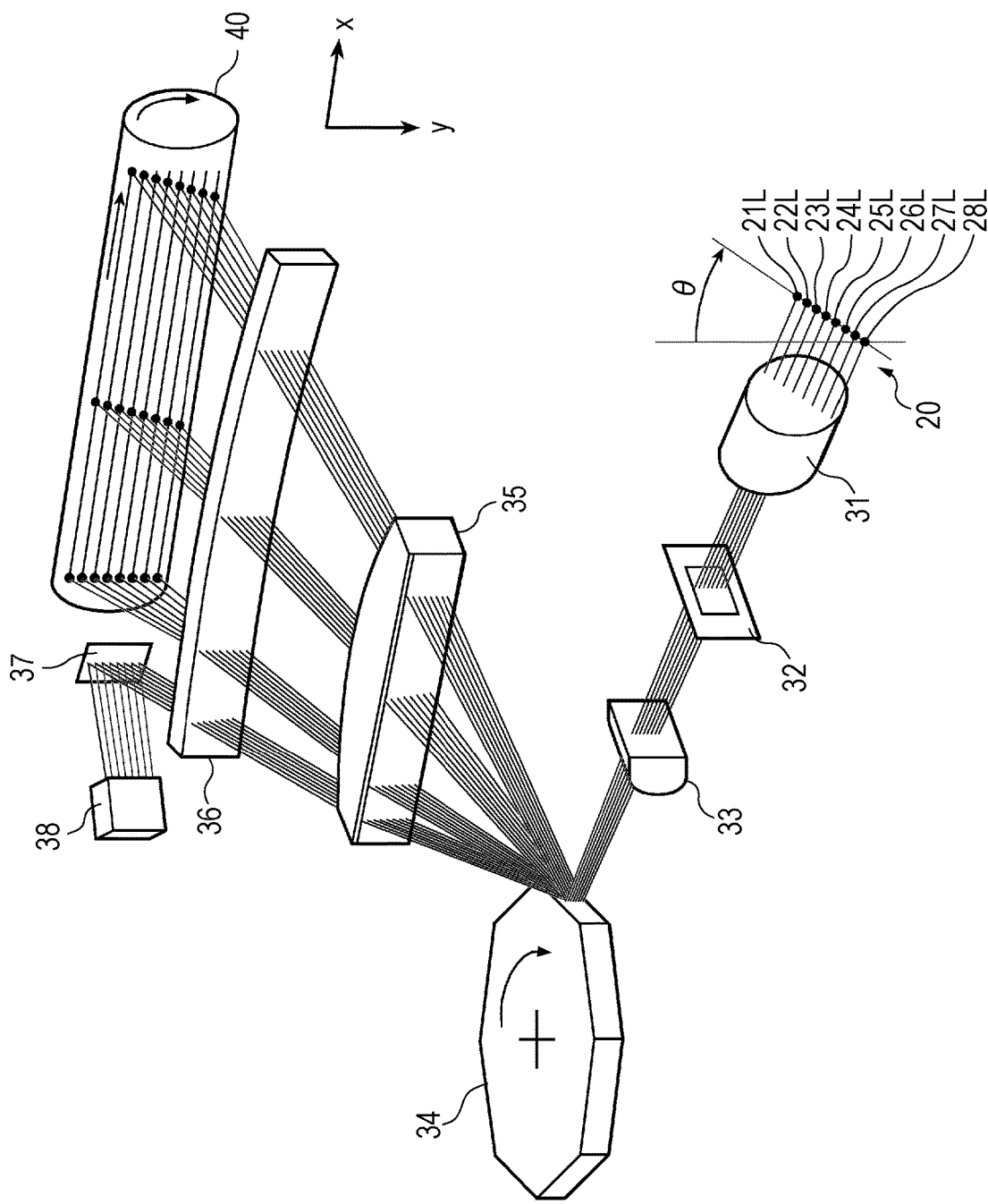
FIG. 2 is a diagram illustrating a schematic configuration of an exposurer that radiates multibeam.

FIG. 2 is a diagram illustrating a schematic configuration of the exposurer that radiates the multibeam.

As illustrated in FIG. 2, the exposurer includes a laser light source 20 (light source), a collimator lens 31, a slit 32, a cylindrical lens 33, a polygon mirror 34, an fθ lens 35, a cylindrical lens 36, a mirror 37, and a sensor 38.

The laser light source 20 includes eight light emitting elements 21L to 28L. The laser light source 20 causes the light emitting elements 21L to 28L to emit light in parallel and radiates multibeam composed of eight laser beams (light beams). The multibeam is converted to a parallel light flux by the collimator lens 31, shaped to have a predetermined spot diameter at the slit 32, and then deflected to scan a surface of a photoconductor 40 by the rotating polygon mirror 34. After a scanning speed of the deflected multibeam on the photoconductor 40 is equalized at the fθ lens 35, the multibeam is formed on the surface of the photoconductor 40 by the cylindrical lens 36.

Each of the light emitting elements 21L to 28L is, for example, a laser diode. Each of the light emitting elements 21L to 28L is inclined at an angle θ with respect to a sub-scanning direction y, and the light emitting elements 21L to 28L are arranged such that respective intervals become uniform. The sub-scanning direction y is a direction orthogonal to a main scanning direction x in which the photoconductor 40 is scanned with the laser beam. By adjusting the inclination angle θ of each of the light emitting elements 21L to 28L, the beam spacing (density) of the laser beam radiated by each of the light emitting elements 21L to 28L is adjusted and resolution of the image in the sub-scanning direction y can be changed. Further, by selecting the light emitting element to be used from among the light emitting elements 21L to 28L, the number of laser beams of the multibeam can be selected.

The image reader 19 reads the recording medium on which the image is formed by the image former 18, and generates read image data in the bitmap format.

As the image reader 19, for example, a line sensor or an area sensor can be used.

[Density Change Due to Positional Deviation of Laser Beams]

When an image is formed on the recording medium by the image forming apparatus 100, density change of the image may occur if positional deviation occurs in the laser beams of the multibeam.

Figure 3A:
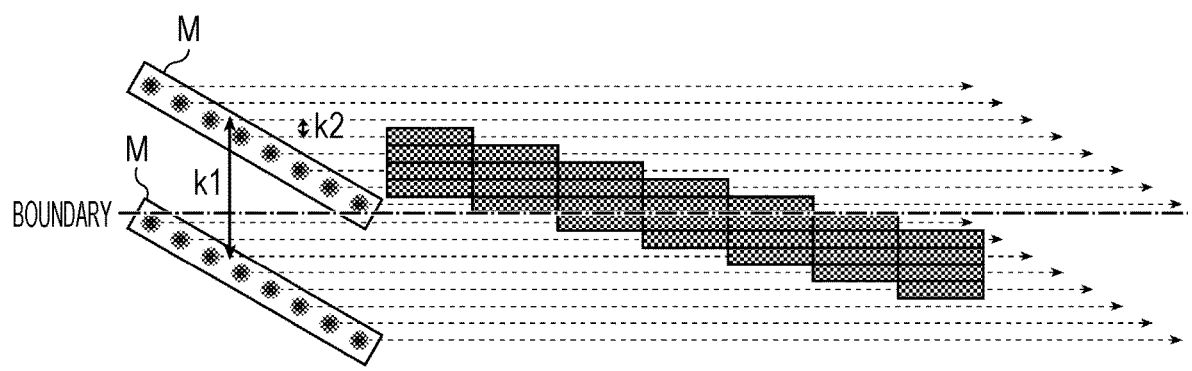
FIGS. 3A and 3B are diagrams for describing density change due to positional deviation of laser beams.
Figure 3B:
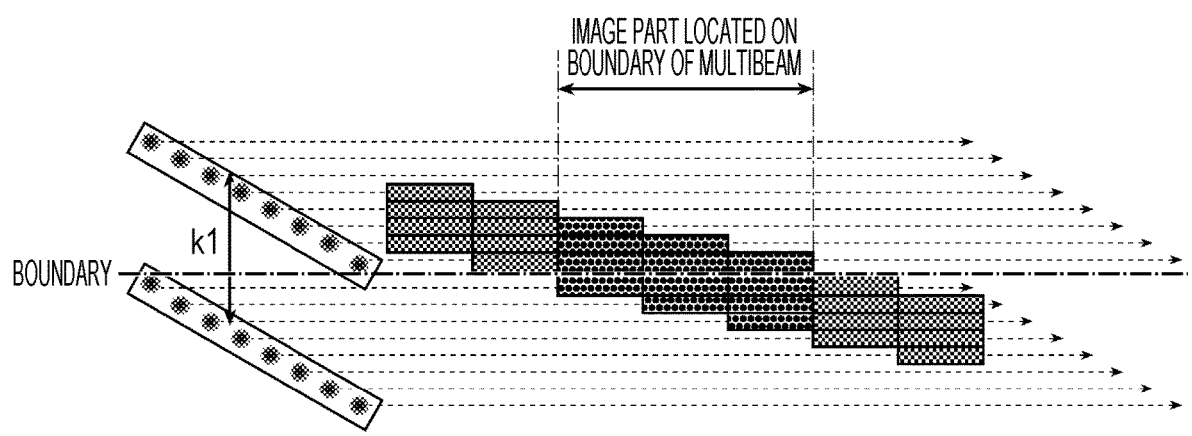

FIGS. 3A and 3B are diagrams for describing the density change due to positional deviation of the laser beams.

Between FIGS. 3A and 3B, FIG. 3A illustrates hatched images when there is no deviation in beam position. As illustrated in FIG. 3A, in a case where beam spacing k1 between a multibeam M and a multibeam M is constant, and beam spacing k2 between the laser beams is also constant, in other words, in a case where k1/(the number of multibeams)=k2 and beam positions are at equal intervals, the hatched images with constant density can be formed.

FIG. 3B illustrates hatched images when the beam positions deviate.

As illustrated in FIG. 3B, when the position of the multibeam deviates and the beam spacing k1 between the multibeam M and the multibeam M becomes wide, a line width of an image part located on a boundary of the multibeams M becomes thick and the density increases. On the contrary, when the beam spacing k1 becomes narrow, the line width becomes short and the density decreases.

If the number of the hatched images to be formed is one, such local density change is undistinguished. However, if a plurality of hatched images is formed at fixed intervals, the local density change occurs with a constant period and is sometimes observed as moiré.

Figure 4:
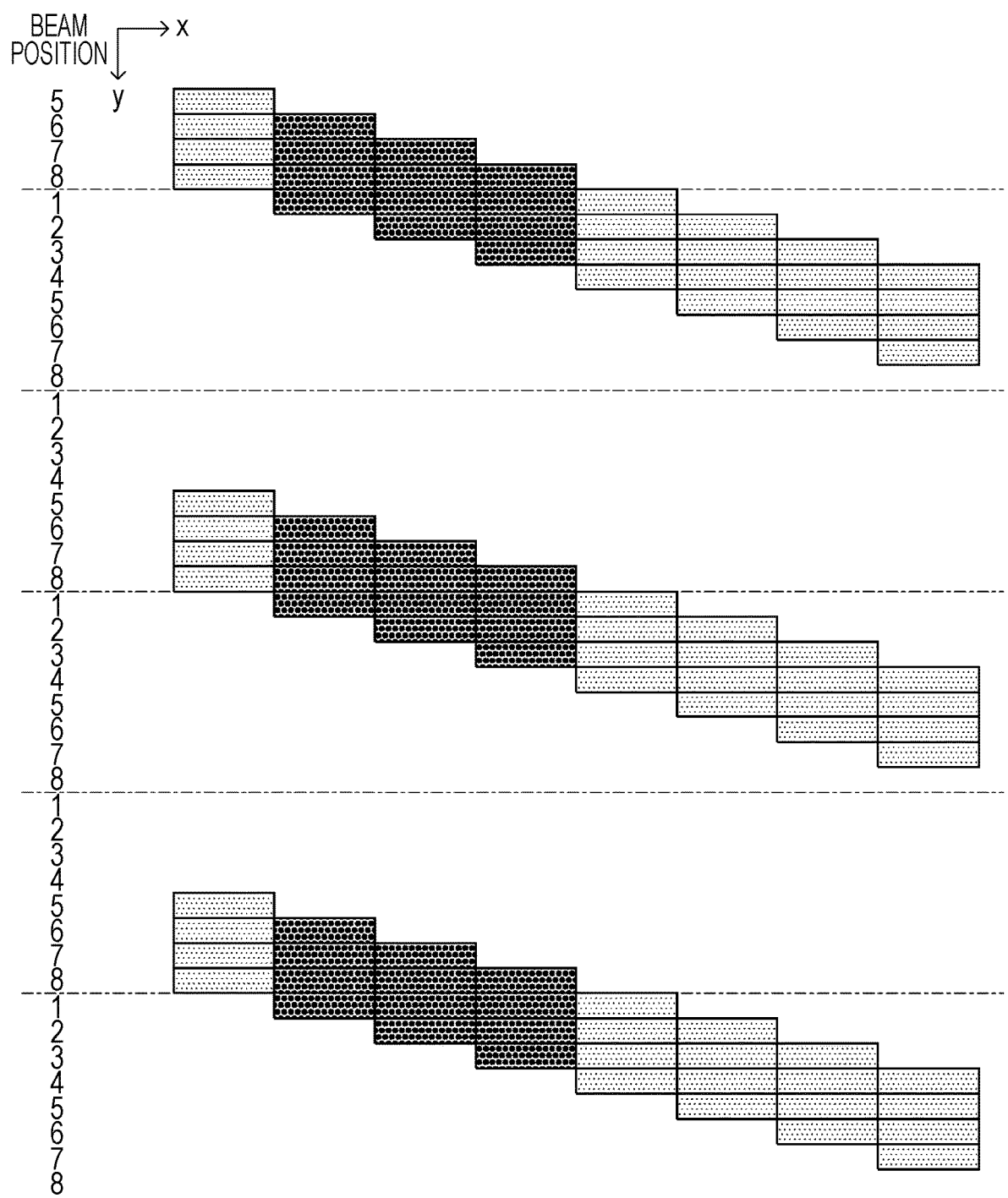
FIG. 4 is a diagram illustrating an example of moiré occurring due to deviation of beam spacing of the multibeam.

FIG. 4 is a view illustrating an example of moiré occurring due to deviation of the beam spacing of the multibeam.

As illustrated in FIG. 4, portions where the beam spacing of the multibeams is narrowed and the density has decreased are continuously appearing in an up-down direction. The portion where the density has decreased periodically appears in the hatched images and is visually recognized as moiré.

The deviation of the beam position of the laser beam forming contour pixels of an image of in particular a character or a figure greatly influences variation in the line width.

FIG. 5 is a diagram illustrating light amount distribution of laser beams when a line image with four-pixel width is formed by four laser beams.

As described above, in the electrophotographic method, the photoconductor 40 is scanned with the laser beam, a surface potential thereof is changed to cause the toner to adhere, and the toner adhesion amount is proportional to the light amount of the laser beam. The light amount equal to or larger than a fixed amount Th is necessary until the surface potential is changed and the toner begins to adhere, and a region where the light amount exceeds the fixed amount Th becomes an image region formed with the toner. In FIG. 5, the light amount corresponding to Th is illustrated by the one-dot chain line.

As illustrated in FIG. 5, when the beam position deviates, the width of the image region where the light amount exceeds the fixed amount Th is different from when the beam position does not deviate and the beam spacing is constant. Therefore, the line width of the line image varies. In the example illustrated in FIG. 5, since the beam position of the laser beam that forms the outline of the line image deviates to an outside of the line image, the line width becomes thick. However, if the line width deviates to an inside of the line image, the line width becomes thin. Although a region where the light amount does not reach the fixed amount Th may occur within the line image due to the positional deviation. However, since such a region is very narrow and the toner adheres due to toner scattering or the like, such region rarely appears as the density change. In this manner, the line width of the line image is less influenced by the deviation of the beam position inside the line image, and depends on the beam position of the laser beam forming the contour of the line image.

[Density Change Due to Multiple Exposure Effect]

In the image forming apparatus 100, the density change also occurs due to the multiple exposure effect when an image is formed on the recording medium using the multibeam, and the density unevenness may occur in the image due to the density change, in addition to the above-described density change due to the positional deviation of the laser beam.

The multiple exposure effect is a phenomenon in which the change amount of the surface potential of the photoconductor 40 becomes larger when the light energy is divided and imparted in multiple times than when the light energy is imparted in one time even if the total amount of the light energy to be imparted to the photoconductor 40 by exposure is the same, and is also called reciprocity failure.

Generally, when the surface of the photoconductor 40 charged to negative polarity is exposed with the laser beam, holes having positive polarity and electrons having negative polarity are generated in a charge generation layer inside the photoconductor 40 due to the light energy imparted by exposure. The holes are attracted to the surface of the photoconductor 40 having the negative polarity and recombined with the electrons on the surface and disappear to form an electrostatic latent image. However, not all the holes form the electrostatic latent image, and some of the holes are recombined with adjacent electrons and disappear in the charge generation layer before moving to the surface. Such recombination is more likely to occur as the number of simultaneously generated holes and electrons is larger, and lowers the exposure efficiency. The number of simultaneously generated holes and electrons increases as the amount of the simultaneously imparted light energy is larger. The number of simultaneously generated holes and electrons is smaller and the exposure efficiency is higher when the light energy of the same amount is divided and imparted in multiple times than when the light energy is imparted in one time. Therefore, the adhesion amount of the toner increases and the density of the image easily rises.

Since the light amount distribution of the laser beam is Gaussian distribution, if arrangement of the laser beams constituting the multibeam is high density or spread of the light amount distribution is large, spots of the laser beams overlap and interfere with each other in the multibeam. In a case where an electrostatic latent image of one image pattern is formed by one exposure scan using the multibeam, the light energy from the laser beams with overlapping spots is imparted in one time. In a case where an electrostatic latent image is formed by two exposure scans, the light energy of the same amount is divided into two times and imparted at different times at the boundary of the multibeam and the next multibeam. A phenomenon in which the density increases occurs in a pattern portion exposed and scanned twice, as compared with a pattern portion exposed and scanned once, by the multiple exposure effect.

Figure 6A:
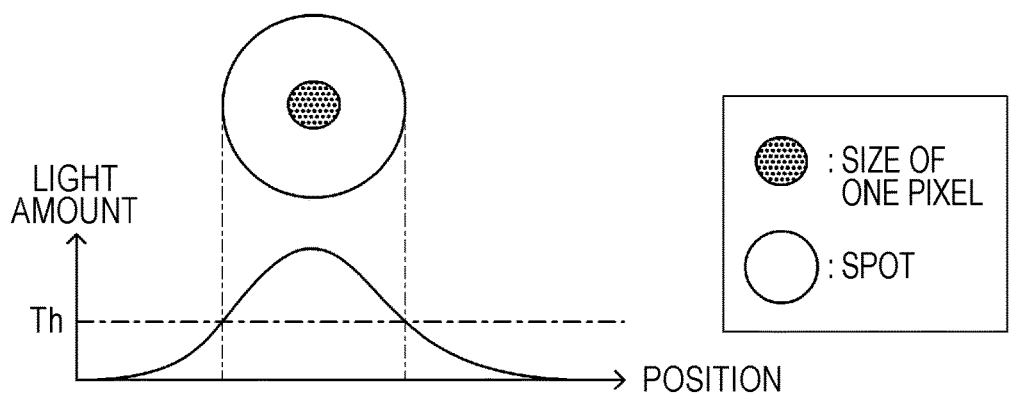
FIGS. 6A to 6C are diagrams for describing multiple exposure effect.
Figure 6B:
Figure 6C:
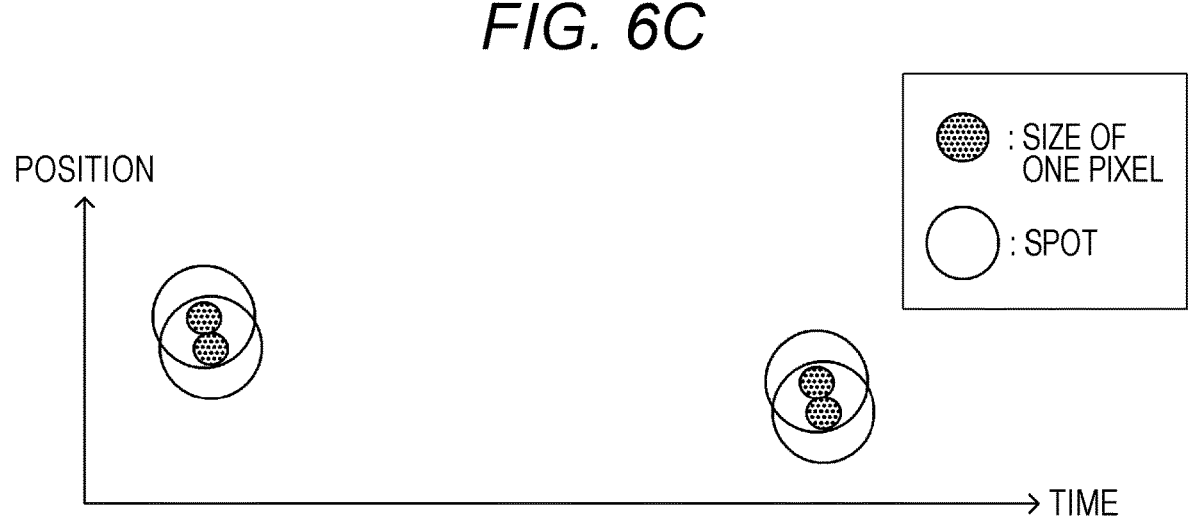

FIGS. 6A to 6C are diagrams for describing the multiple exposure effect. Among them, FIG. 6A illustrates the light amount distribution of the laser beams. Further, FIG. 6B illustrates a spot example of the laser beams when scan with multibeam is performed once and a line pattern with four-pixel width is formed. Further, FIG. 6C illustrates a spot example of the laser beams when scan with multibeam is performed twice and the same line pattern as FIG. 6A is formed.

As illustrated in FIG. 6A, the laser beam has Gaussian distribution-like light amount distribution spreading larger than the size of one pixel. The light amount equal to or larger than a fixed amount Th is necessary until the surface potential of the photoconductor 40 is changed and the toner begins to adhere, and a region having the light amount of the fixed amount Th or more is a spot region effective in image formation. In the multibeam that is a bundle of such laser beams, the spot regions of the laser beams overlap with one another, as illustrated in FIGS. 6B and 6C.

As illustrated in FIG. 6B, in the case where the line pattern with four-pixel width is formed by one exposure scan, times to impart the light energy by the four laser beams are almost the same in the pattern.

The light energy of the same amount is imparted by the four laser beams even in the case of forming the line pattern by two exposure scans. However, since the light energy to be imparted is divided into two times and is imparted with a time interval, the density rise occurs in the boundary between the pattern portion scanned first and the pattern portion scanned later by the multiple exposure effect, as illustrated in FIG. 6C.

Figure 7A:
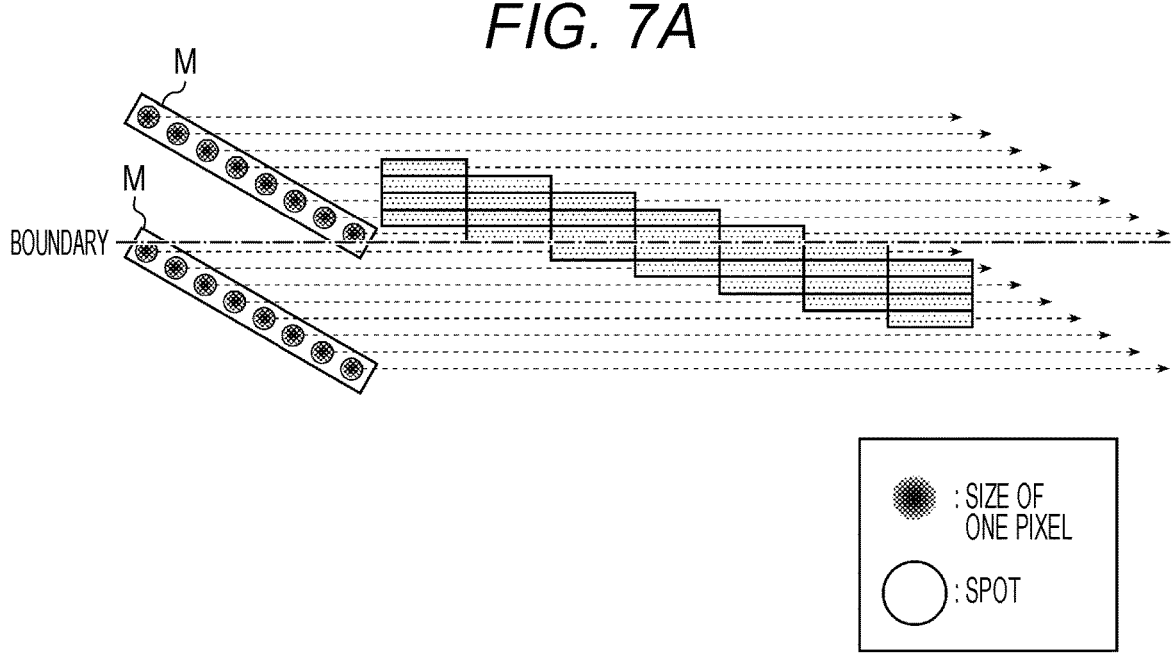
FIGS. 7A and 7B are diagrams for describing density change due to the multiple exposure effect.
Figure 7B:
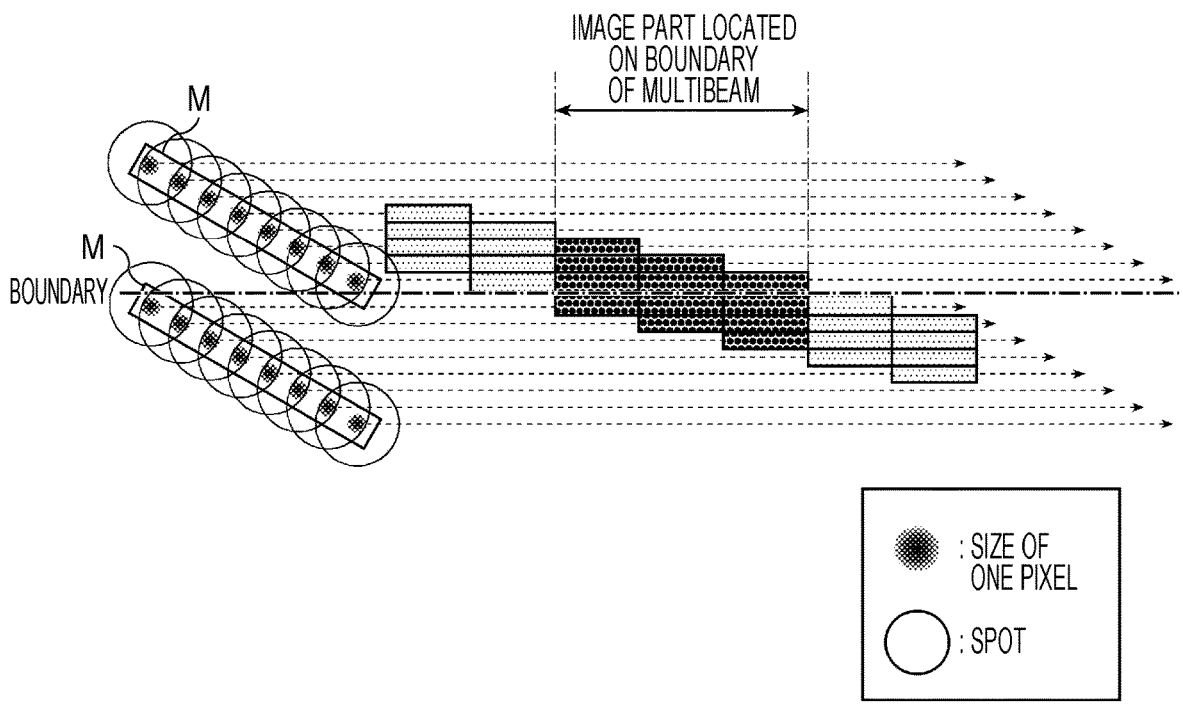

FIGS. 7A and 7B are diagrams for describing the density change due to the multiple exposure effect.

FIG. 7A illustrates a hatched pattern example formed by ideal multibeam, in which spots of the laser beams have the same size as an intended one pixel. In this case, there is no overlap of the spots of the laser beams, so there is no region to which the light energy is simultaneously imparted from the plurality of laser beams. The multiple exposure effect is not caused and the density change does not occur in the hatched pattern even if exposure scan is performed with such a multibeam M.

FIG. 7B illustrates a hatched pattern example formed with the multibeam having large spread of the light amount distribution of the laser beams. In this case, the spots of the laser beams overlap, and thus the light energy of the same amount as the light energy simultaneously imparted from the laser beams having overlapping spots in the multibeam M is divided into two times and imparted at the position of the boundary of the multibeam M and the multibeam M. Since the density at the boundary position increases due to the multiple exposure effect, a density difference occurs in the hatched pattern.

In actual exposure scenes, the light diffuses to no small extent. Therefore, the multibeam as illustrated in FIG. 7A is rarely used and the multibeam as illustrated in FIG. 7B is often used.

The density change due to the multiple exposure effect may be local and slight variation. However, in a case where the same pattern is repeatedly formed, the local density change occurs with a constant period and may be visually recognized as moiré. In other words, the moiré as illustrated in FIG. 4 can also occur by the multiple exposure effect.

As illustrated in FIG. 4, in the ladder pattern in which the plurality of hatched patterns is repeatedly arranged with a constant period, a portion where the density increases in the boundary of the multibeams continuously appears in the sub-scanning direction y. This density increase portion periodically appears in the main scanning direction x as well and is observed as moiré.

The image forming apparatus 100 according to the present embodiment corrects the gradation value of each pixel in the image data regarding an image to be recorded to suppress the density unevenness (density difference) due to the positional deviation of the laser beams and the density unevenness due to the multiple exposure effect by the beam corrector A3.

[Configuration of Beam Corrector A3]

Figure 8:
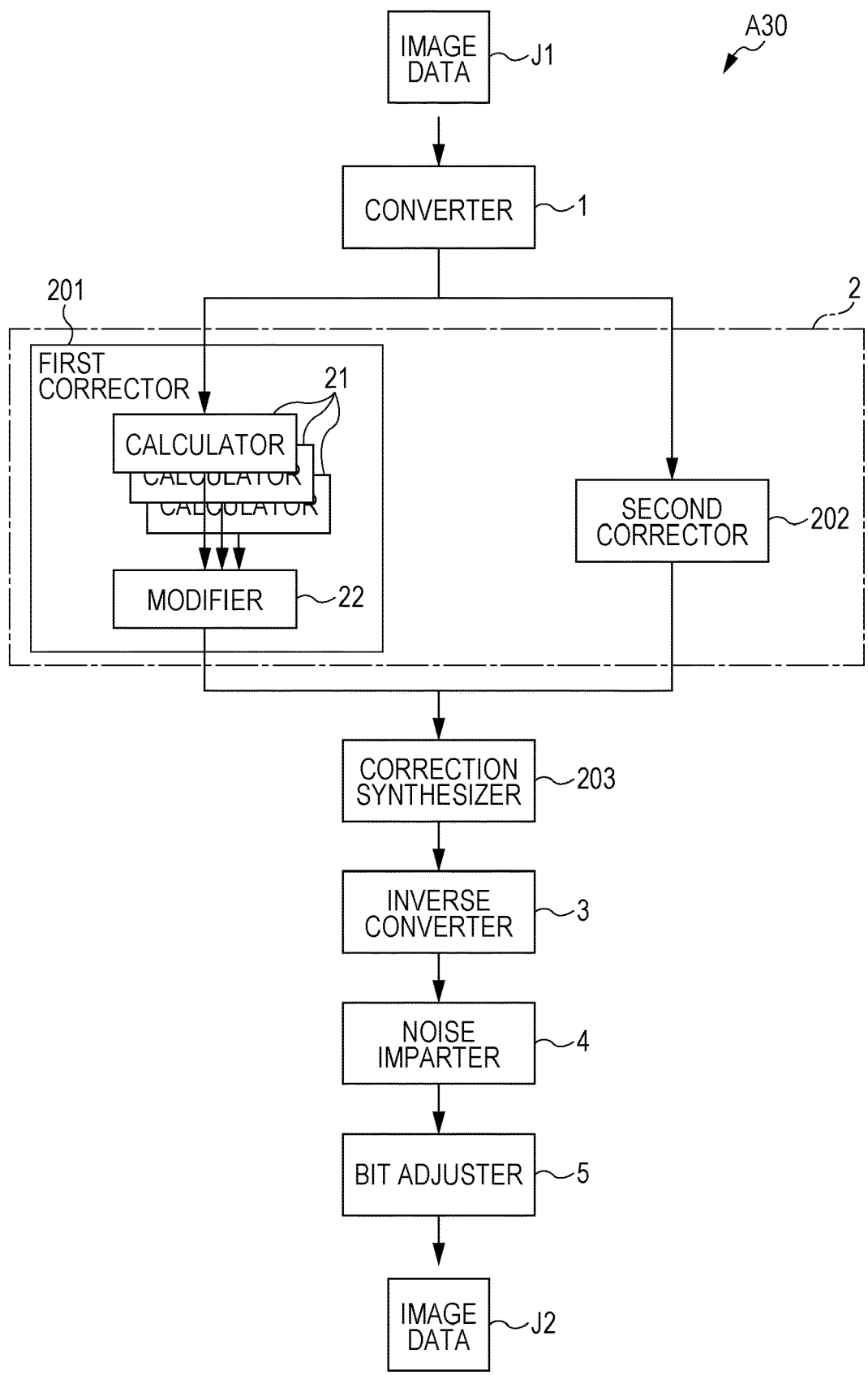
FIG. 8 is a block diagram illustrating a functional configuration of a the beam corrector.

FIG. 8 is a block diagram illustrating a functional configuration of the beam corrector A3.

As illustrated in FIG. 8, the beam corrector A3 includes a converter 1, a corrector 2, an inverse converter 3, a noise imparter 4, and a bit adjuster 5.

The beam corrector A3 corrects each pixel of image data J1 and outputs corrected data as image data J2. The image data J1 and J2 have the resolution of 1200 dpi, and each pixel has a four-bit, that is, 0 to 15 gradation value. Note that the resolution is an example and is not limited to the example. For example, the resolution may be different between the main scanning direction x and the sub-scanning direction y, such as 1200 dpi in the main scanning direction x and 2400 dpi in the sub-scanning direction y, or the like.

The converter 1 converts an input four-bit gradation value of each pixel into a nine-bit gradation value. Further, the converter 1 converts the gradation value of each pixel with a gradation characteristic in which change in the gradation value of the image data by correction processing described below and change in the density of the image formed on the recording medium has an approximate linear relationship.

The corrector 2 includes a first corrector 201 that corrects the density unevenness caused by the positional deviation of the laser beams, a second corrector 202 that corrects the density unevenness caused by the multiple exposure effect, and a correction synthesizer 203. The corrector 2 synthesizes results of correction by the first corrector 201 and the second corrector 202 in the correction synthesizer 203 and outputs corrected image data to the inverse converter 3. A specific correction method by the first corrector 201 and the second corrector 202 will be described in detail below.

The inverse converter 3 converts the gradation value of each pixel corrected by the corrector 2 to have an inverse gradation characteristic to the gradation characteristic of conversion by the converter 1.

The noise imparter 4 adds a five-bit noise value based on a dither matrix to the nine-bit gradation value of each pixel output from the inverse converter 3 to impart a noise. By addition of the noise, minute change in the gradation value by correction can be reproduced even if the number of bits is reduced after correction.

The method of imparting the noise is not limited to the above example. For example, various existing processes for generating a five-bit pseudo random number may be used instead of the dither matrix.

The bit adjuster 5 bit-shifts the nine-bit gradation value of each pixel of the image data output by the noise imparter 4 and extracts and outputs higher four bits.

[Correction by First Corrector 201]

Next, a method of correcting the density unevenness caused by the positional deviation of the laser beams by the first corrector 201 will be described.

As illustrated in FIG. 8, the first corrector 201 includes three calculators 21 and a modifier 22.

The three calculators 21 input the image data converted by the converter 1 in units of 1×5 pixels, extract 1×3 pixels centered on an adjacent pixel located before a pixel of interest (located above in FIG. 9 described below), 1×3 pixels centered on the pixel of interest, and 1×3 pixels centered on an adjacent pixel located after the pixel of interest (located below in FIG. 9 described below) from the input 1×5 pixels, respectively, and calculate the gradation values after correction of center pixels of the 1×3 pixels.

The modifier 22 modifies the gradation value after correction of the pixel of interest, using the gradation values after correction of the pixel of interest and the adjacent pixels before and after the pixel of interest, which have been calculated by the calculators 21.

Figure 9:
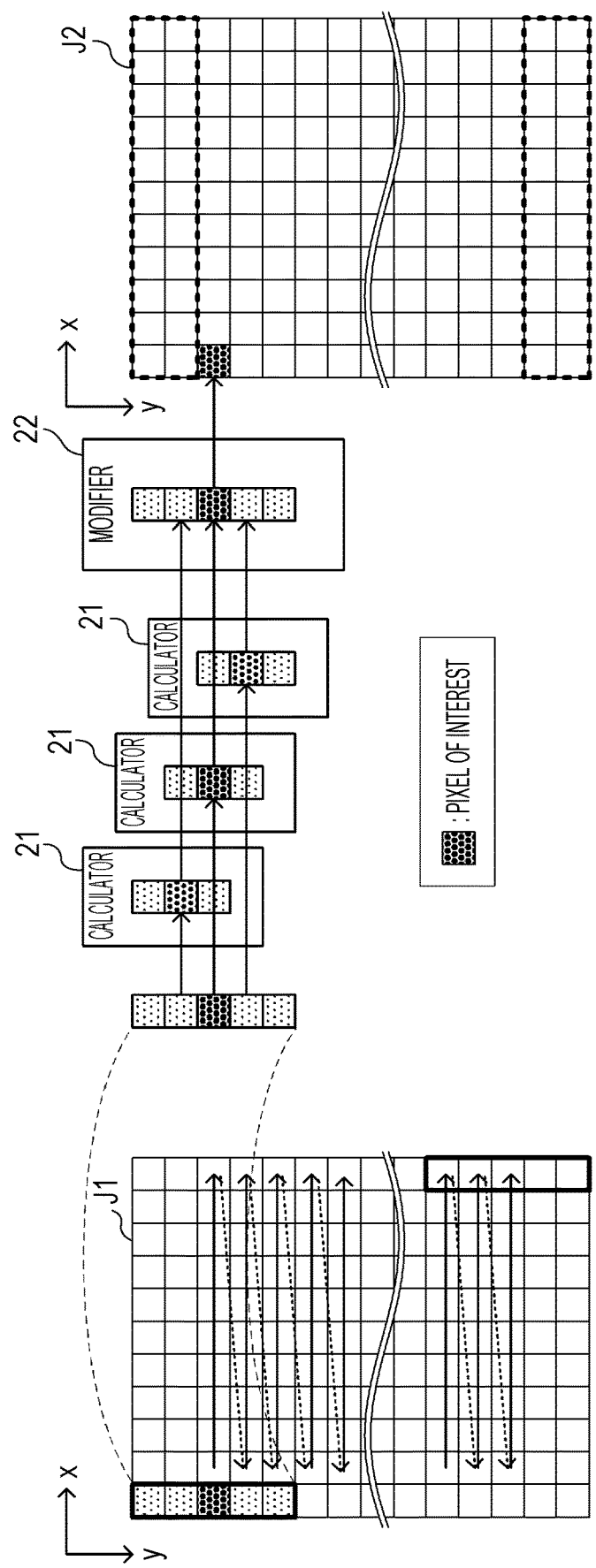
FIG. 9 is a diagram illustrating 1×5 pixels that is an input unit of a first corrector.

FIG. 9 is a diagram illustrating the 1×5 pixels that is the input unit of the first corrector 201.

As illustrated in FIG. 9, the first corrector 201 shifts the position of an observation window of 1×5 pixels in the main scanning direction x by one pixel at a time from 1×5 pixels including a pixel at a starting point of the image data J1 to 1×5 pixels including a pixel at an end point, and shifts the observation window in the sub-scanning direction y by one pixel at a time when reaching the end in the main scanning direction x, and repeats input.

The calculators 21 extract the 1×3 pixels centered on the pixel of interest and the adjacent pixels before and after the pixel of interest from the input 1×5 pixels, and calculate gradation values after correction of the pixel of interest and the adjacent pixels before and after the pixel of interest. The modifier 22 modifies the gradation value after correction of the pixel of interest by inputting the gradation values after correction of the pixel of interest and the adjacent pixels before and after the pixel of interest, which have been calculated by the calculators 21. The corrected pixel of interest is output as the image data J2 after modification through the processes in the correction synthesizer 203, the inverse converter 3, the noise imparter 4, and the bit adjuster 5 illustrated in FIG. 8. Note that the pixel located in the center of 1×5 pixels is a pixel to be corrected as the pixel of interest. Therefore, two lines on both ends in the sub-scanning direction y of the image data J2 after correction are not corrected and the original pixels are output as they are.

Figure 10:
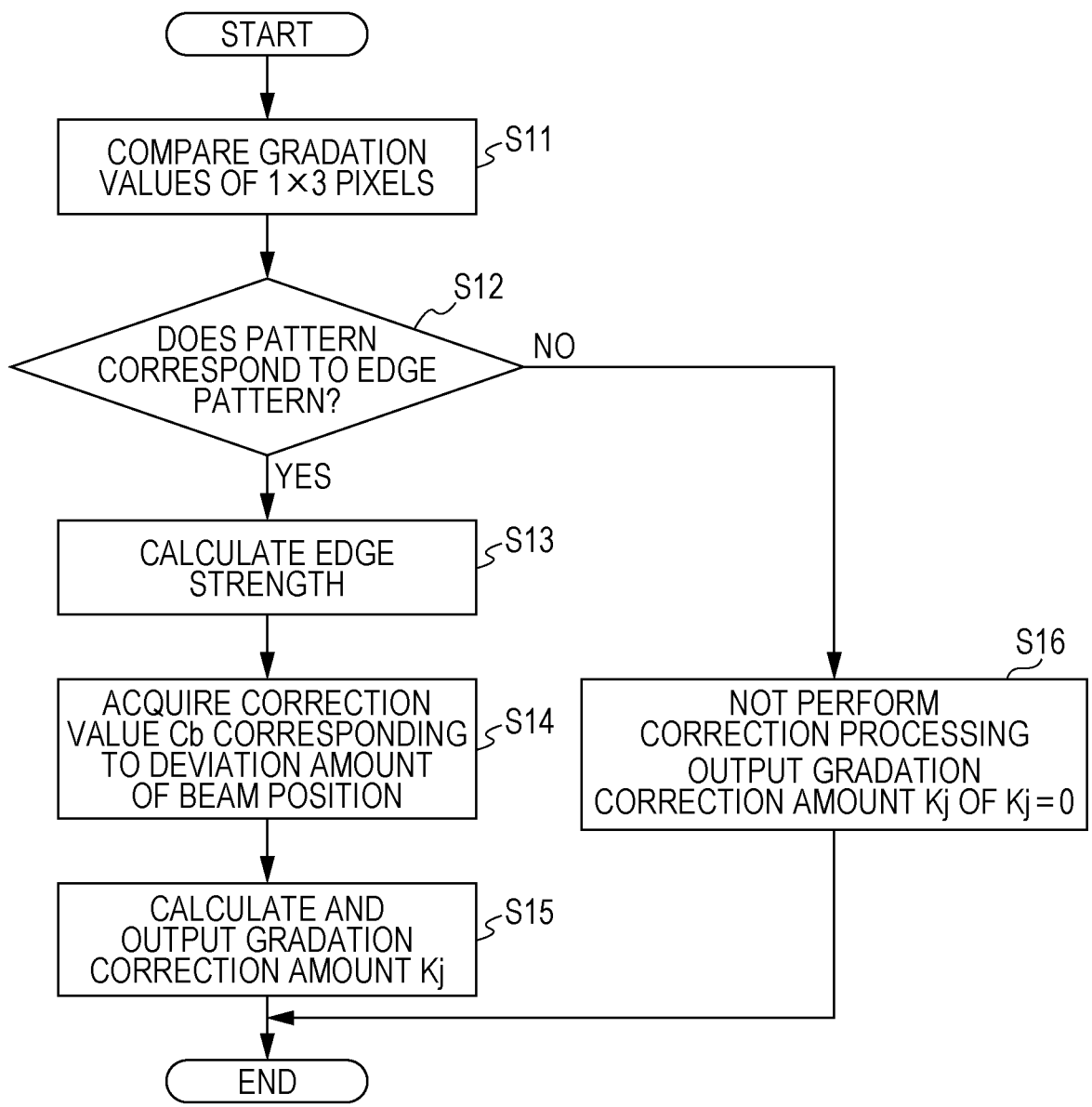
FIG. 10 is a flowchart illustrating a specific processing procedure of a calculator.

FIG. 10 is a flowchart illustrating a specific processing procedure of the calculator 21.

The calculator 21 compares the gradation values of the input 1×3 pixels (step S11).

In a case where the pattern corresponds to either an edge pattern Pe1 or an edge pattern Pe2 below (step S12: Y), the calculator 21 detects an edge having the pixel located in the center of the 1×3 pixels as a contour pixel of an object, and calculates edge strength ΔL (step S13). The object refers to a foreground pattern such as a character, a figure, a photograph, or the like.

Figure 11:
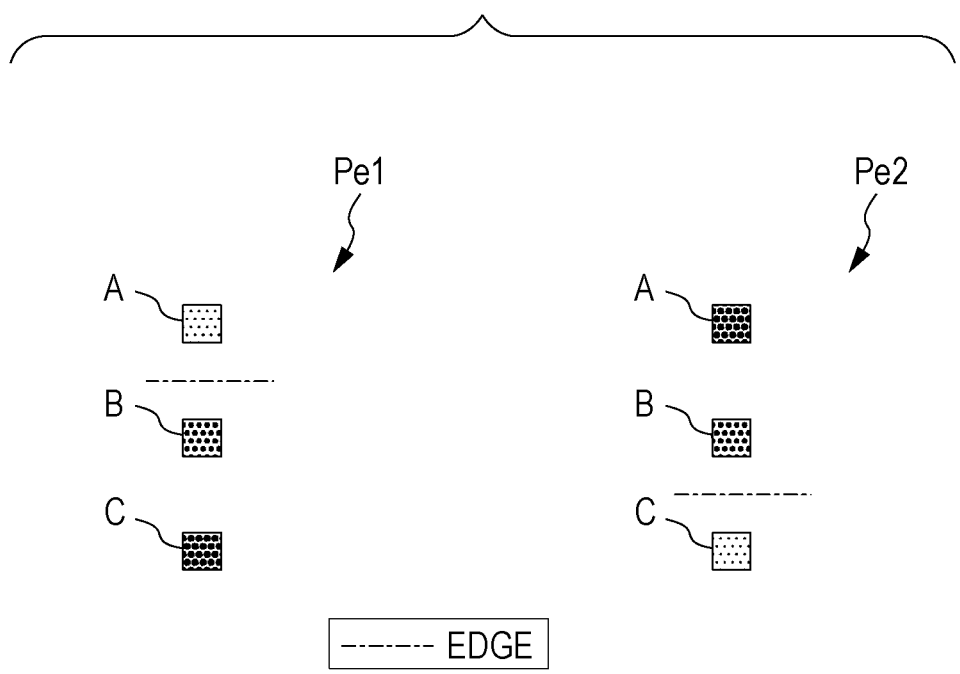
FIG. 11 is a diagram illustrating edge patterns of 1×3 pixels.

FIG. 11 is a diagram illustrating the edge patterns Pe1 and Pe2 of 1×3 pixels.

As illustrated in FIG. 11, when the gradation values of pixels A to C of 1×3 pixels are represented by D [A] to D[C], the edge pattern Pe1 is a pattern that satisfies D [A]<D[B] ≤D[C], and the edge pattern Pe2 is a pattern that satisfies D[C]<D[B]≤D[A]. In the case where the pattern corresponds to the edge pattern Pe1, the edge is located between the pixel A and the pixel B, and in the case where the pattern corresponds to the edge pattern Pe2, the edge is located between the pixel B and the pixel C. In both the patterns Pe1 and Pe2, the pixel B is the contour pixel of the object.

The deviation of the beam position does not influence on an image having the line width of 1 pixel, and an image having the line width of 2 pixels or more has a possibility of occurrence of the density change due to the deviation of the beam position. The edge patterns Pe1 and Pe2 are patterns of gradation values of two pixels of the object and one pixel of the background of the object. By performing correction only when the pattern corresponds to the edge patterns Pe1 and Pe2, the image having the line width of one pixel can be excluded from the object to be corrected.

Since the edge strength ΔL is a difference between the gradation value of the contour pixel of the object and the gradation value of the pixel of the background of the object adjacent to the contour pixel, the edge intensity ΔL can be calculated by the following equation (1) in the case of the edge pattern Pe1, and the edge intensity ΔL can be calculated by the following equation (2) in the case of the edge pattern Pe2.

$$\Delta L = |D[B] - D[A]| \quad (1)$$

$$\Delta L = |D[B] - D[C]| \quad (2)$$

Next, the calculator 21 identifies a beam position n (an ordinal number indicating an array number of the laser beam in the multibeam) of the laser beam that forms the pixel B located in the center of the 1×3 pixels, and acquires a correction value Cb[n] (first correction value) corresponding to a deviation amount of the identified beam position n from a resistor or the like (step S14). The magnitude of a coefficient value of the correction value Cb[n] is determined in proportion to the deviation amount of the beam position n of each laser beam from a reference position. Further, the correction value Cb[n] has positive and negative signs, and the correction value Cb[n] with a positive sign is set when the beam position n deviates to the inside of the object, and the correction value Cb[n] with a negative sign is set when the beam position n deviates to the background side. A method of calculating the correction value Cb will be described in detail below.

The calculator 21 calculates a gradation correction amount Kj of the gradation value of the pixel B located in the center of the 1×3 pixels, using the acquired correction value Cb[n] and the edge strength ΔL (step S15).

The calculator 21 can calculate the gradation correction amount Kj of the gradation value of the pixel B located in the center of the 1×3 pixels by the following equation (3). By use of the gradation correction amount Kj, a gradation value D*[B] with corrected correction unevenness caused by the positional deviation of the laser beam can be calculated as illustrated in the following equation (4).

$$Kj = w[n] \times \Delta L \quad (3)$$

$$D^*[B] = D[B] + Kj \quad (4)$$

As illustrated in FIG. 5, the line width of the object depends on the beam position of the laser beam in the contour pixel. The line width becomes thicker as the beam position deviates to the background of the line pattern. Conversely, the line width becomes shorter as the beam position deviates to the inside of the line pattern. Although the density change due to the variation of the line width becomes larger as the edge strength ΔL becomes larger, the correction value Cb[n] to be added to the original gradation value D[B] can be adjusted to make the gradation correction amount Kj large according to the edge strength ΔL, according to the above equation (3).

Figure 12:
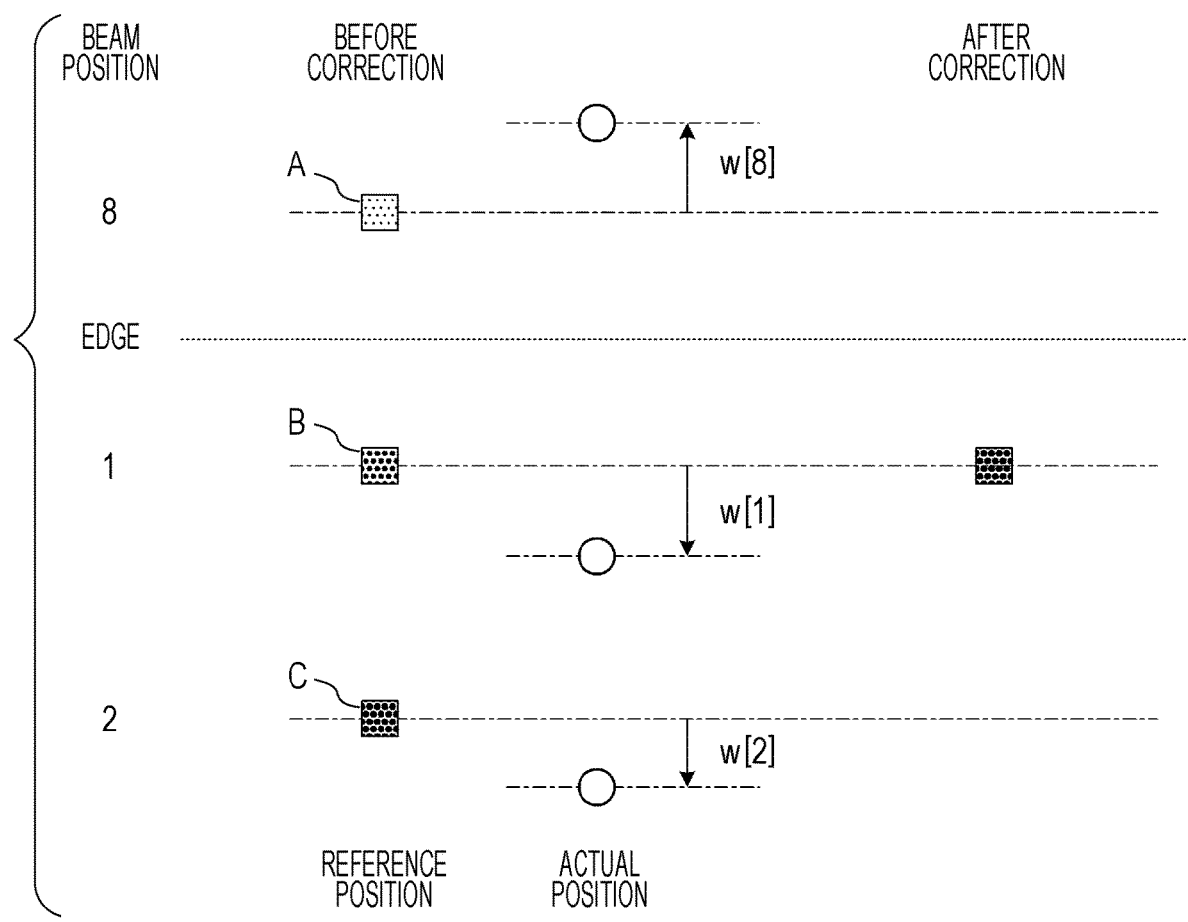
FIG. 12 is a diagram illustrating a correction example of a case where a pattern of a gradation value corresponds to the edge pattern.

FIG. 12 is a diagram illustrating a correction example of a case where the pattern of the gradation values of the pixels A, B, and C corresponds to the edge pattern Pe1.

In the case where the pattern corresponds to the edge pattern Pe1, the pixels B and C are pixels of the object, the pixel A is the background pixel of the object, and the edge is located between the pixel A and the pixel B.

As illustrated in FIG. 12, when a beam position 1 of the laser beam modulated according to the gradation value of the contour pixel B deviates from the reference position to the inside of the object, the line width of the object becomes narrow.

In this case, the calculator 21 acquires a positive correction value Cb[1], and a positive gradation correction amount Kj obtained by multiplying the positive correction value Cb[1] by the edge strength ΔL is added to the original gradation value D [B]. Therefore, the gradation value of the pixel B can be increased by correction. Thereby, the light amount of the laser beam in the pixel B increases, and the original line width can be reproduced.

Conversely, in a case where the beam position 1 of the laser beam of the contour pixel B deviates from the reference position to the background side, the line width of the object becomes thick. In this case, the calculator 21 acquires a negative correction value Cb[1], and a negative gradation correction amount Kj obtained by multiplying the negative correction value Cb[1] by the edge strength ΔL is added to the original gradation value D [B]. Therefore, the gradation value of the pixel B can be decreased by correction. Thereby, the light amount of the laser beam in the pixel B decreases, and the original line width can be reproduced.

On the other hand, in a case where the pattern does not correspond to both the edge patterns Pe1 and Pe2 (step S12: N), the calculator 21 outputs the gradation correction amount Kj of the pixel located in the center of the 1×3 pixels as Kj=0 without performing the correction processing (step S16).

In a case where the gradation value after correction of the pixel of interest exceeds a maximum value, the modifier 22 rounds down the excess value to obtain the maximum value. In a case where the gradation value after correction of the adjacent pixel adjacent to the pixel of interest via the edge exceeds the maximum value, the modifier 22 adds the excess gradation value to the gradation value of the pixel of interest.

Specifically, as illustrated in FIG. 9, as for the three central pixels of the 1×5 pixels input to the first corrector 201, the modifier 22 arranges three pixels with corrected gradation values according to the above equation (4) using the gradation correction amount Kj to reconstruct 1×5 pixels. Two pixels at both ends of the reconstructed 1×5 pixels remain as original pixels. The modifier 22 compares the gradation values of the 1×5 pixels, and determines whether the pattern of the gradation values corresponds to a pattern to be modified.

Figure 13:
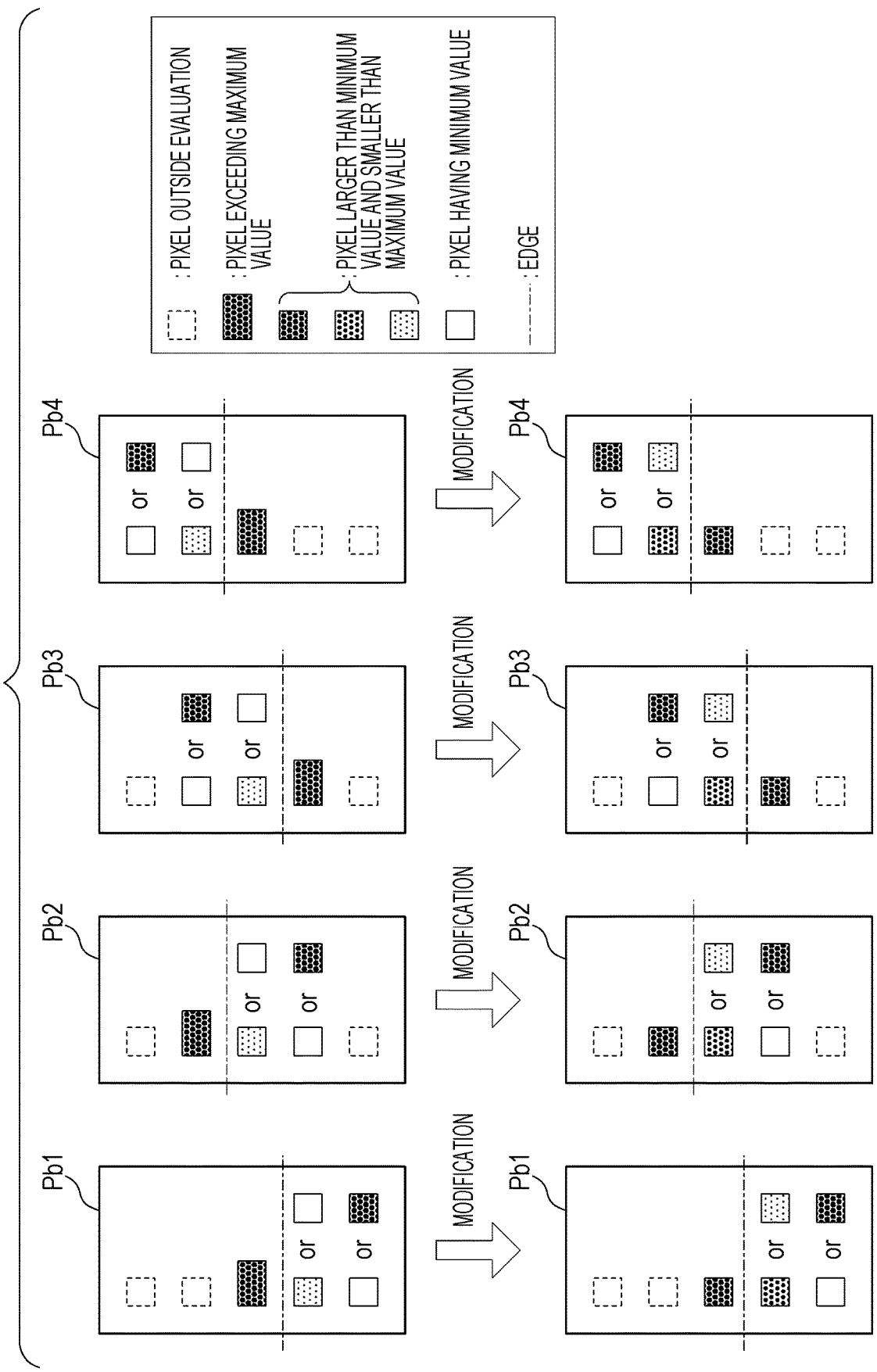
FIG. 13 is a diagram illustrating patterns to be modified.

FIG. 13 is a diagram illustrating patterns to be modified Pb1 to Pb4.

As illustrated in FIG. 13, the patterns to be modified Pb1 to Pb4 are patterns in which the gradation value of the pixel of interest or the gradation value of the pixel adjacent to the pixel of interest via the edge exceeds the maximum value by correction. The modifier 22 determines whether the pattern corresponds to the patterns Pb1, Pb2, Pb3, and Pb4 in this order.

In a case where the pattern corresponds to any of the patterns to be modified Pb1 to Pb4, the modifier 22 modifies the gradation value after correction of the pixel of interest and outputs the modified value. As illustrated in FIG. 13, in the case where the pattern corresponds to the pattern to be modified Pb1 or Pb4, the modifier 22 rounds down the gradation value of the excess part exceeding the maximum value to make the gradation value of the pixel of interest be the maximum value because the gradation value of the pixel of interest exceeds the maximum value. Further, in the case where the pattern corresponds to the pattern to be modified Pb2 or Pb3, the modifier 22 adds the gradation value of the excess part exceeding the maximum value to the gradation value of the pixel of interest because the gradation value of the pixel adjacent to the pixel of interest via the edge exceeds the maximum value.

[Correction by Second Corrector 202]

Next, a method of correcting the density unevenness caused by the multiple exposure effect by the second corrector 202 will be described.

The second corrector 202 detects an image pattern where the boundary of the multibeam is located from the image data J1 input in units of 1×7 pixels, determines the pixel in the detected image pattern as the pixel to be corrected, and increases/decreases the gradation value of the pixel to be corrected. The second corrector 202 determines a gradation correction amount according to a sum of the gradation values of a pixel group located in the same multibeam as the pixel to be corrected.

Figure 14:
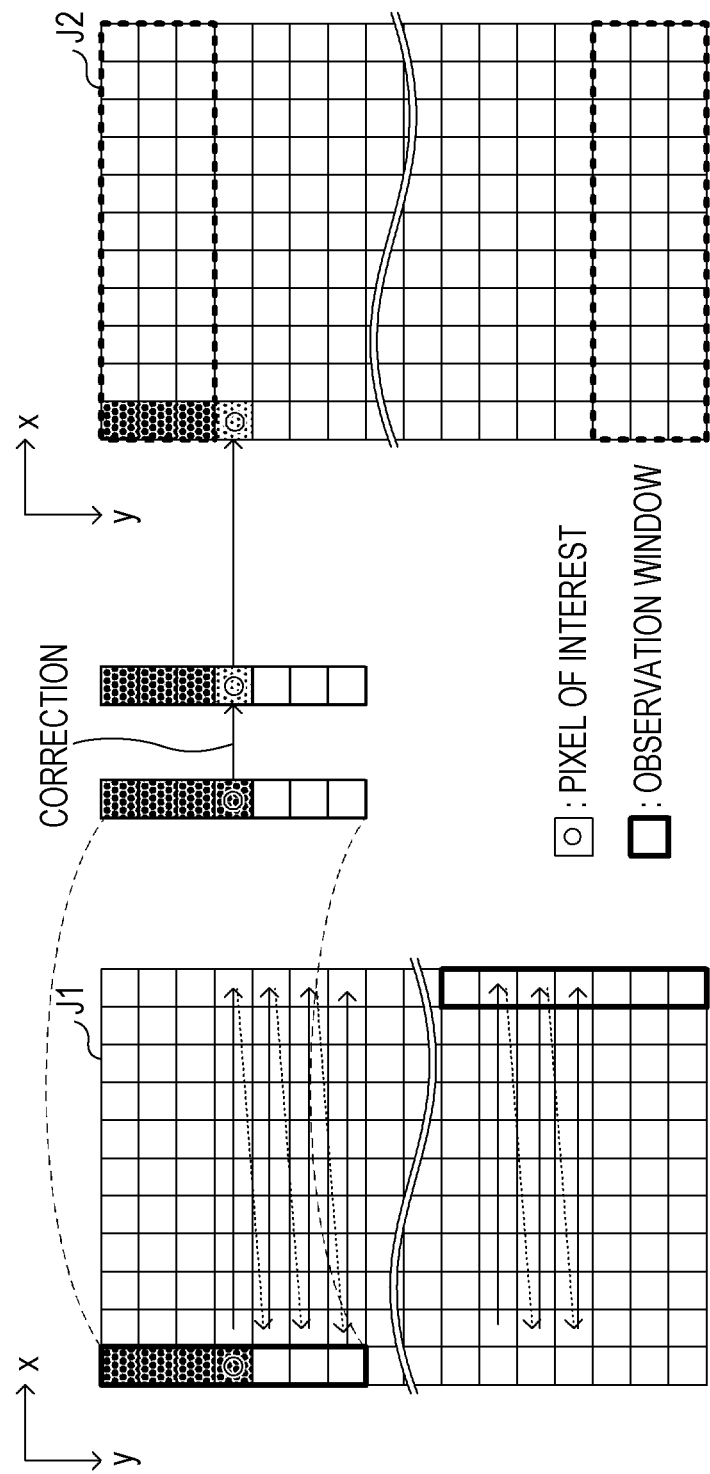
FIG. 14 is a diagram illustrating 1×7 pixels as an input unit of a second corrector.

FIG. 14 is a diagram illustrating 1×7 pixels as an input unit of the second corrector 202.

As illustrated in FIG. 14, the second corrector 202 shifts the position of an observation window of 1×7 pixels in the main scanning direction x by one pixel at a time from 1×7 pixels including a pixel at a starting point of the image data J1 to 1×7 pixels including a pixel at an end point, and shifts the observation window in the sub-scanning direction y by one pixel at a time when reaching the end in the main scanning direction x, and repeats input.

The second corrector 202 collates the input 1×7 pixels with a template in which an image pattern including the boundary of the multibeam is determined, using the pixel of interest located in the center of the 1×7 pixels as the pixel to be corrected, thereby to detect the image pattern where the boundary of the multibeam is located and determine the pixel to be corrected. The second corrector 202 corrects the determined pixel to be corrected, that is, the pixel of interest. Note that the pixel located in the center of 1×7 pixels is the pixel to be corrected. Therefore, three lines on both ends in the sub-scanning direction y of the image data J2 after correction are not corrected and the original pixels are output as they are.

Figure 15:
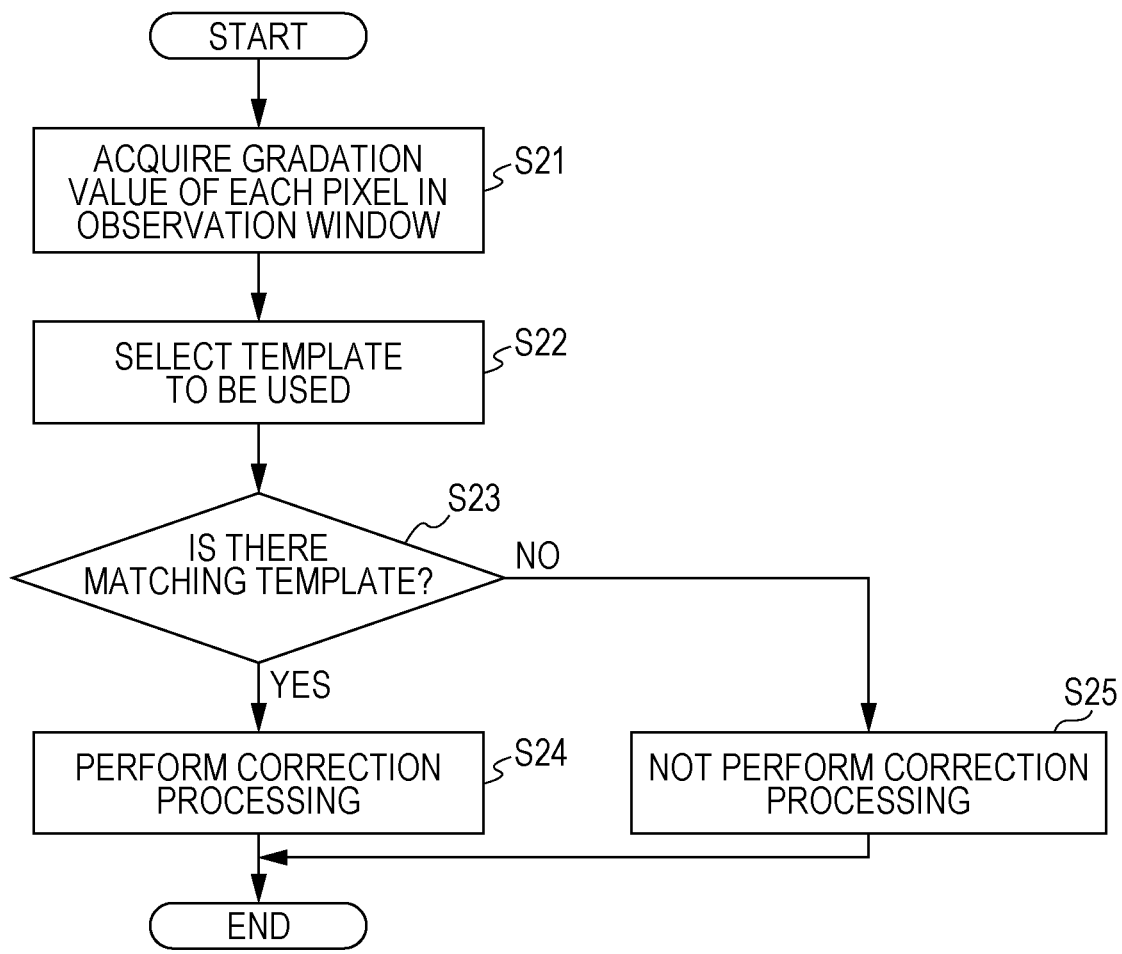
FIG. 15 is a flowchart illustrating a specific processing procedure of the second corrector.

FIG. 15 is a flowchart illustrating a specific processing procedure of the second corrector 202.

As illustrated in FIG. 15, the second corrector 202 acquires each gradation value of the input 1×7 pixels (step S21). Next, the second corrector 202 selects a plurality of templates to be used for collation (step S22), and collates the input 1×7 pixels with each of the selected templates. The template may be held in a memory such as a register or the storage 12 and a necessary template may be acquired.

Figure 16:
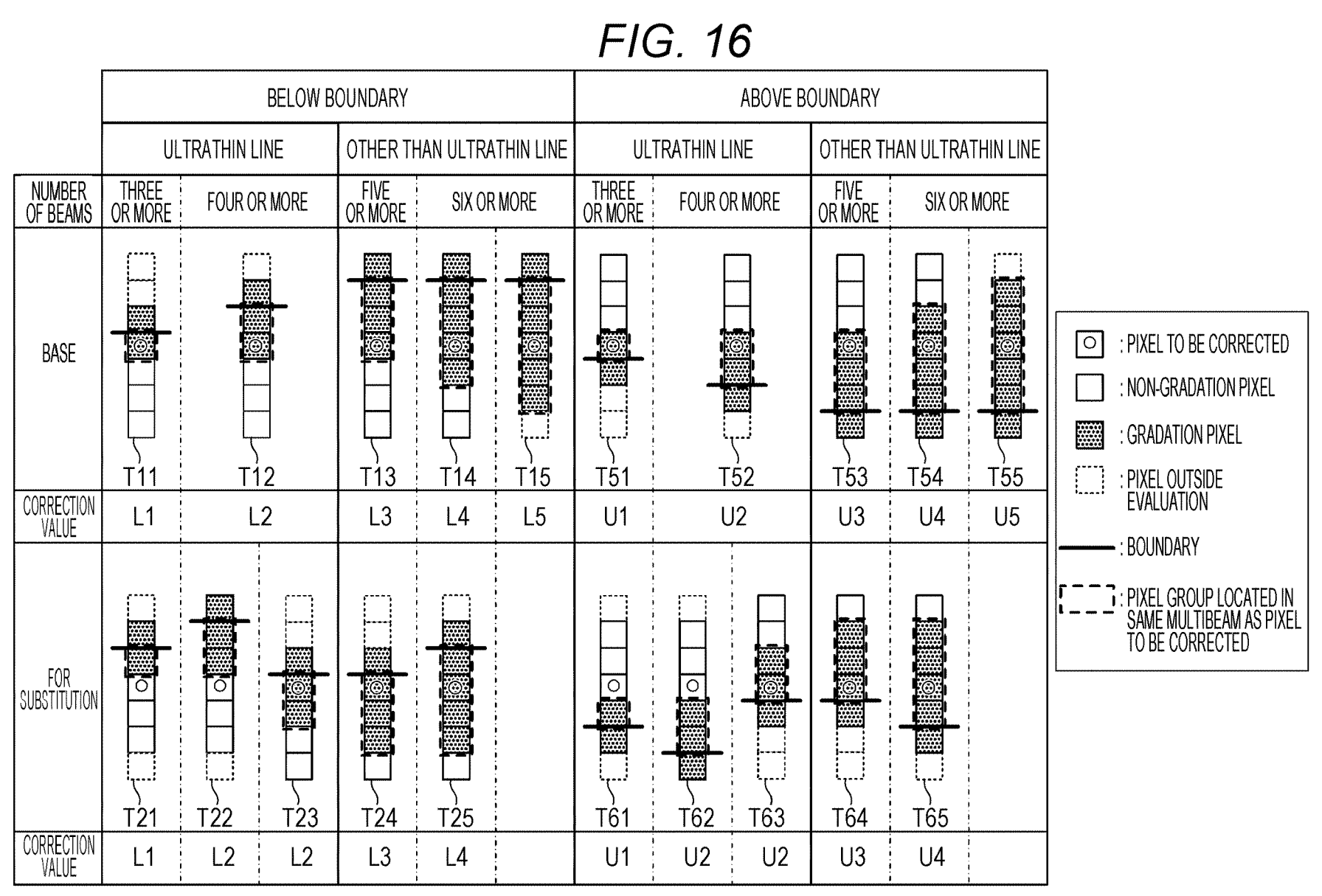

FIG. 16 is a diagram illustrating an example of the template used for correction by the second corrector 202.

In each of the templates illustrated in FIG. 16, a gradation pixel of the image pattern where the boundary of the multibeam is located and a non-gradation pixel of the background of the image pattern are determined in the 1×7 pixels. Further, a pixel located in the center of the 1×7 pixels is determined as the pixel to be corrected. The gradation pixel is a pixel having a gradation value larger than a minimum value, and the non-gradation pixel is a pixel having a gradation value that is the minimum value. When there is a template having the same positions of the input 1×7 pixels and the gradation pixel and the non-gradation pixel, the input 1×7 pixels can be determined to match the template. Note that a pixel outside evaluation in the template is a pixel that can be the gradation pixel or the non-gradation pixel.

As illustrated in FIG. 16, templates T11 to T15 are templates in which the pixel to be corrected is located below the boundary of the multibeam. In the templates T11 and T12 among the templates, the pixel group located in the same multibeam as the pixel to be corrected is an ultrathin line having one or two-line width (the resolution is 1200 dpi). In all the templates T11 to T15, the pixel to be corrected is located on an outline side of the image pattern with respect to the boundary of the multibeam.

Templates T21 to T25 are templates that can be selected in place of the templates T11 to T14. In the templates T21 and T22, the pixel to be corrected is located in the adjacent pixel outside the image pattern, that is, the outline of the background. In the templates T23 to T25, the pixel to be corrected is located on the boundary side of the multibeam with respect to the outline of the image pattern, as compared with the templates T12 to T14.

Templates T51 to T55 are templates in which the pixel to be corrected is located above the boundary of the multibeam. The templates T51 to T55 are similar to the templates T11 to T15 except that the position of the image pattern is inverted. Templates T61 to T65 are templates that can be selected in place of the templates T51 to T54, and similarly, the position of the image pattern is inverted to the templates T21 to T25.

Any of correction values L1 to L5 is set corresponding to each of the templates T11 to T15 and T21 to T25, and any of correction values U1 to U5 is set corresponding to each of the templates T51 to T55 and T61 to T65. Specifically, the correction values L1 and U1 are respectively set to the templates T11 and T21 and the templates T51 and T61 where the number of pixels (the number of gradation pixels) in the image pattern from the boundary of the multibeam is 1, the correction values L2 and U2 are respectively set to the templates T12, T22, and T23 and the templates T52, T62, and T63 where the number of pixels is 2, the correction values L3 and U3 are respectively set to the templates T13 and T24 and the templates T53 and T64 where the number of pixels is 3, the correction values L4 and U4 are respectively set to the templates T14 and T25 and the templates T54 and T65 where the number of pixels is 4, and the correction values L5 and U5 are respectively set to the template T15 and the template T55 where the number of pixels is 5 or more.

Hereinafter, in a case where the correction values L1 to L5 are not distinguished from one another, the correction values L1 to L5 are described as correction value L. In a case where the correction values U1 to U5 are not distinguished from one another, the correction values U1 to U5 are described as correction value U. These correction values L and U correspond to the second correction value.

In a case where there is a matching template in the templates (step S23: Y), the second corrector 202 performs the correction processing of increasing/decreasing the gradation value of the pixel to be corrected, that is, of the pixel of interest in the template, and outputs the pixel of interest after correction (S24). On the other hand, in a case where there is no matching plate (step S23: N), the second corrector 202 outputs the input pixel of interest as it is without performing the correction processing (step S25).

At the time of the correction processing, the second corrector 202 calculates the sum of the gradation values of the pixel group located in the same multibeam as the pixel to be corrected, and acquires the correction value L or the correction value U corresponding to the matching template. The second corrector 202 calculates the gradation correction amount by the following equation (5), using the calculated sum and the correction value L or the correction value U, and calculates the gradation value after correction of the pixel to be corrected (pixel of interest) by the following equation (6), using the calculated gradation correction amount.

$$Kh = \Sigma C \times k \quad (5)$$

$$CJ2 = CJ1 - Kh \quad (6)$$

[In the above equations (5) and (6), Kh represents the gradation correction amount. $\Sigma C$ represents the sum of the gradation values of the pixel group located in the same multibeam as the pixel to be corrected. k represents either the correction value L or the correction value U having a positive or negative sign. CJ2 represents the gradation value of the pixel to be corrected after correction, and CJ1 represents the gradation value of the pixel to be corrected before correction.]

The sum $\Sigma C$ of the gradation values of the pixel group located in the same multibeam as the pixel to be corrected represents a light energy amount to be imparted again with a time interval by the next scan with the multibeam to a region to which the light energy has been imparted by the scan with the multibeam. Since the density change caused at the boundary of the multibeam due to the multiple exposure effect is larger as the light energy amount to be imparted again is large, the gradation correction amount Kh, that is, the correction amount to increase/decrease the gradation value of the pixel to be corrected is determined according to the sum $\Sigma C$, as illustrated in the equation (5), whereby the accuracy of correction can be improved.

The correction value L and the correction value U are composed of a sign and a coefficient value for adjusting the correction amount, and the positive sign is set to a case of decreasing the gradation value (making the density low) of the pixel to be corrected and the negative sign is set to a case of increasing the gradation value (making the density high). Further, the coefficient value is set according to a density change amount caused by the multiple exposure effect of the image pattern of each template. A method of calculating the correction value L and the correction value U will be described in detail below.

Figure 17:
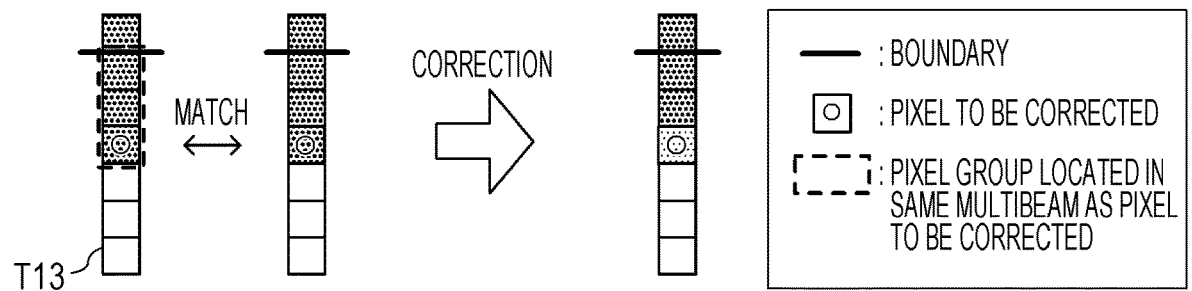
FIG. 17 is a diagram illustrating a correction example in a case where pixels match a template.

FIG. 17 is a diagram illustrating a correction example in a case where the pixels match the template T13 illustrated in FIG. 16.

In the template T13, the pixel group located in the same multibeam as the pixel to be corrected (pixel of interest) is three gradation pixels located below the boundary of the multibeam. The gradation correction amount Kh can be obtained by multiplying the sum $\Sigma C$ of the gradation values of the three gradation pixels by the correction value L3 set to the template T13. In the case where the correction value L3 has the positive sign, the gradation value of the pixel to be corrected can be decreased by $\Sigma C \times k$, as illustrated in FIG. 17.

In the above correction, the second corrector 202 can determine the pixel to be corrected among the pixels from the outline of the detected image pattern to the boundary of the multibeam.

For example, the second corrector 202 can determine the position of the pixel to be corrected from the outline of the image pattern to the boundary of the multibeam, by selecting the templates T12 to T14 or the templates T23 to T25 illustrated in FIG. 16 and selecting the templates T52 to T54 or the templates T63 to T65, and using the selected templates for collation.

In a case where the pixel to be corrected is also a pixel to be processed in another image processing such as thinning processing, the correction may reduce the effect of the another image processing. However, by selecting a template in which the position of the pixel to be corrected is different from the another image processing, both the correction and the another image processing can be effectively performed.

Figure 18:
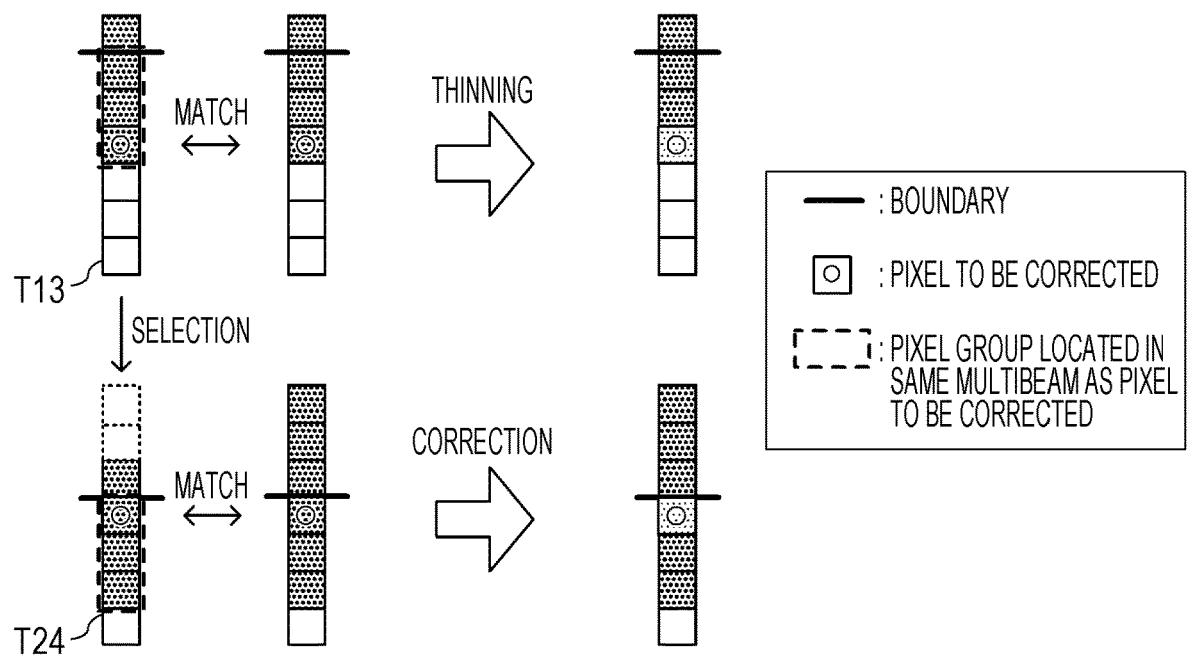
FIG. 18 is a diagram illustrating a correction example in which another template is selected.

FIG. 18 is a diagram illustrating a correction example in which the template T24 is selected in place of the template T13 illustrated in FIG. 16.

In the case of executing the thinning processing, the gradation value of the outline of the image pattern is reduced by the thinning processing, as illustrated in FIG. 18. In the template T13, the pixel to be corrected is located at the outline of the image pattern, which is the same as the thinning processing. Therefore, if the correction is carried out, the gradation value is further reduced, and the density is lower than intended by the thinning processing. In addition, the width of the gradation value that can be reduced by correction also becomes small by the amount reduced by the thinning processing, and the effect of correction is hard to appear. Here, as illustrated in FIG. 18, if the template T24 is selected in place of the template T13, a pixel different from the thinning processing can be adopted as the pixel to be corrected, and effects of both the thinning processing and the correction can be obtained.

In addition, the second corrector 202 determines an adjacent pixel outside the image pattern as the pixel to be corrected, in place of the pixel in the image pattern, corrects the gradation value of the pixel to be corrected correction, and can determine the correction amount according to the sum ΣC of the gradation values of the pixel group located in the same multibeam as the pixel to be corrected.

Typically, the density increases at the position of the boundary of the multibeam due to the multiple exposure effect. Therefore, correction to decrease the gradation value of the pixel to be corrected is performed, setting the signs of the correction value L and the correction value U to be positive. However, in a case of an image pattern with density that decreases due to the multiple exposure effect, correction to increase the gradation value of the pixel to be corrected is required, setting the signs of the correction value L and the correction value U to be negative. In the case of increasing the gradation value, the width of an increasable gradation value by correction becomes small if the original gradation value is close to the maximum value. However, by selecting a template having an adjacent pixel outside the image pattern as the pixel to be corrected, as the template to be used for collation, the width of the increasable gradation value by correction can be sufficiently obtained.

For example, the second corrector 202 can determine an adjacent pixel outside the image pattern as the pixel to be corrected, instead of a pixel in the image pattern detected by the template, by selecting the templates T21 and T22 in place of the templates T11 and T12, and selecting the templates T61 and T62 in place of the templates T51 and T52 illustrated in FIG. 16.

Figure 19:
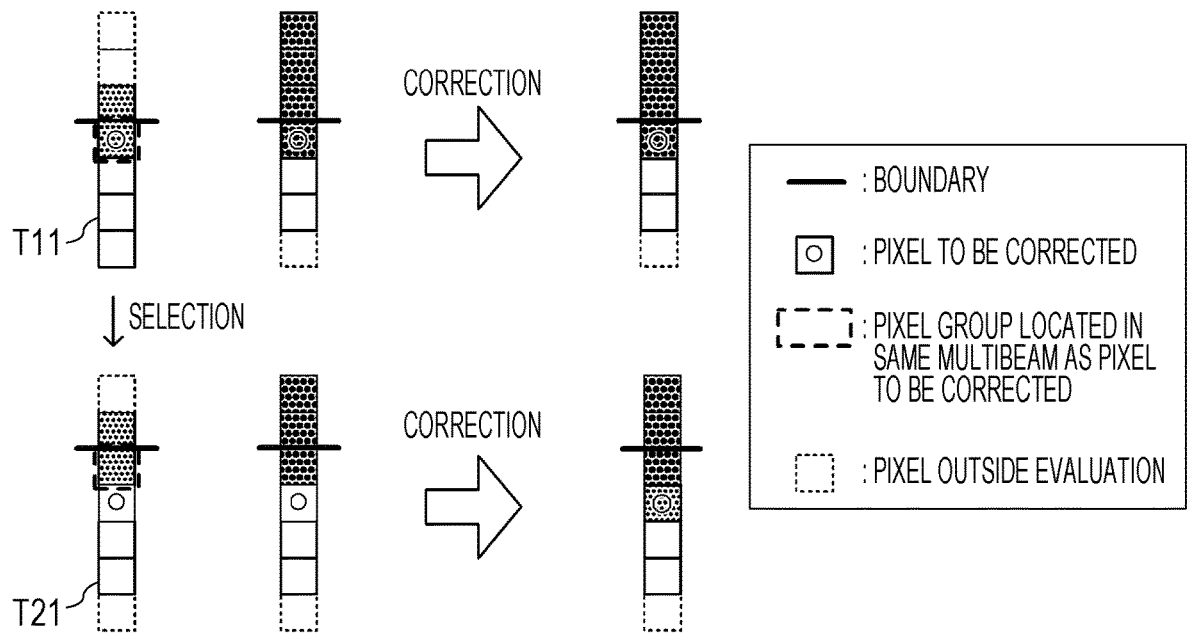
FIG. 19 is a diagram illustrating a correction example in which another template is selected.

FIG. 19 is a diagram illustrating a correction example in which the template T21 is selected in place of the template T11 illustrated in FIG. 16. FIG. 19 illustrates the templates T11 and T21 on the left side, and 1×7 pixels before and after correction in the center and on the right side across the arrow.

In the case where the correction value L1 of the template T11 has the negative sign, the gradation value cannot be increased by correction if the original gradation value of the pixel to be corrected is the maximum value. In this case, by selecting and using the template T21 in place of the template T11 as illustrated in FIG. 19, the gradation value can be increased having the outline of the background as the pixel to be corrected, and the width of the image pattern can be made thick by the decreased amount of the density due to the multiple exposure effect.

Note that, in FIG. 16, as the templates having an adjacent pixel outside the image pattern as the pixel to be corrected, the templates T21 and T61 where the number of pixels in the image pattern from the boundary of the multibeam is 1, and the templates T22 and T62 where the number of pixels is 2 are exemplified, and these templates can be used in the case where the correction values L1, L2, U1, and U2 have the negative sign. However, the templates having an adjacent pixel outside the image pattern as the pixel to be corrected are not limited thereto. In a case where the negative sign is settable to the correction values L3 to L5 and U3 to U5, a template in which the number of pixels in the image pattern from the boundary of the multibeam is 3 or more may be further provided as the template having an adjacent pixel outside the image pattern as the pixel to be corrected.

In the above correction, the second corrector 202 favorably determines the range of the pixel group located in the same multibeam as the pixel to be corrected according to a range over which the multiple exposure effect extends.

In the templates T11 to T15, T21 to 25, T51 to T55, and T61 to T65 illustrated in FIG. 16, the range of the pixel group located in the same multibeam as the pixel to be corrected is set to 1 to 5 pixels. Therefore, the second corrector 202 may just select a template with the range of the pixel group, which is determined according to the range over which the multiple exposure effect extends. For example, in a case where the spots of three laser beams overlap in the multibeam and the multiple exposure effect extends from the boundary of the multibeam to three or four pixels, the second corrector 202 may select and use the templates T11 to T14. Further, in a case where the spots of five laser beams overlap in the multibeam, the second corrector 202 may further select the template T15. As a result, unnecessary calculation can be reduced and efficient correction can be made.

Further, the second corrector 202 favorably determines the image pattern to be detected according to the number of laser beams of the multibeam.

The effect of correction is small if the number of laser beams is small and boundaries of a plurality of multibeams are located in the image pattern. Therefore, only the image pattern in which the width of the pixel group (the number of pixels) located in the same multibeam as the pixel to be corrected is equal to or less than the number of laser beams of the multibeam, and for which the correction is effective, is detected, whereby the efficiency of correction can be achieved.

In each of the templates T11 to T15, T21 to T25, T51 to T55, and T61 to T65 illustrated in FIG. 16, the number of laser beams of the multibeam for which correction is effective is set. The second corrector 202 selects the template corresponding to the number of laser beams of the multibeam and uses the selected template for collation, thereby to determine the image pattern to be detected according to the number of laser beams of the multibeam. In a case where the number of laser beams is less than 3, it is favorable to set the gradation correction amount Kh to 0 to disable the correction.

Further, the second corrector 202 favorably determines the pixels to be corrected in an image pattern portion located above the boundary of the multibeam and in an image pattern portion located below the boundary of the multibeam, respectively, determines the gradation correction amounts, and performs the correction.

In a case where the light amount distribution of the laser beam is not a substantial circle but has deviation such as an elliptical shape, deviation occurs between the light energy amount to be imparted first by scan with the multibeam and the light energy amount to be imparted again by scan with the multibeam afterward. Therefore, the density change amount of the image pattern caused by the multiple exposure effect differs depending on whether the pixel to be corrected is located above the boundary of the multibeam (whether exposure of the pixel to be corrected is performed with the multibeam used for earlier scan) or located below the boundary of the multibeam (whether expose of the pixel to be corrected is performed with the multibeam used for later scan).

Further, in a case where the scan is performed twice before and after (above and below) the boundary, the behavior of the charge generated in the second scanning is influenced by change in the potential in the photoconductor, which has occurred in the first scan. Therefore, the exposure effect by the first scan and the exposure effect by the second scan may not be exactly the same.

The pixels to be corrected are respectively determined in an image pattern portion located below the boundary of the multibeam in the templates T11 to T15, and in an image pattern portion located above the boundary of the multibeam in the templates T51 to T55, illustrated in FIG. 16, and optimum correction values L or correction values U according to the density change amounts of the respective image patterns are individually set. The second corrector 202 detects matching image patterns using the templates T11 to T15 and T51 to T55, determines the gradation correction amount Kh, using the correction values L or correction values U unique to the matching templates T11 to T15 and T51 to T55, and performs correction, whereby to perform correction with high accuracy even if deviation in the light amount distribution of the laser beams has occurred or even if there is a difference between the exposure effect by the first scan and the exposure effect by the second scan.

After calculating the gradation value after correction of the pixel of interest as described above, the second corrector 202 shifts the position of the pixel of interest by one pixel and repeats the above-described processing.

[Synthesis of Gradation Correction Amount]

The correction synthesizer 203 adds the gradation correction amount Kj calculated by the first corrector 201 and the gradation correction amount Kh calculated by the second corrector 202 to the gradation value of the pixel of interest, and outputs the gradation value with the corrected density unevenness caused by the multiple exposure effect and the positional deviation of the laser beams to the inverse converter 3.

Note that the example in which correction of the density unevenness caused by the multiple exposure effect and correction of the density unevenness caused by the positional deviation of the laser beams are performed in parallel has been described. However, the corrections may be performed in order, and either scan can be performed first.

[Method of Calculating Correction Value Cb and Correction Values L and U]

Next, a method of calculating the correction value Cb to be used for correction by the first corrector 201 and the correction values L and U to be used for correction by the second corrector 202 will be described.

In the correction value calculation method of the present embodiment, a predetermined test chart TC (inspection image) is formed on a recording medium by the image forming apparatus 100, and a reading result by the image reader 19 of the test chart TC is analyzed, whereby the correction value Cb and the correction values L and U are calculated.

Hereinafter, the contents of the test chart TC will be described with reference to FIGS. 20 to 26. Here, a case where the number of laser beams constituting the multibeam is 16 will be described as an example.

Figure 20:
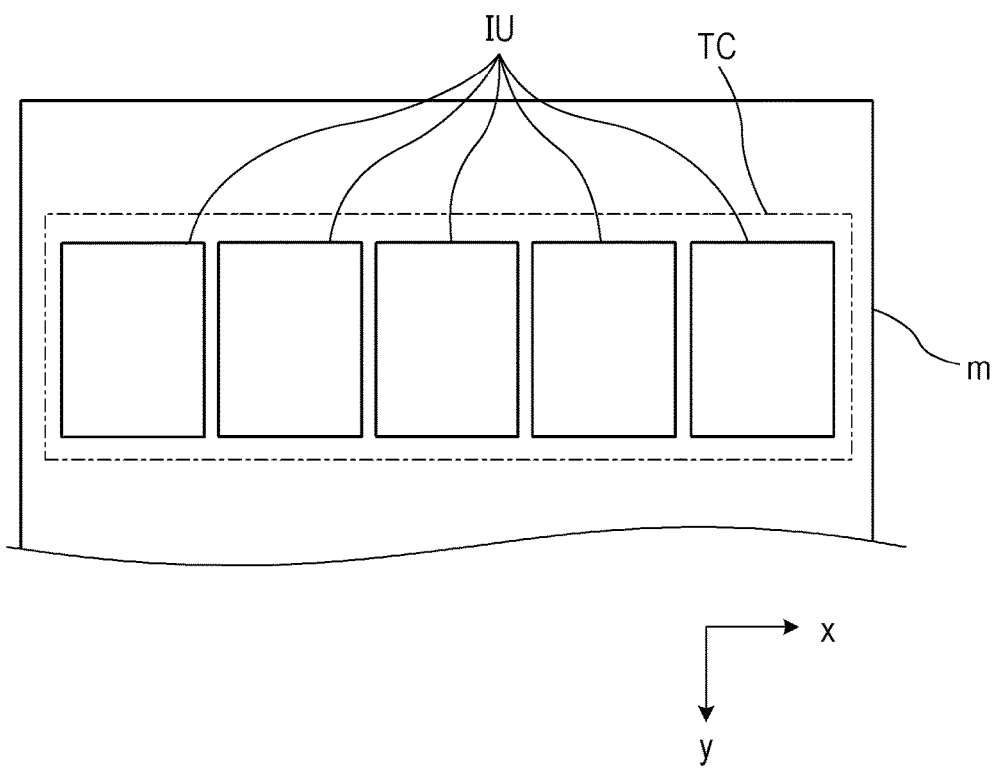
FIG. 20 is a diagram illustrating a configuration of a test chart.

FIG. 20 is a diagram illustrating a configuration of the test chart TC.

The test chart TC is an image formed on a recording medium m and has five image units IU arrayed along the main scanning direction x. The contents of the image units IU are the same.

Figure 21:
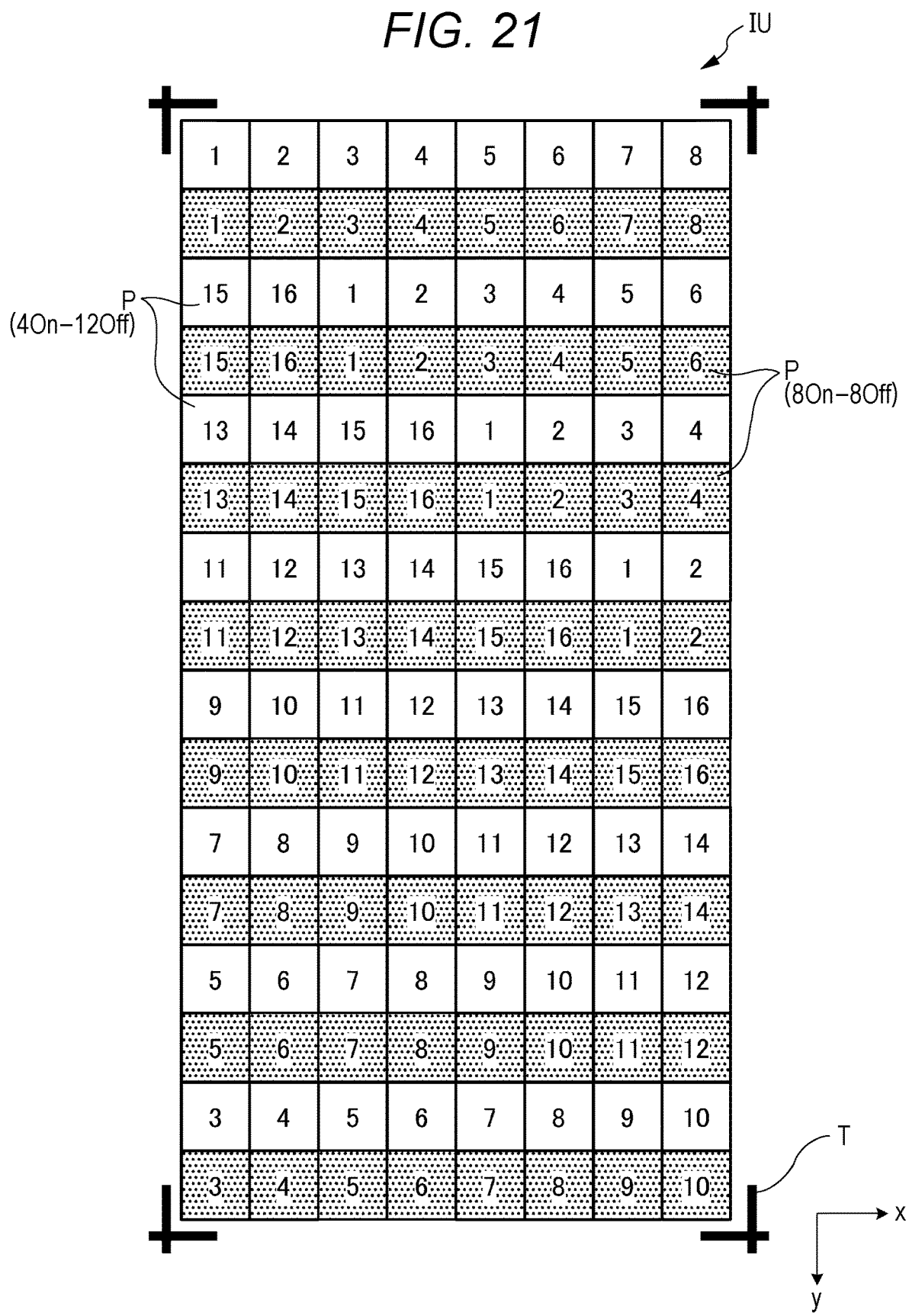
FIG. 21 is a diagram illustrating an example of contents of an image unit.

FIG. 21 is a diagram illustrating an example of contents in the image unit IU.

The image unit IU has a plurality of substantially square measurement patches P (individual inspection images) arrayed in a matrix manner and a register mark T for detecting an arrangement region of the measurement patches P.

The image unit IU includes two kinds of measurement patches P having different interference patterns with the multibeam emitted from the laser light source 20. Specifically, the image unit IU includes a measurement patch P "4On-12Off" and a measurement patch P "8On-8Off" in which the number of arrays of on-pixels (pixels to which a toner is given) and off-pixels (blank pixels to which no toner is given) in the sub-scanning direction y are different from each other. Further, in the image unit IU, sixteen patterns of the measurement patch P of "4On-12Off" and the measurement patch P of "8On-8Off" are provided to have sixteen different phase relationships with the multibeam (that is, having the same number of different phase relationships as the number of laser beams in the multibeam). The patterns of the measurement patches P having the different phase relationships are also hereinafter referred to as patch patterns PP. The number written in the measurement patch P in FIG. 21 indicates the number of the patch pattern PP.

Figure 22:
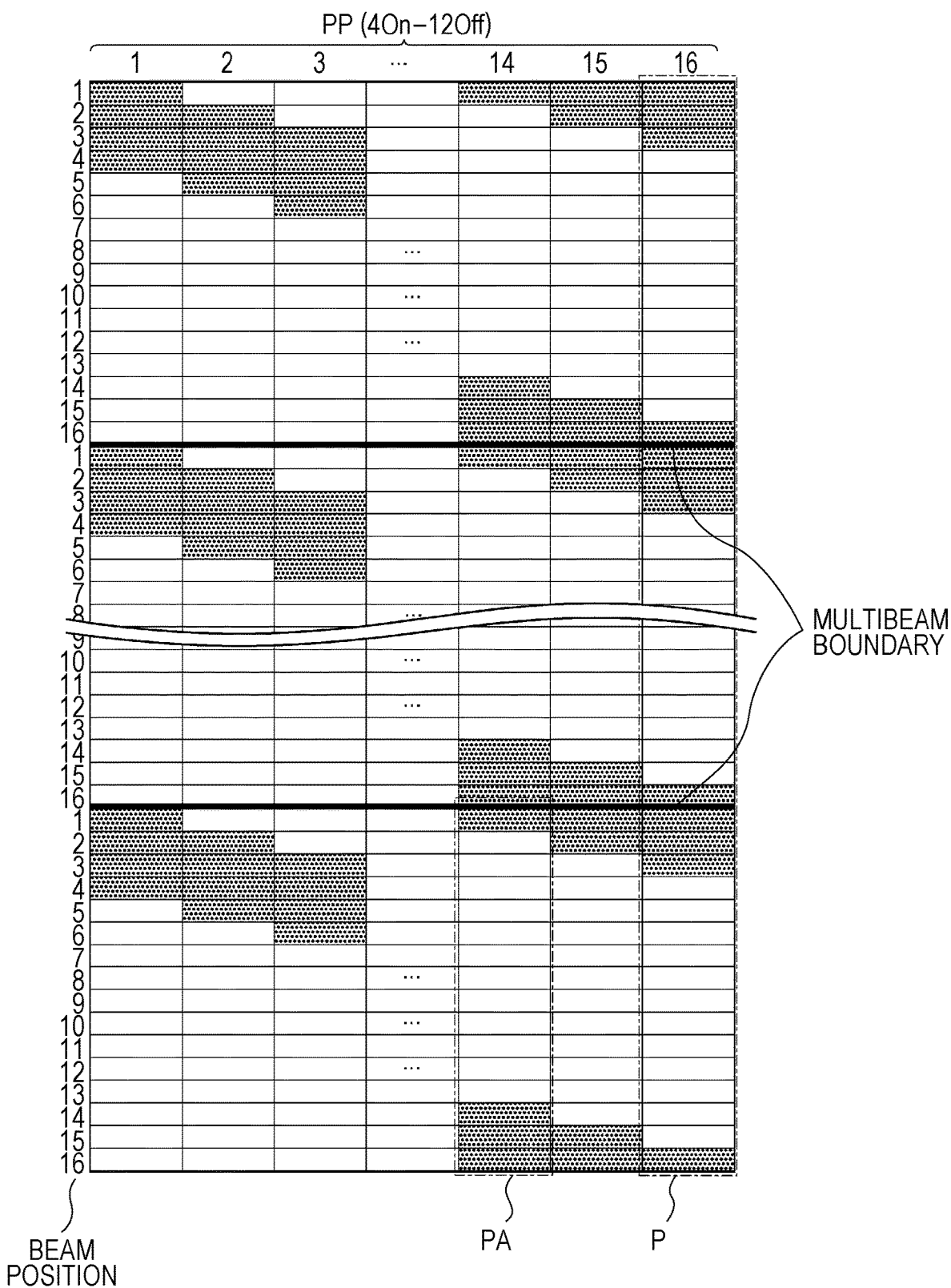
FIG. 22 is a diagram for describing a measurement patch of 4On-12Off and a patch pattern of the measurement patch.

FIG. 22 is a diagram for describing the measurement patch P of 4On-12Off and patch patterns of the measurement patch.

In the measurement patch P of 4On-12Off, the on-pixels and the off-pixels are arranged such that a portion where the on-pixels continue over four pixels and a portion where the off-pixels continue over twelve pixels alternately appear in the sub-scanning direction y. Further, a portion formed by one scan with the multibeam having sixteen laser beams of the measurement patch P constitutes a unit pattern PA. Therefore, the unit pattern PA is formed with the same period as a spatial period of the scan with the multibeam in the sub-scanning direction y.

FIG. 22 illustrates the measurement patches P of the first to sixteenth patch patterns PP. In the patch patterns PP with adjacent numbers, the phase of the measurement patch P is shifted in units of one pixel in the sub-scanning direction y. That is, the range where the on-pixels are arranged is shifted by one pixel in the sub-scanning direction y as the number of the patch pattern PP increases by one.

Specifically, in the first patch pattern PP, on-pixels are formed at beam positions 1 to 4 out of beam positions 1 to 16 in the multibeam and the off-pixels are formed at beam positions 5 to 16. Further, in the second patch pattern PP, the on-pixels are formed at beam positions 2 to 5, and the off-pixels are formed at beam positions 1 and 6 to 16. In this manner, the formation range of the on-pixels deviates for each patch pattern PP, and in the thirteenth patch patter, the on-pixels are formed at beam positions 13 to 16. Further, in the fourteenth patch pattern, the on-pixels are formed at beam positions 14 to 16 and at beam position 1. In the fifteenth patch pattern PP, the on-pixels are formed at beam positions 15 and 16 and at beam positions 1 and 2. In the sixteenth patch pattern PP, the on-pixels are formed at beam position 16 and at the beam positions 1 to 3.

When the measurement patch P is formed with each patch pattern PP in this way, the formation range of the on-pixel crosses the boundary of the multibeam in the measurement patches P in the fourteenth to sixteenth patch patterns PP. In the measurement patch P in which the formation range of the on-pixel crosses the boundary of the multibeam, the formation range of a string of on-pixels is formed by two scans with the multibeam twice, and therefore density change due to multiple exposure effect can occur.

Figure 23:
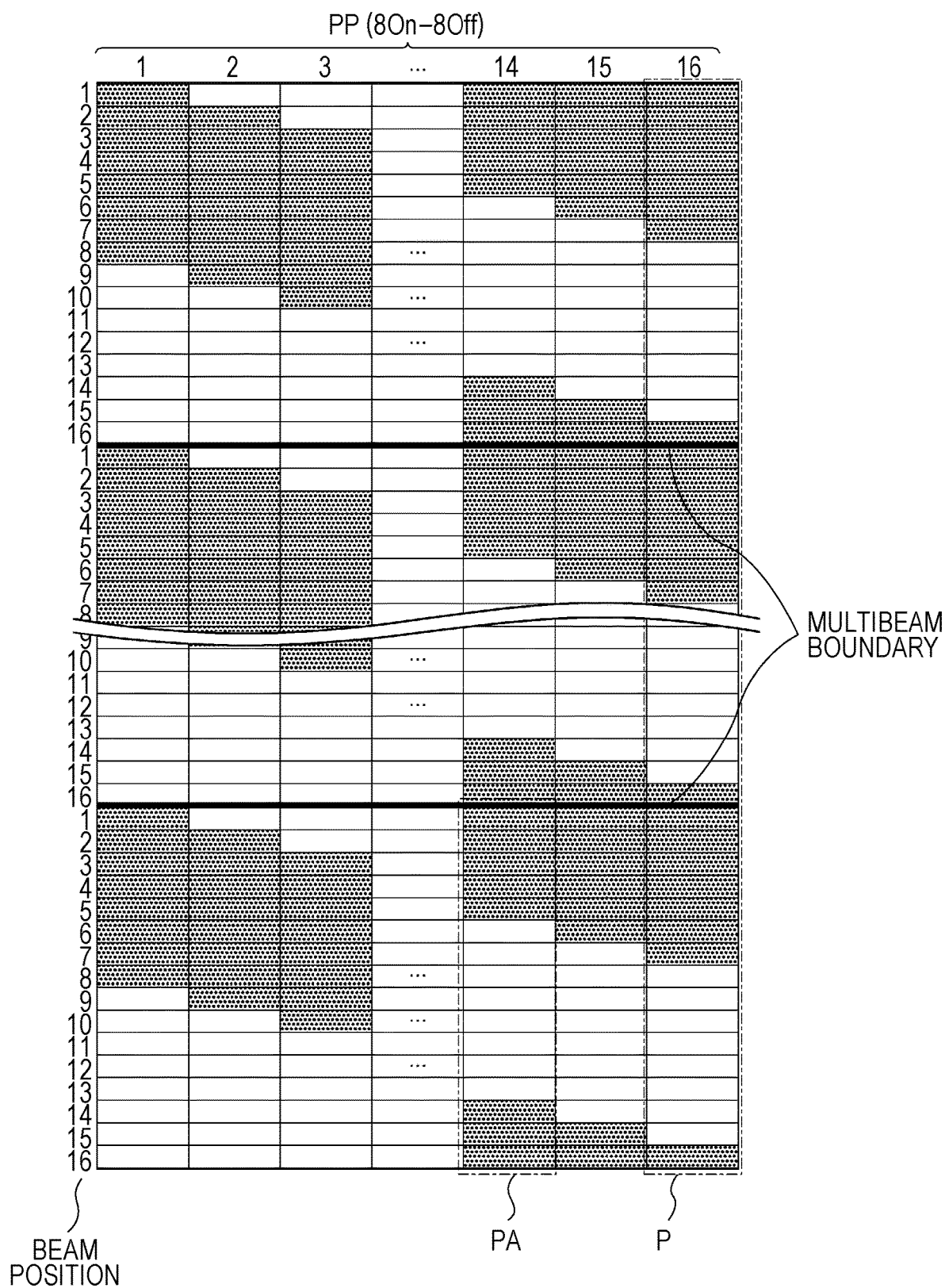
FIG. 23 is a diagram for describing a measurement patch of 8On-8Off and a patch pattern of the measurement patch.

FIG. 23 is a diagram for describing the measurement patch P of 8On-8Off and patch patterns of the measurement patch.

In the measurement patch P of 8On-8Off, the on-pixels and the off-pixels are arranged such that a portion where the on-pixels continue over eight pixels and a portion where the off-pixels continue over eight pixels alternately appear in the sub-scanning direction y.

Even in the measurement patch P of 8On-8Off, the phase is shifted in units of one pixel in the sub-scanning direction y, that is, the range in which the on-pixels are arranged is shifted by one pixel in the sub-scanning direction y, as the number of the patch pattern PP increases by one.

In the measurement patch P of 8On-8Off, the formation range of the on-pixels crosses the boundary of the multibeam in the tenth to sixteenth patch patterns PP. Therefore, in the measurement patch P of the tenth to sixteenth patch patterns PP, the formation range of a string of the on-pixels is formed by two scans with the multibeam, and thus the density change due to the multiple exposure effect can occur.

Figure 24A:
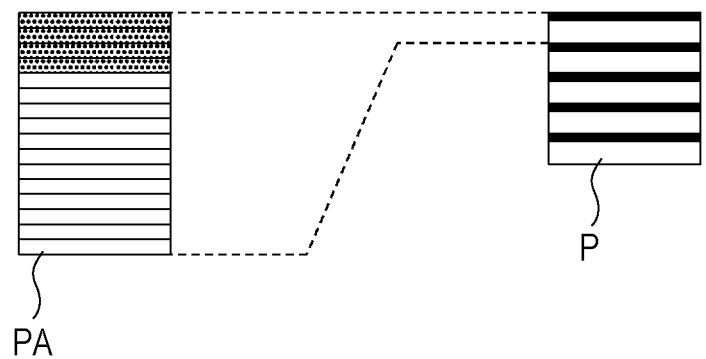
FIGS. 24A to 24C are diagrams illustrating a configuration example of a measurement patch P in the image unit.
Figure 24B:
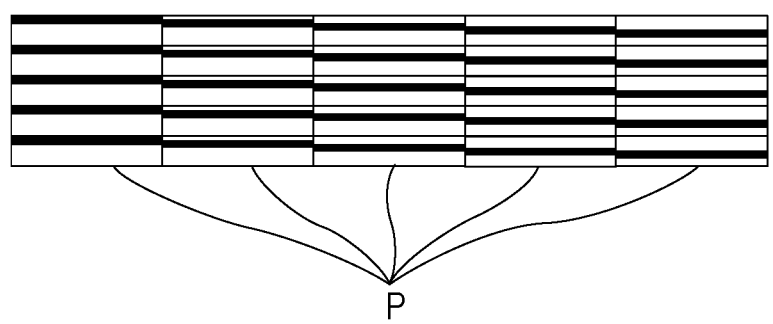
Figure 24C:
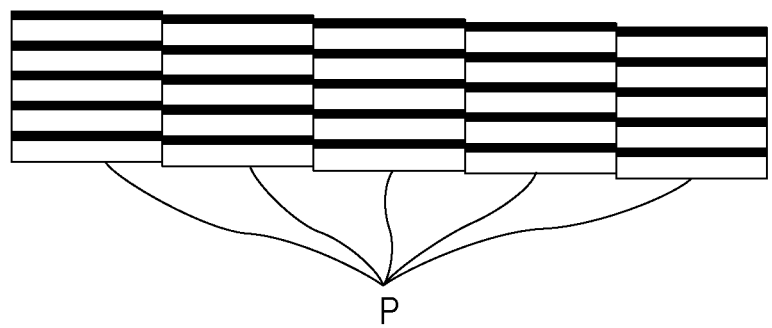

FIGS. 24A to 24C are diagrams illustrating a configuration example of the measurement patch P in the image unit IU.

In the measurement patch P, as illustrated in FIG. 24A, a plurality of unit patterns PA is repeatedly provided in the sub-scanning direction y. The width of the unit pattern PA in the sub-scanning direction y is determined according to a recording resolution in the sub-scanning direction y by the image former 18 and the number of laser beams in the multibeam, and is about 0.16 mm in the present embodiment. The number of the unit patterns PA to be included in each measurement patch P is not particularly limited, but the number of the unit patterns PA is desirably set to a number by which a measurement range by the image reader 19 can be secured and average density (luminance) of the measurement patches P can be read in the measurement by the image reader. Specifically, it is desirable to provide about ten to hundred unit patterns PA in each measurement patch P. In a case where the number of unit patterns PA is small (for example, less than ten), it is desirable to use a reading result of a region having a size of an integral multiple of the unit pattern in the sub-scanning direction y to avoid the inconvenience of variation in a ratio between the number of on-pixels and the number of off-pixels to be measured depending on the reading range.

In a case of arranging approximately square measuring patches P in a matrix manner in the image unit IU, the measurement patch P may be formed by shifting the patterns included therein without shifting an outer shape of the measurement patch P, as illustrated in FIG. 24B.

Further, in a case where it is not necessary to arrange the measurement patches P in a matrix manner, the same unit patterns PA are arranged by being shifted by one pixel at a time in the sub-scanning direction y to form a plurality of measurement patches P, as illustrated in FIG. 24C.

As illustrated in FIG. 21, in the image unit IU, the measurement patch P of 4On-12Off and the measurement patch P of 8On-8Off having the same number of the patch pattern PP are arranged in pair in the sub-scanning direction y. Further, in the image unit IU, a plurality of the same measurement patches P (the measurement patches P having the same types and numbers of the patch patterns PP) is dispersedly arranged. By use of an average value of measurement values of the same measurement patches P, variation in image formation density can be suppressed in the calculation of the correction value Cb and the correction values L and U even in the case where the image formation density by the image former 18 varies depending on the position.

In the present embodiment, four identical measurement patches P are arranged. Therefore, four image patches P of sixteen patterns are provided for each of the two types (4On-12Off and 8On-8Off) in the image unit IU, and the measurement patches P of 2×16×4=128 are included. Further, the positions of the measurement patches P are determined such that centroids and distribution ranges of the positions of the four identical measurement patches P are as close as possible to each other.

Further, in the image unit IU, eight measurement patches P are arranged in the main scanning direction x, and sixteen measurement patches P are arranged in the sub-scanning direction y. As a result, the image unit IU has a long shape in the sub-scanning direction y. This is because the correction value Cb and the correction values L and U calculated on the basis of the test chart TC are related to the positional deviation or overlap (multiple exposure) mainly in the sub-scanning direction y of the multibeam, and in particular the correction value Cb regarding the positional deviation of the laser beam may be different at each position in the main scanning direction x (the scanning direction of the beam is not perfectly parallel). In other words, the possibility that, in particular, the correction value Cb among the calculated correction values becomes inaccurate due to the influence of variation in each position in the main scanning direction x in the image unit IU, if the configuration is made longer in the main scanning direction x, is taken into account.

Further, in the image unit IU, a texture pattern patch TP (reference image) for detecting density unevenness caused by factors other than the positional deviation of the laser beam and the multiple exposure effect (for example, variation of the image formation density caused by the characteristics of the image former 18 and the recording medium m) in the image unit IU may be formed together with the measurement patches P in the image unit IU.

Figure 25:
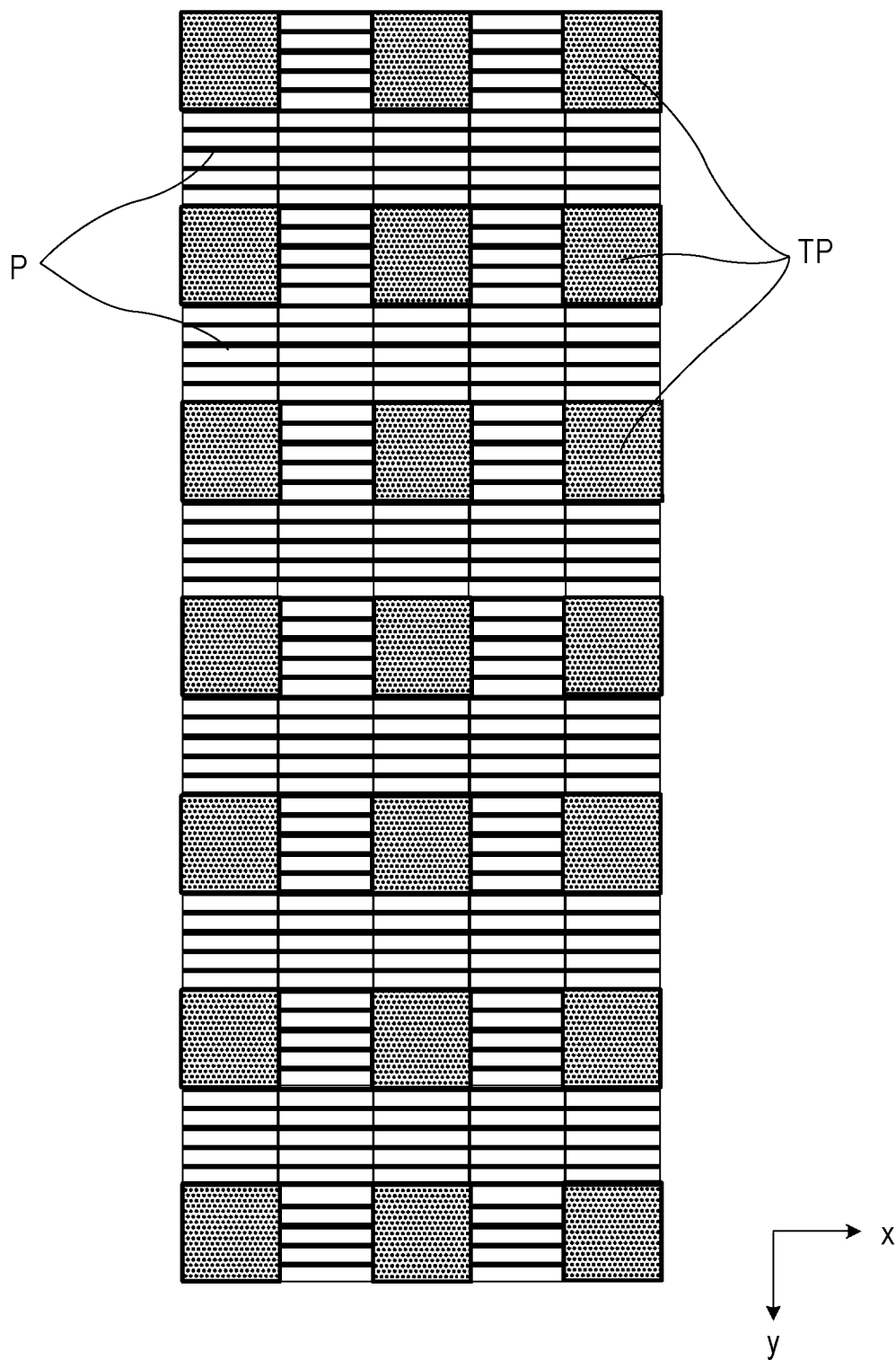
FIG. 25 is a diagram illustrating an arrangement example of a texture pattern patches.

FIG. 25 is a diagram illustrating an arrangement example of the texture pattern patches TP.

The texture pattern patch TP is an image not having an interference pattern with the multibeam, and is formed such that the density and a spatial frequency in the sub-scanning direction y become substantially equal to those of the measurement patch P, and to have the same shape as the measurement patch P. By making the density and the spatial frequency of the texture pattern patch TP equal to those of the measurement patch P in this manner, the tendency of the density change caused by factors other than the positional deviation of the laser beam and the multiple exposure effect can be made similar between the texture pattern patch TP and the measurement patch P. In other words, the density and the spatial frequency being equal between the texture pattern patch TP and the measurement patch P means that a difference in the density change and the spatial frequency falls within a range in which the tendency of the density change becomes similar between the texture pattern patch TP and the measurement patch P.

The texture pattern patch TP can be, for example, an image obtained by performing halftoning by a dither matrix or error diffusion, for halftone image data having the same gradation as an average gradation of the measurement patches P. In the example of FIG. 25, the texture pattern patch TP is arranged in every other line in the main scanning direction x and in the sub-scanning direction y. Although the arrangement of the texture pattern patch TP is not limited thereto, the texture pattern patches TP are desirably arranged at equal intervals at least in the main scanning direction x.

Figure 26:
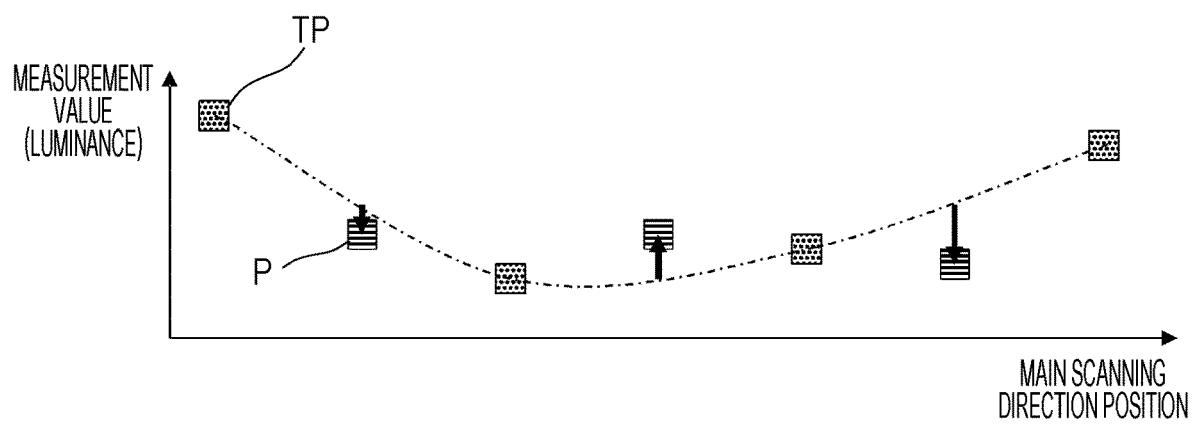
FIG. 26 is a diagram for describing density correction with the texture pattern patch.

FIG. 26 is a diagram for describing density correction with the texture pattern patch TP. FIG. 26 illustrates measurement values (here, luminance) of the measurement patches P and the texture pattern patches TP arrayed along the main scanning direction x. Here, in the case where there is the density unevenness due to factors different from the positional deviation of the laser beam and the multiple exposure effect, the density unevenness appears in distribution of the measurement values of the texture pattern patches TP. In the example of FIG. 26, the measurement values fluctuate along a downwardly convex curve with respect to each position in the main scanning direction x. In the case where the density of the texture pattern patch TP fluctuates in this manner, the measurement value is corrected to make a difference between the curve and the measurement value of each measurement patch P be the density change amount of each measurement patch P (specifically, the measurement value is replaced with a value obtained by adding the difference in the measurement value of each measurement patch P to an average value of the measurement values of the measurement patches P), whereby a more accurate measurement value of the measurement patch P, from which the influence of the density unevenness due to factors other than the positional deviation of the laser beam and the measurement patch P has been removed, can be obtained.

Next, a method of calculating the correction value Cb and the correction values L and U on the basis of the reading result of the test chart TC will be described with reference to FIGS. 27 to 31.

Here, correction values Cb01 to Cb16 regarding the positional deviation of the laser beam, and correction values L1 to L5 and correction values U1 to U5 regarding the multiple exposure effect illustrated in FIG. 16, corresponding to the sixteen laser beams in the multibeam, are calculated. Among the correction values, a group of correction values composed of the correction values Cb01 to Cb16 corresponds to a first correction value group, and a group of correction values composed of the correction values L1 to L5 and correction values U1 to U5 corresponds to a second correction value group.

The outline of the method of calculating the correction value Cb and the correction values L and U is as follows. That is, first, temporary values of the correction values Cb01 to Cb16 (hereinafter referred to as temporary correction values Cb01 to Cb16) are calculated on the basis of measurement density of the measurement patches P of 4On-12Off included in the image unit IU of the test chart TC. Similarly, temporary correction values Cb01 to Cb16 are calculated on the basis of measurement density of the measurement patches P of 8On-8Off. Next, two temporary correction values Cb calculated corresponding to each laser beam are averaged, a distribution curve of the average values with respect to the beam positions is derived, and correction values Cb01 to Cb16 corresponding to the laser beams are determined to values on the distribution curve. Next, the density of the measurement patch P is corrected with the obtained correction values Cb01 to Cb16. Since the influence of the density change due to the multiple exposure effect is included in part of the density of the measurement patches P after the correction, the correction values L1 to L5 and correction values U1 to U5 are calculated on the basis of the part of the density of the measurement patch P after the correction.

Hereinafter, the method of calculating the correction value Cb and the correction values L and U will be specifically described.

FIGS. 27 and 28 are diagrams for describing a calculation process of the correction value Cb.

In the calculation of the correction value Cb, first, as illustrated in column (a) in FIG. 27, the measurement density (density information regarding density) that is a reading result by the image reader 19, for each measurement patch P of the first to sixteenth patch patterns is acquired for each of the interference patterns of 4On-12Off and 8On-12Off. Here, the image reader 19 images the vicinity of the center of each measurement patch P included in the image unit IU, and detects reflected light intensity (luminance) with eight bit gradation. Then, an average of the detection intensity of the four measurement patches P having the same type and number of the patch pattern PP is obtained as the measurement density. Therefore, the measurement density in FIGS. 27 and 28 indicates lower density (higher luminance) as the numerical value is larger.

Next, a difference (the column (b)) between the average value of the obtained measurement density and the measurement density of the measurement patches P is calculated.

The column (c) in FIG. 27 illustrates the influence amount (influential correction value Cb) due to the positional deviation of the laser beam in each patch pattern. As described above, in a line image such as the measurement patch P, the positional deviation of the laser beam forming the contour of the line influences the line width and the density. Therefore, the correction values Cb regarding the laser beams respectively corresponding to an upper end and a lower end of the formation region of the on-pixels in each measurement patch P influence the measurement density of the measurement patch P.

For example, in the first patch pattern PP of the measurement patch P of 4On-12Off, the on-pixels are arranged at the beam positions 1 to 4. Therefore, the influence amount due to the positional deviation of the laser beam is a difference in the correction values Cb respectively corresponding to the beam positions 1 and 4 (the correction value Cb01-Cb04). For example, the influence amount due to the positional deviation of the laser beam in the first patch pattern PP of the measurement patch P of 8On-8Off is a difference in the correction values Cb respectively corresponding to the beam positions 1 and 8 (the correction value Cb01-Cb08).

Further, in the column (d) in FIG. 27, the patch pattern PP (that is, the patch pattern PP in which the density change due to the multiple exposure effect can occur) in which the image pattern of the string of on-pixels crosses the boundary of the multibeam is illustrated with "◯". As described above, in the measurement patch P of 4On-12Off, the image pattern of the on-pixels crosses the boundary of the multibeam in the fourteenth to sixteenth patch patterns PP. In the measurement patch P of 8On-8Off, the image pattern of the on-pixels crosses the boundary of the multibeam in the tenth to sixteenth patch patterns PP.

Further, in the column (e) in FIG. 27, the correction values L and U that influence the measurement density of the measurement patch P of the patch pattern PP (that is, the correction values L and U used for correction by the second corrector 202), of the correction values L1 to L5 and U1 to U5 regarding the multiple exposure effect, are illustrated for the patch patterns PP with "○" in the column (d).

For example, in the fourteenth patch pattern in the measurement patch P of 4On-12Off, there is one on-pixel below the boundary of the multibeam as illustrated in FIG. 22. When focusing on the image pattern below the boundary of the multibeam, the image patch pattern corresponds to the template T11 or T21 in FIG. 16. Further, there are three on-pixels above the boundary of the multibeam, and when focusing on the image pattern above the boundary of the multibeam, the image pattern corresponds to the template T53 or T64 in FIG. 16. Therefore, in the fourteenth patch pattern, the correction value L1 corresponding to the template T11 or T21 and the correction value U3 corresponding to the template T53 or T64 are the correction values that influence the measurement density.

Next, the temporary correction value Cb illustrated in the column (g) in FIG. 28 is calculated on the basis of the difference of the column (b) in FIG. 27. That is, the temporary correction values Cb01 to Cb16 (the column (g)) are calculated by an equation of a case where the difference of the column (b) in FIG. 27 and the value of the correction value Cb in the column (c) are equal. Here, the temporary correction value Cb is calculated in calculation order illustrated in the column (f), using the regularity possessed by the combination of the correction values Cb in the column (c).

Specifically, first, the temporary correction value Cb01 for the measurement patch P of 4On-12Off is set to 0. Next, the equation below:

$$1.218 = Cb01 - Cb04$$
$$= 0 - Cb04$$

is established from the comparison between the column (b) and the column (c) for the first patch pattern PP in FIG. 27. Therefore, the temporary correction value Cb04 is calculated to be −1.218. Next, the equation below:

$$0.335 = Cb04 - Cb07$$
$$= -1.218 - Cb07$$

is established from the comparison between the column (b) and the column (c) for the fourth patch pattern. Therefore, the temporary correction value Cb07 is calculated to be −1.553.

By following the calculation order of the column (f) in this manner, the column (b) and the column (c) can be compared with respect to the patch pattern PP of which one of the two correction values Cb in the column (c) is determined, and the temporary correction values Cb01 to Cb16 can be sequentially calculated.

Further, similarly to the calculation of the temporary correction values Cb01 to Cb16 of 4On-12Off, the temporary correction values Cb01 to Cb16 of 8On-8Off are calculated.

In a case where simultaneous equations composed of sixteen equations corresponding to the first to sixteenth patch patterns PP can be solved, the temporary correction values Cb01 to Cb16 may be directly calculated from the simultaneous equations.

Next, an average value of values in the column (g) is subtracted from each of the temporary correction values Cb so that an average value of the temporary correction values Cb becomes 0, and the temporary correction value Cb after average value adjustment is calculated (column (h)).

Figure 29A:
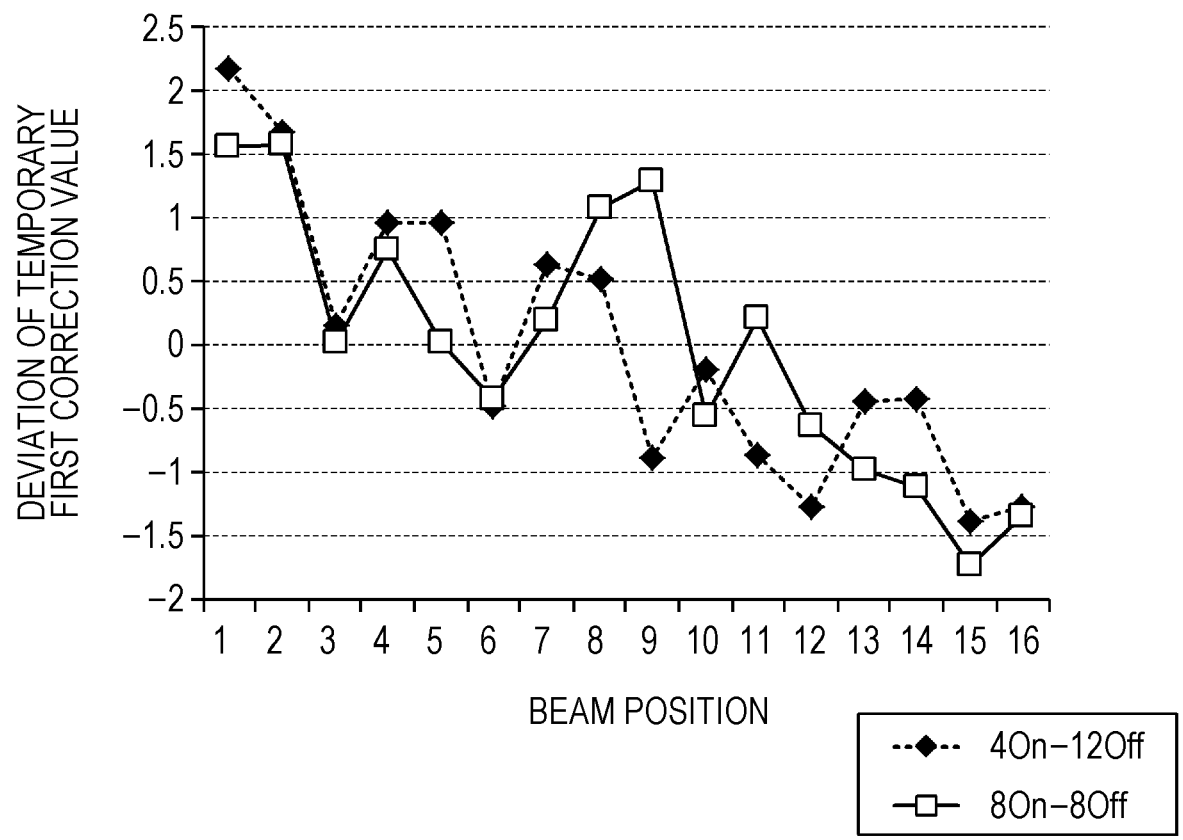
FIGS. 29A and 29B are diagrams illustrating a distribution example of a correction value with respect to beam positions.

FIG. 29A is a graph obtained by plotting temporary correction values Cb after the average value adjustment in the column (h) in FIG. 28 to the beam positions, for each of the measurement patches P of 4On-12Off and 8On-8Off. When the factor of the difference (density unevenness) in the measurement density of the measurement patches P is only the positional deviation of the laser beam, the graphs of 4On-12Off and 8On-8Off in FIG. 29A should match. Therefore, the difference between the graphs is by another factor, that is, the multiple exposure effect.

The column (j) in FIG. 28 illustrates a combination of the correction values L and U that influence the value of the temporary correction value Cb, of the correction values L1 to L5 and U1 to U5 regarding the multiple exposure effect.

For example, the temporary correction value Cb03 for the measurement patch P of 4On-12Off is calculated on the basis of the equation regarding the sixteenth patch pattern P below:

$$-1.407 = Cb16 - Cb03$$

The correction values U1 and L3 influence the value on the left side of the equations, as illustrated in the column (e) in FIG. 27. Therefore, the correction value Cb03 derived from this equation is also influenced by the correction values U1 and L3. In the column (j) in FIG. 28, "U1, L3" is illustrated in the row of the correction value Cb03.

As can be seen from the column (j) in FIG. 28, the influence of the correction values L and U on the temporary correction value Cb changes in every three temporary correction values in 4On-12Off and in every seven temporary correction values in 8On-8Off. The graph in FIG. 29A has this periodicity. Therefore, the remainder excluding the periodic component is the desired correction value Cb regarding the positional deviation of the laser beam.

Figure 29B:
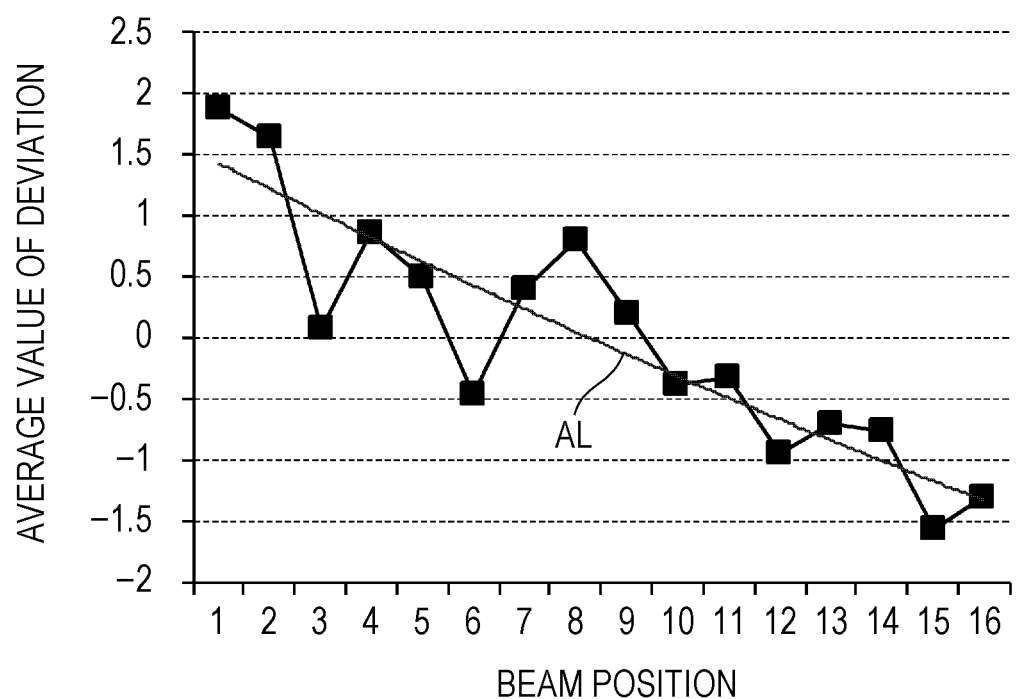

In the present embodiment, the values of the two graphs in FIG. 29A are averaged to generate the graph in FIG. 29B, and the correction values Cb01 to Cb16 are determined as values on an approximate curve AL of the graph. That is, a predetermined correlation between the positional deviations of the sixteen laser beams in the multibeam (here, a relationship on the same approximate curve AL) is assumed, and the correction values Cb01 to Cb16 are calculated on the basis of the correlation. The approximate curve AL in FIG. 29B is $$y = 0.0016x^2 - 0.2115x + 1.6447,$$

and by substituting the beam position (1 to 16) into x of the approximate curve AL, the correction values Cb01 to Cb16 are obtained (the column (i) in FIG. 28).

FIG. 30 is a diagram for explaining a calculation process of the correction values L1 to L5 and U1 to U5.

By eliminating the influence of the correction value Cb obtained as in the column (i) in FIG. 28 from the measurement density (column (a)) of each measurement patch P, the measurement density to which correction about the positional deviation of the laser beam has been made is obtained (column (I)). In details, the influence amount due to the positional deviation of the laser beam illustrated in the column (c) in FIG. 27 is calculated using the value of the correction value Cb in the column (i) in FIG. 28 (column (k)), the calculated value is subtracted from the measurement density (column (a)) of the measurement patch P, whereby the measurement density after correction in the column (I) is obtained. Since the influence of the multiple exposure effect appears only in the measurement density corresponding to the patch pattern PP that crosses the boundary of the multibeam (that is, the patch patterns PP with "○" in the column (d)), of the measurement density in the column (I). Therefore, the correction values L and U can be obtained from the values of the measurement density.

Specifically, first, the measurement density corresponding to the patch patterns PP not crossing the boundary of the multibeam (values of colored cells in the column (k)) is averaged, the average value is subtracted from each measurement density corresponding to the patch pattern PP that crosses the boundary of the multibeam (a value of a uncolored cell in the column (k)) to calculate a deviation (column (n)).

Each of the obtained deviations is related to the correction values L and U illustrated in the column (e) in FIG. 27. For example, the deviation (−0.151) corresponding to the fourteenth patch pattern of 4On-12Off is equal to the correction value U3+the correction value L1, the deviation (−0.651) corresponding to the fifteenth patch pattern is equal to the correction value U2+the correction value L2, and the deviation (0.957) corresponding to the sixteenth patch pattern is equal to the correction value U1+the correction value L3. Equations for the correction values L and U can be similarly derived for the tenth to sixteenth patch patterns of 8On-8Off. The correction values L1 to L5 and U1 to U5 are calculated from the ten equations.

Note that, since the combination of the two correction values L and U corresponding to each measurement patch P is limited, the correction values L and U cannot be obtained by solving the simultaneous equations in this example. For this reason, here, calculation is performed with some preconditions.

First, since the obtainable equation for the correction values U4 and L4 is one, which is U4+L4=0.123, the correction values U4 and L4 cannot be independently obtained. Therefore, each correction value is calculated assuming that U4=L4 (0.062).

Further, since the obtainable equation for the correction values U5 and L5 is also one, which is U5+L5=0.948. Therefore, each correction value is calculated assuming that U5=L5 (0.474). When the correction values U5 and L5 are determined, the correction values U1 to U3 and L1 to L3 can be calculated from the equations for the patch patterns PP of 8On-8Off.

FIG. 31 is a diagram illustrating calculation results of the correction values L1 to L5 and U1 to U5.

In the example of FIG. 31, the correction values L1 and U1 have negative signs. Therefore, in the correction by the second corrector 202, correction to make the density high by increasing the gradation value of the pixel is performed according to the above equation (6) in a case where the number of pixels in the image pattern from the boundary of the multibeam is 1 (for example, in a case where the image pattern matches the templates T11, T21, T51, and T61 in FIG. 16).

In the above case, since the combination of five variables of the correction values U1 to U5 and five variables of the correction values L1 to L5 is limited, the values of the correction values L and U can be determined only after preconditions are given. This is because the number of laser beams in the multibeam is an even number, and there is a possibility that the correction values L and U can be independently determined by setting the number of laser beams to an odd number. In principle, the influence peculiar to each laser beam is not large in the correction values L and U regarding the multiple exposure effect. Therefore, if the number of rotations of the polygon mirror 34 in the case of calculating the correction values L and U is adjusted, and the number of laser beams used for scan in the multibeam is set to an odd number, the correction values L and U may be able to be determined by solving simultaneous equations in some cases.

Further, in the method of the present embodiment, the value cannot be uniquely specified unless the number of laser beams is an even number. Therefore, in the case where the number of laser beams is an odd number, the correction value Cb and the correction values L and U cannot be uniquely determined by solving simultaneous equations. Therefore, after the correction value Cb regarding the positional deviation of the laser beam is calculated with an even number of laser beams, the correction values L and U regarding the multiple exposure effect may just be calculated with an odd number of laser beams.

As described above, in the correction value calculation method of the present embodiment, a combination of the correction value Cb that influences the density of the measurement patch P (the column (c) in FIG. 27) and the correction values L and U regarding the influence amount of the multiple exposure effect according to the image pattern corresponding to the measurement patch P (the column (e) in FIG. 27) is specified on the basis of the type of the measurement patch P and the phase relationship with the multibeam, and the correction values Cb01 to Cb16 and the correction values L1 to L5 and U1 to U5 are calculated on the basis of the measurement density of each measurement patch P and the combination of the correction values, for each of the measurement patches P included in the image unit IU.

As a result, the correction values Cb01 to Cb16 and the correction values L1 to L5 and U1 to U5 are calculated for each of the five image units IU illustrated in FIG. 20.

Normally, the variation in the magnitude of the density change due to the multiple exposure effect is small in the main scanning direction x. Therefore, the five sets of correction values L1 to L5 and U1 to U5 obtained for the five image units IU are averaged and final correction values L1 to L5 and U1 to U5 can be obtained.

Meanwhile, the magnitude of the density change due to the positional deviation of the laser beam often varies at each position in the main scanning direction x. Therefore, the five sets of correction values Cb01 to Cb16 obtained for the five image units IU are used as they are as the correction values Cb for the position range in the main scanning direction x of each image unit IU, whereby the density change due to the positional deviation of the laser beam can be more accurately corrected.

Alternatively, the measurement density of each measurement patch P is corrected on the basis of the final correction values L1 to L5 and U1 to U5 obtained as described above, the measurement density from which the influence by the multiple exposure effect has been removed is calculated, and the correction values Cb01 to Cb16 regarding each image unit IU may be recalculated using the measurement density. Specifically, the values of the correction values L and U illustrated in the column (e) in FIG. 27 are subtracted from the measurement density (column (a)) of the measurement patch P, the temporary correction value Cb (column (h)) is calculated on the basis of the obtained corrected density, and the final correction value Cb (column (i)) may just be calculated from the approximate curve in FIG. 29B. Alternatively, since the temporary correction value Cb in the column (h) does not include the influence of the density change due to the multiple exposure effect in this case, the temporary correction value Cb of the column (h) may be used as it is as the final correction value Cb.

Further, with respect to each target set of the five sets of correction values Cb obtained for the five image units IU, a weighted average value of two or more sets of the correction values Cb including the target set of correction value Cb according to the distance in the main scanning direction x between the image units IU is calculated, and the correction value Cb of the target set may be updated to the weighted average value.

The above weighted average may be performed for the correction values L and U in place of or in addition to the correction value Cb.

Since the density change due to the positional deviation of the laser beam and the multiple exposure effect can change with time, it is desirable to calculate and update the correction values every time a predetermined correction value update condition is satisfied after the correction value Cb and the correction values L and U are calculated as described above. Here, the correction value update condition is not particularly limited, but the correction value update condition can be, for example, a cumulative movable time of the image forming apparatus 100, or when a cumulative number of image formation exceeds a predetermined value.

Further, a detector capable of directly measuring an irradiation position and a light amount of each laser beam in the multibeam is provided, the irradiation position and the variation amount of the light amount of the laser beam are detected, and at least part of the correction values Cb01 to Cb16 may be modified according to the detected amount of variation (correction value modification step). Such modification is performed at a frequency higher than the calculation frequency of the correction value Cb and the correction values U and L by the above-described method, whereby the consumption amount of the recording medium used for formation of the test chart TC can be decreased while a decrease in productivity of normal image formation due to formation of the test chart TC can be suppressed.

Next, a control procedure by the controller 11, of correction setting processing of calculating the correction value Cb and the correction values L and U and setting correction will be described.

Figure 32:
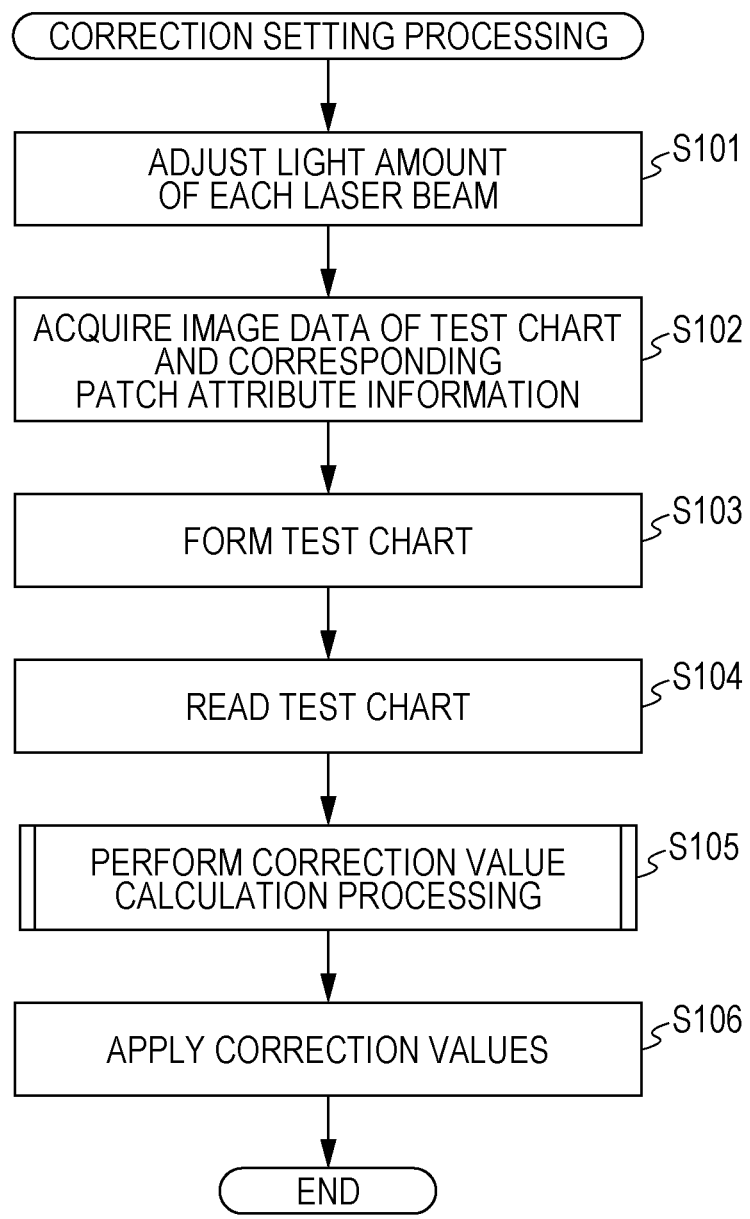
FIG. 32 is a flowchart illustrating a processing procedure of correction setting processing.

FIG. 32 is a flowchart illustrating a processing procedure of the correction setting processing.

The correction setting processing is started, for example, when an input operation instructing execution of correction setting is made from the user to the operation unit 13.

When the correction setting processing is started, adjustment to reduce variation in the light amount of the laser beams in the multibeam is performed (step S101: light amount adjustment step). In step S101, favorably, the light amount is adjusted such that the light amounts of the laser beams in the multibeam become uniform with one another. A specific method of adjusting the light amount of the laser beam is not particularly limited. However, for example, the light amount of each laser beam is measured using a photosensor and an output of the laser may be adjusted on the basis of the obtained light amount, or a predetermined measurement pattern is formed on a recording medium by a single laser beam in the multibeam and the light amount may be adjusted on the basis of the density of the measurement pattern. All the processing in step S101 may be performed under the control of the controller 11 or part of the processing may be performed by a human hand.

Next, the controller 11 acquires the image data of the test chart TC and patch attribute information regarding contents of the measurement patch P included in the test chart TC (step S102). The image data and the patch attribute information of the test chart TC are generated in advance and stored in the storage 12. Note that the execution frequency of the correction setting processing depends on the stability of the machine of the image former 18 including the exposurer and required adjustment accuracy. The processing needs to be more frequently executed as the stability of the machine is lower or the required adjustment accuracy is higher. In a case where the adjustment frequency is very low, it may be sufficient to perform the adjustment only once when manufacturing the image forming apparatus 100. In such a case, the image data and the patch attribute information of the test chart TC are stored in a storage in an adjustment device such as a server or an adjustment jig provided outside the image forming apparatus 100, and can be read out only during the adjustment.

Next, the controller 11 operates each part of the image former 18 to form the test chart TC on the recording medium m (step S103: inspection image forming step). In the measurement of the correction value of the present embodiment, a slight density difference of the measurement patch P needs to be read. Therefore, the measurement is susceptible to the noise such as unevenness and contamination of the formed image density. Therefore, various adjustments for reducing the unevenness and noise of the formed image density may be performed before the test chart TC is formed.

Next, the controller 11 causes the image reader 19 to read the test chart TC (step S104: reading step). Further, in a case where the texture pattern patch TP is included in the test chart TC, the texture pattern patch TP is also read. In a case where the measurement value of the texture pattern patch TP differs depending on the position, it can be judged that there is density unevenness due to factors other than the positional deviation of the laser beam and the multiple exposure effect. Therefore, the component of the density unevenness is subtracted from the measurement value of each measurement patch P to correct the measurement value.

In step S104, the image reader 19 reads the test chart TC with a predetermined reading resolution, a predetermined spatial filter characteristic, and predetermined region determination setting regarding setting of the reading processing according to an image region attribute. Further, in the reading, at least one of the reading resolution, the spatial filter characteristic, and the region determination setting is adjusted not to interfere with the measurement patch P.

An interference occurs between the reading resolution and the repetition period of the unit pattern PA and may influence the reading result depending on the reading resolution or a modulated transfer function (MTF) characteristic of the image reader 19. Therefore, it is favorable to set the reading resolution of the image reader 19 to setting for not easily causing an interference with the unit pattern PA (for example, a resolution sufficiently higher than the spatial repetition period of the unit pattern PA), or to set a spatial filter to make the MTF sufficiently low in the repetition period of the unit pattern PA.

Further, in a case where the image reader 19 determines the image region attribute (for example, determination as to whether the image region is a character region regarding characters or a multi-gradation image region such as a photograph), and performs reading processing according to the determination result, it is favorable to perform reading after the region determination setting regarding setting of the reading processing is set not to cause the interference. For example, in a case where edge emphasis processing is set in the character region, it is desirable to perform setting of not performing determination of the image region attribute because the density may not be able to be accurately measured if the measurement patch P is determined as the character region.

Next, the controller 11 executes correction value calculation processing of calculating the correction value Cb and the correction values L and U on the basis of the reading result of the test chart TC (step S105: correction value calculation step).

When the correction value calculation processing is completed, the controller 11 performs correction setting by applying the calculated correction value Cb and correction values L and U (step S106). That is, as described above, the first corrector 201 corrects the image data, using the correction value Cb, the second corrector 202 corrects the image data, using the correction values L and U, and these correction results are synthesized and image data after correction is generated.

Note that the method of applying the correction value Cb and the correction values L and U is not limited to the above method. For example, the irradiation position of the laser beam may be adjusted by adjusting an inclination angle $\theta$ of the multibeam illustrated in FIG. 2 and arrangement of various lenses on the basis of the correction value Cb regarding the positional deviation of the laser beam. Further, the variation amount of the density due to the multiple exposure effect may be stabilized by adjusting a diaphragm (not illustrated) that limits the slit 32 in FIG. 2 and an aperture of a beam light flux and adjusting a beam diameter on the photoconductor 40 on the basis of the correction values L and U regarding the multiple exposure effect.

Figure 33:
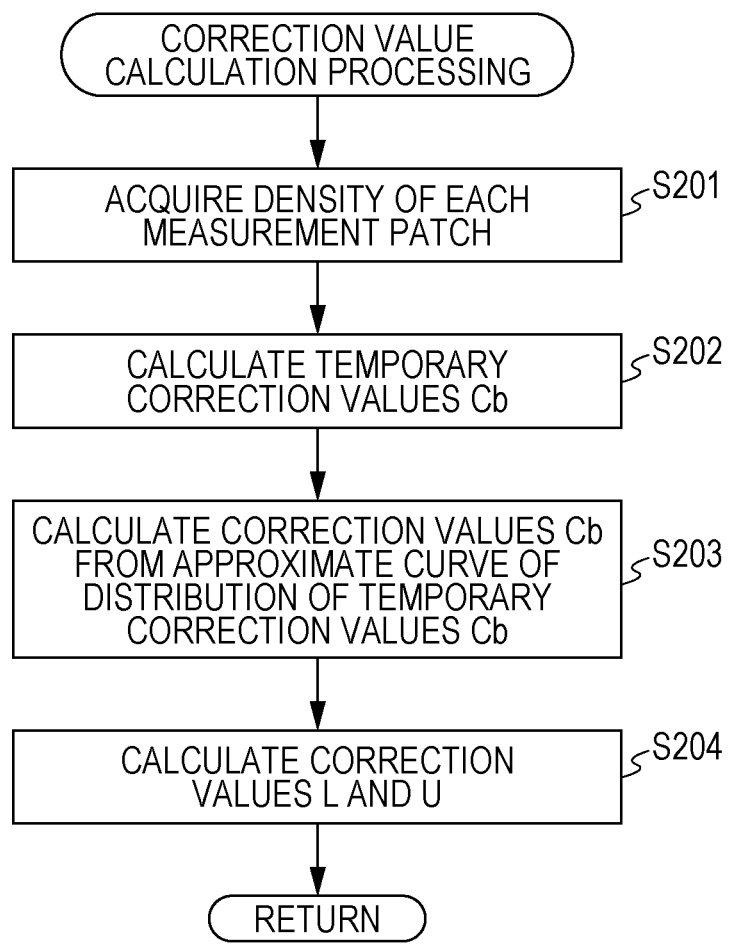
FIG. 33 is a flowchart illustrating a control procedure of correction value calculation processing.

FIG. 33 is a flowchart illustrating a control procedure of the correction value calculation processing.

When the correction value calculation process is called, the controller 11 acquires the measurement density of each measurement patch P (step S201).

Next, the controller 11 calculates the temporary correction values Cb01 to Cb16 according to the above-described algorithm (step S202), calculates the correction values Cb01 to Cb16 on the basis of the approximate curve representing the distribution of the average values of the temporary correction values Cb01 to Cb16 (step S203), and stores the obtained correction values Cb01 to Cb16 in the storage 12.

Next, the controller 11 calculates the correction values L and U on the basis of the values obtained by correcting the measurement density of the measurement patches P with the correction values Cb01 to Cb16, and stores the obtained correction values L and U in the storage 12 (step S204).

When the processing of step S204 is completed, the controller 11 returns the processing to the correction setting processing.

As described above, the correction value calculation method according to the present embodiment is a correction value calculation method used for correction of density unevenness in the image forming apparatus 100 that repeats an operation to move a surface of the photoconductor 40 in a sub-scanning direction y and an operation to scan the surface of the photoconductor 40 in a main scanning direction x with the plurality of laser beams to expose the photoconductor 40, develops an electrostatic latent image formed by the exposure, and transfers the electrostatic latent image on a recording medium, thereby to form an image, the correction value calculation method includes an inspection image forming step of forming a test chart TC on the recording medium such that a plurality of two or more types of measurement patches P having different interference patterns with the plurality of laser beams from one another is provided to have a plurality of different phase relationships with respect to the plurality of laser beams, respectively, and a correction value calculation step of calculating a first correction value group including correction values Cb01 to Cb16 used for correction of density unevenness caused by positional deviation of each of the plurality of laser beams, and a second correction value group including correction values L1 to L5 and U1 to U5 used for correction of density unevenness caused by multiple exposure effect in continuous scanning, in the correction value calculation step, a combination of the correction value Cb regarding the positional deviation of the laser beam that affects density of the measurement patch P, of the first correction value group, and the correction values L and U regarding an influence amount of the multiple exposure effect according to an image pattern corresponding to the measurement patch P, of the second correction value group, are identified for each of the measurement patches P included in the test chart TC, on the basis of the type and the positional relationship of the measurement patch P, and the first correction value group and the second correction value group are calculated on the basis of density information regarding each density of the measurement patches P obtained from a read result of the test chart TC and the combination of the correction value Cb and the correction values L and U corresponding to each of the measurement patches P.

According to this method, the correction value Cb regarding the positional deviation of the laser beam and the correction values L and U regarding multiple exposure correction, which are usually difficult to independently calculate from the reading results of the test chart TC, can be easily and independently calculated on the basis of the reading results of the test chart TC.

Further, the measurement patch P includes the unit pattern PA formed with the same period as the spatial period of the scan in the sub-scanning direction y, and the measurement patches P of different types include the unit patterns PA different from one another. Therefore, the correction value Cb and the correction values L and U corresponding to each laser beam can be accurately calculated from the density information of a plurality of measurement patches P in which the phase relationships between the plurality of laser beams and the unit patterns PA are differentiated.

Further, the number of the plurality of different phase relationships is set to the same number of laser beams in the plurality of laser beams, whereby the correction value Cb and the correction values L and U corresponding to each laser beam can be accurately calculated.

Further, in the inspection image forming step, the test chart TC in which a plurality of the image units IU is arranged at different positions in the main scanning direction x is formed, the image unit IU having the plurality of two or more types of different measurement patches P arranged to have the plurality of different phase relationships, and in the correction value calculation step, the first correction value group and the second correction value group are calculated on the basis of each of the plurality of image units IU, a plurality of calculated sets of the second correction value groups is averaged to calculate a set of the second correction value group, and the first correction value group corresponding to each of the plurality of image units IU is recalculated on the basis of the set of second correction value group.

Normally, the variation in the magnitude of the density change due to the multiple exposure effect is small in the main scanning direction x. Therefore, the plurality of second correction value groups obtained from the plurality of image units IU is averaged, whereby the correction values L and U in which the influence of the noise is suppressed can be obtained. Further, the first correction value group (correction values Cb01 to Cb16) is recalculated on the basis of the second correction value group obtained in this way, whereby the correction value Cb regarding the positional deviation of the laser beam at different positions in the main scanning direction x can be more accurately obtained.

Further, in the correction value calculation step, the first correction value group and the second correction value group are calculated on the basis of each of the plurality of image units IU, with respect to each target set of the correction value group, for at least one of a plurality of obtained sets of the first correction value groups and the second correction value groups, a weighted average value according to a distance in the main scanning direction x between the image units IU corresponding to two or more sets of correction value groups including the target set of correction value group is calculated, and the target set of correction value group is updated to the weighted average value.

As a result, the correction values in a close positional relationship are mutually averaged. Therefore, the correction value with small noise influence can be calculated while variation tendency of the correction values with respect to the positions in the main scanning direction x is reflected.

Further, in the correction value calculation step, a predetermined correlation is assumed between positional deviations regarding the plurality of laser beams, and the first correction value group is calculated on the basis of the correlation. For example, in a case where an optical element that emits a plurality of laser beams in the multibeam is formed as one-chip element, a certain correlation is usually found in the positional deviation of the plurality of laser beams. Therefore, by use of the correlation, an accurate correction value Cb with small noise influence can be more easily calculated.

Further, in the inspection image forming step, the test chart TC including two or more measurement patches P with the same type and the same phase relationship is formed for each of the plurality of phase relationships. By use of the average value of the measurement density of two or more measurement patches P, variation in the image formation density can be suppressed in the calculation of the correction value Cb and the correction values L and U even in the case where the image formation density by the image former 18 varies depending on the position.

Further, in the inspection image forming step, the test chart TC including a plurality of the texture pattern patches TP having equal density and spatial frequency in the sub-scanning direction y to the measurement patch P, and not having an interference pattern with the plurality of laser beams is formed. In the correction value calculation step, the first correction value group and the second correction value group are calculated on the basis of the density information of the measurement patch P corrected according to the density of the texture pattern patch TP.

The variation in the image formation density in the main scanning direction x and in the sub-scanning direction y can be grasped from the density distribution of the plurality of texture pattern patches TP. Therefore, by correcting the density information of the measurement patch P according to the density of the texture pattern patch TP, the accurate correction value Cb and correction values L and U in which the influence of the variation in the image formation density is suppressed can be calculated.

Further, the correction value calculation method of the above embodiment includes a reading step of reading, by the image reader 19, the test chart TC with a predetermined reading resolution, a predetermined spatial filter characteristic, and predetermined region determination setting regarding setting of reading processing according to an image region attribute, and in the reading step, at least one of the reading resolution, the spatial filter characteristic, and the region determination setting is adjusted not to cause an interference with the measurement patch P. According to the method, the density of the measurement patch P can be more accurately measured. Therefore, the more accurate correction value Cb and correction values L and U can be calculated.

Further, the correction value calculation method of the above embodiment includes a light amount adjustment step of decreasing light amount variations of the plurality of laser beams before the inspection image forming step. Since the correction with the correction value Cb and the correction values L and U more appropriately functions as the light amounts of the laser beams are more uniform, the correction can be more accurately performed by reducing the variation of the light amounts as described above.

Further, the correction value calculation method according to the above embodiment includes a correction value modification step of detecting variation of at least one of an irradiation position and a light amount by each of the plurality of laser beams, and modifying at least part of the plurality of correction values Cb01 to Cb16 included in the first correction value group according to an amount of the detected variation. With the step, the correction value Cb can be modified with good followability in accordance with temporal change of the characteristics of the laser beam. As a result, accurate correction with the correction value Cb can be maintained following the temporal change of the characteristics of the laser beam. Further, such modification is performed at a frequency higher than the calculation frequency of the correction value Cb and the correction values U and L, whereby the consumption amount of the recording medium used for formation of the test chart TC can be decreased while a decrease in productivity of normal image formation due to formation of the test chart TC can be suppressed.

Further, the image forming apparatus 100 of the above-described embodiment includes the photoconductor 40, the laser light source 20 that emits a plurality of laser beams, the image former 18 that repeats an operation to move a surface of the photoconductor 40 in a sub-scanning direction y and an operation to scan the surface of the photoconductor 40 in a main scanning direction x with the plurality of laser beams to expose the photoconductor 40, develops an electrostatic latent image formed by the exposure, and transfers the electrostatic latent image on a recording medium, thereby to form an image, and a controller 11, in which the controller 11 controls the operation of the image former 18 (image forming controller), calculates a first correction value group including correction values Cb01 to Cb16 used for correction of density unevenness caused by positional deviation of each of the plurality of laser beams, and a second correction value group including correction values L1 to L5 and U1 to U5 used for correction of density unevenness caused by multiple exposure effect in continuous scanning (correction value calculator), causes the image former 18 to form a test chart C on the recording medium such that a plurality of two or more types of measurement patches P having different interference patterns with the plurality of laser beams from one another has a plurality of different phase relationships with respect to the plurality of laser beams, respectively (image forming controller), and identifies, for each of the measurement patches P included in the test chart C, a combination of the correction value Cb regarding the positional deviation of the laser beam that affects density of the measurement patch P, of the first correction value group, and the correction values L and U regarding an influence amount of the multiple exposure effect according to an image pattern corresponding to the measurement patch P, of the second correction value group, on the basis of the type and the positional relationship of the measurement patch P, and calculates the first correction value group and the second correction value group on the basis of density information regarding each density of the measurement patches P obtained from a read result of the test chart C and the combination of the correction value Cb and the correction values L and U corresponding to each of the measurement patches P (correction value calculator).

According to such a configuration, the correction value Cb regarding the positional deviation of the laser beam and the correction values L and U regarding multiple exposure correction can be easily and independently calculated on the basis of the reading results of the test chart C.

Further, the controller 11 corrects a gradation value of a pixel in image data used for formation of the image on the basis of at least one of the correction value Cb corresponding to the pixel to be corrected, of the first correction value group, and the correction values U and L corresponding to the pixel to be corrected, of the second correction value group (corrector). Therefore, the density unevenness caused by the positional deviation of the laser beam and by the multiple exposure effect can be suppressed by the easy method of correcting the gradation value of the image data.

Further, the program 12a of the above embodiment causes the controller 11 of the image forming apparatus 100 to function as the above image forming controller and correction value calculator. Therefore, the correction value Cb regarding the positional deviation of the laser beam and the correction values L and U regarding the multiple exposure correction can be easily and independently calculated on the basis of the reading results of the test chart TC by the image forming apparatus 100.

Further, in the test chart TC of the above embodiment, two or more types of a plurality of measurement patches P having a plurality of different interference patterns with the plurality of laser beams from one another is provided to have a plurality of different phase relationships with respect to the plurality of laser beams, respectively. By forming and reading such a test chart TC, the correction value Cb regarding the positional deviation of the laser beam and the correction values L and U regarding the multiple exposure correction can be easily and independently calculated.

Further, the measurement patch P includes the unit pattern PA formed with the same period as the spatial period of the scan in the sub-scanning direction y, and the measurement patches P of different types include the unit patterns PA different from one another. Therefore, the correction value Cb and the correction values L and U corresponding to each laser beam can be accurately calculated from the density information of a plurality of measurement patches P in which the phase relationships between the plurality of laser beams and the unit patterns PA are differentiated.

Further, the number of the plurality of different phase relationships is set to the same number of laser beams in the plurality of laser beams, whereby the correction value Cb and the correction values L and U corresponding to each laser beam can be accurately calculated.

Further, in the test chart TC, a plurality of image units IU in which two or more different types of a plurality of measurement patches P is provided to have a plurality of different phase relationships is arranged at different positions in the main scanning direction x. Therefore, the correction value Cb and the correction values L and U capable of more accurately correcting the positional deviation of the laser beam and the multiple exposure effect at different positions in the main scanning direction x can be calculated.

Further, the test chart TC includes two or more measurement patches P with the same type and the same phase relationship for each of the plurality of phase relationships. By use of the average value of the measurement density of two or more measurement patches P, variation in the image formation density can be suppressed in the calculation of the correction value Cb and the correction values L and U even in the case where the image formation density by the image former 18 varies depending on the position.

Further, a plurality of texture pattern patches TP having equal density and an equal spatial frequency in the sub-scanning direction y to the measurement patch P, and not having an interference pattern with the plurality of laser beams is included. The variation in the image formation density in the main scanning direction x and in the sub-scanning direction y can be grasped from the density distribution of the plurality of texture pattern patches TP. Therefore, by correcting the density information of the measurement patch P according to the density of the texture pattern patch TP, the accurate correction value Cb and correction values L and U in which the influence of the variation in the image formation density is suppressed can be calculated.

Note that the present invention is not limited to the above-described embodiment and modifications, and various changes can be made.

For example, the types of the measurement patch P are not limited to 4On-12Off and 8On-8Off illustrated in FIGS. 22 and 23, and other types of measurement patches P having different interference patterns with the plurality of laser beams in the multibeam may be used. Note that a pattern in which the density of the measurement patch P falls within a range with high measurement sensitivity by the image reader 19 (in an intermediate density range excluding ranges with too high density and too low density) is desirable.

Further, the number of the types of the measurement patches P to be used is not limited to two, and three or more types of measurement patches P having different interference patterns with a plurality of laser beams may be used. The number of phase states prepared in the measurement patches P (the number of patch patterns PP) can be made smaller than the number of laser beams depending on the number of types of the measurement patches P.

Further, the arrangement of the measurement patches P in the image unit IU is not limited to the arrangement illustrated in FIG. 21. An arrangement with enhanced randomness may be adopted to make the positions of the measurement patches P more disperse, or the layout of the measurement patches P may be designed such that the distribution ranges and position centroids of the four identical patches are aligned as much as possible.

Further, in the above embodiment, the example in which the test chart TC includes the plurality of image units IU has been described. However, the embodiment is not limited to the example, and the correction value Cb and the Correction values L and U may be calculated using a test chart TC including a single image unit IU.

Further, as an example of the density information regarding the density of the measurement patch P, the example of using the light detection intensity (luminance) by the image reader 19 has been described. However, the embodiment is not limited to the example, and various measurement values having a corresponding relationship with the density of the measurement patch P can be used as the density information of the measurement patch P.

Further, reading of the test chart TC is not necessarily performed by the image reader 19 provided inside the image forming apparatus 100. For example, a reading device such as a densitometer or a calorimeter provided outside the image forming apparatus 100 may be used, or a scanner for image copy or scan provided in the image forming apparatus 100 may be used.

Although embodiments of the present invention have been described and illustrated in detail, the disclosed embodiments are made for purposes of illustration and example only and not limitation. The scope of the present invention should be interpreted by terms of the appended claims and equivalents thereto.

What is claimed is:

1. A correction value calculation method used for correction of density unevenness in an image forming apparatus that repeats an operation to move a surface of a photoconductor in a sub-scanning direction and an operation to scan the surface of the photoconductor in a main scanning direction with a plurality of light beams to expose the photoconductor, develops an electrostatic latent image formed by the exposure, and transfers the electrostatic latent image on a recording medium, to form an image, the correction value calculation method comprising:

forming, on the recording medium, an inspection image in which two or more types of a plurality of individual inspection images having different interference patterns with the plurality of light beams from one another are formed to have a plurality of different phase relationships with respect to the plurality of light beams, respectively;

calculating a first correction value group including a plurality of first correction values used for correction of density unevenness caused by positional deviation of each of the plurality of light beams, and a second correction value group including a plurality of second correction values used for correction of density unevenness caused by multiple exposure effect in the scanning that is continuous, wherein in calculating of the first and second correction value groups, a combination of the first correction values regarding the positional deviation of the light beams that affect density of the individual inspection images, of the first correction value group, and the second correction values regarding an influence amount of the multiple exposure effect according to an image pattern corresponding to the individual inspection images, of the second correction value group, based on the type and the positional relationship of the individual inspection images, are identified for each of the individual inspection images included in the inspection image, and the first correction value group and the second correction value group are calculated based on density information regarding each density of the individual inspection images obtained from a read result of the inspection image and the combination of the first correction values and the second correction values corresponding to each of the individual inspection images.

2. The correction value calculation method according to claim 1, wherein the individual inspection images includes a unit pattern formed with a same period as a spatial period of the scanning in the sub-scanning direction, and the individual inspection images having different types include the unit pattern different from one another.

3. The correction value calculation method according to claim 1, wherein a number of the plurality of different phase relationships is same as a number of light beams in the plurality of light beams.

4. The correction value calculation method according to claim 1, wherein, in the forming of the inspection image, the inspection image in which a plurality of image units is arranged at different positions in the main scanning direction is formed, the image units having the two or more types of plurality of different individual inspection images arranged to have the plurality of different phase relationships, and in the calculating of the first and second correction value groups, the first correction value group and the second correction value group are calculated on the basis of each of the plurality of image units, a plurality of calculated sets of the second correction value group is averaged to calculate a set of the second correction value group, and the first correction value group corresponding to each of the plurality of image units is recalculated on the basis of the set of second correction value group.

5. The correction value calculation method according to claim 1, wherein, in the forming of the inspection image, the inspection image in which a plurality of image units is arranged at different positions in the main scanning direction is formed, the image units having the two or more types of plurality of different individual inspection images arranged to have the plurality of different phase relationships, and in the calculating of the first and second correction value groups, the first correction value group and the second correction value group are calculated on the basis of each of the plurality of image units, and for each target set of the correction value group with respect to at least one of a plurality of obtained sets of the first correction value group and the second correction value group, a weighted average value according to a distance in the main scanning direction between the image units corresponding to two or more sets of correction value groups including the target set of correction value group is calculated, and the target set of correction value group is updated to the weighted average value.

6. The correction value calculation method according to claim 1, wherein, in the calculating of the first and second correction value groups, a predetermined correlation is assumed between positional deviations regarding the plurality of light beams, and the first correction value group is calculated on the basis of the correlation.

7. The correction value calculation method according to claim 1, wherein, in the forming of the inspection image, the inspection image including two or more of the individual inspection images having the same type and the same phase relationship is formed for each of the plurality of phase relationships.

8. The correction value calculation method according to claim 1, wherein,
   in the forming of the inspection image, the inspection image including a plurality of reference images having similar density and a similar spatial frequency in the sub-scanning direction to the individual inspection images, and not having an interference pattern between the reference images and the plurality of light beams is formed, and
      in the calculating of the first and second correction value groups, the first correction value group and the second correction value group are calculated based on the density information of the individual inspection images, the density information having been corrected according to the density of the reference images.

9. The correction value calculation method according to claim 1, further comprising:
   reading, by a reader, the inspection image with a predetermined reading resolution, a predetermined spatial filter characteristic, and predetermined region determination setting regarding setting of reading processing according to an image region attribute, wherein,
   in the reading, at least one of the reading resolution, the spatial filter characteristic, and the region determination setting is adjusted not to cause an interference with the individual inspection images.

10. The correction value calculation method according to claim 1, further comprising:
    decreasing light amount variations of the plurality of light beams before the forming of the inspection image.

11. The correction value calculation method according to claim 1, further comprising:
    detecting variation of at least one of an irradiation position and a light amount by each of the plurality of light beams, and modifying at least part of the plurality of first correction values included in the first correction value group according to an amount of the detected variation.

12. An image forming apparatus comprising:
    a photoconductor;
    a light source that emits a plurality of light beams;
    an image former that repeats an operation to move a surface of the photoconductor in a sub-scanning direction and an operation to scan the surface of the photoconductor in a main scanning direction with the plurality of light beams to expose the photoconductor, develops an electrostatic latent image formed by the exposure, and transfers the electrostatic latent image on a recording medium, to form an image; and
    a hardware processor that
    controls the operation of the image former, and
    calculates a first correction value group including a plurality of first correction values used for correction of density unevenness caused by positional deviation of each of the plurality of light beams, and a second correction value group including a plurality of second correction values used for correction of density unevenness caused by multiple exposure effect in the scanning that is continuous, wherein
    the hardware processor
    causes the image former to form an inspection image on the recording medium such that two or more types of a plurality of individual inspection images having different interference patterns with the plurality of light beams from one another has a plurality of different phase relationships with respect to the plurality of light beams, respectively,
    identifies, for each of the individual inspection images included in the inspection image, a combination of the first correction values regarding the positional deviation of the light beams that affect density of the individual inspection images, of the first correction value group, and the second correction values regarding an influence amount of the multiple exposure effect according to an image pattern corresponding to the individual inspection images, of the second correction value group, based on the type and the positional relationship of the individual inspection images, and
    calculates the first correction value group and the second correction value group based on density information regarding each density of the individual inspection images obtained from a read result of the inspection image and the combination of the first correction values and the second correction values corresponding to each of the individual inspection images.

13. The image forming apparatus according to claim 12, further comprising:
    a corrector that corrects a gradation value of a pixel in image data used for formation of the image based on at least one of the first correction values corresponding to the pixel to be corrected, of the first correction value group, and the second correction values corresponding to the pixel to be corrected, of the second correction value group.

14. A non-transitory recording medium storing a computer readable program causing a computer of an image forming apparatus including a photoconductor, a light source that emits a plurality of light beams, and an image former that repeats an operation to move a surface of the photoconductor in a sub-scanning direction and an operation to scan the surface of the photoconductor in a main scanning direction with the plurality of light beams to expose the photoconductor, develops an electrostatic latent image formed by the exposure, and transfers the electrostatic latent image on the recording medium, to form an image, to function as:
    a hardware processor that
    controls the operation of the image former, and
    calculates a first correction value group including a plurality of first correction values used for correction of density unevenness caused by positional deviation of each of the plurality of light beams, and a second correction value group including a plurality of second correction values used for correction of density unevenness caused by multiple exposure effect in the scanning that is continuous, wherein
    the hardware processor
    causes an inspection image to be formed on the recording medium such that two or more types of a plurality of individual inspection images having different interference patterns with the plurality of light beams from one another has a plurality of different phase relationships with respect to the plurality of light beams, respectively,
    identifies, for each of the individual inspection images included in the inspection image, a combination of the first correction values regarding the positional deviation of the light beams that affects density of the individual inspection images, of the first correction value group, and the second correction values regarding an influence amount of the multiple exposure effect according to an image pattern corresponding to the individual inspection images, of the second correction value group, based on the type and the positional relationship of the individual inspection images, and calculates the first correction value group and the second correction value group based on density information regarding each density of the individual inspection images obtained from a read result of the inspection image and the combination of the first correction values and the second correction values corresponding to each of the individual inspection images.

* * * * *